United States Patent
Higuchi et al.

(10) Patent No.: US 7,155,103 B2
(45) Date of Patent: Dec. 26, 2006

(54) OPTICAL WAVE GUIDE AND METHOD FOR PRODUCING THE SAME

(75) Inventors: Masayoshi Higuchi, Ibaraki (JP); Toshiyuki Takahashi, Tsukuba (JP); Hiromi Totani, Uji (JP); Naru Yasuda, Uji (JP); Hayami Hosokawa, Kyoto (JP); Fumihiko Sato, Tsuchiura (JP)

(73) Assignee: Omron Corporation, Kyoto (JP)

( * ) Notice: Subject to any disclaimer, the term of this patent is extended or adjusted under 35 U.S.C. 154(b) by 220 days.

(21) Appl. No.: 10/254,462

(22) Filed: Sep. 25, 2002

(65) Prior Publication Data
US 2003/0061836 A1  Apr. 3, 2003

(30) Foreign Application Priority Data

Sep. 28, 2001 (JP) ............................. 2001-304616
Aug. 9, 2002 (JP) ............................. 2002-232918

(51) Int. Cl.
*G02B 6/10* (2006.01)

(52) U.S. Cl. ...................... 385/132; 385/129; 264/1.24

(58) Field of Classification Search ............... 264/1.24, 264/1.27, 1.36, 1.38, 1.6; 385/129–132
See application file for complete search history.

(56) References Cited

U.S. PATENT DOCUMENTS

| | | | | |
|---|---|---|---|---|
| 5,265,184 A | * | 11/1993 | Lebby et al. | ............... 385/132 |
| 5,540,799 A | * | 7/1996 | Lebby et al. | ............... 156/245 |
| 5,937,128 A | * | 8/1999 | Robertsson | ................ 385/129 |
| 6,500,603 B1 | | 12/2002 | Shioda | |
| 6,517,995 B1 | * | 2/2003 | Jacobson et al. | ........... 430/320 |
| 6,989,114 B1 | * | 1/2006 | Korenaga et al. | .......... 264/1.24 |
| 2003/0061836 A1 | | 4/2003 | Higuchi et al. | |

FOREIGN PATENT DOCUMENTS

| | | |
|---|---|---|
| DE | 197 21 721 A 1 | 11/1998 |
| JP | 2-131202 | 5/1990 |
| JP | 6-250034 | 9/1994 |
| JP | 9-101425 | 4/1997 |
| JP | 9-281351 | 10/1997 |

(Continued)

OTHER PUBLICATIONS

Patent Abstracts of Japan, Publication No. 09-101425, Published Apr. 15, 1997, 2 pages.

(Continued)

*Primary Examiner*—Edward J. Glick
*Assistant Examiner*—Thomas R. Artman
(74) *Attorney, Agent, or Firm*—Osha Liang L.L.P.

(57) ABSTRACT

To provide an optical wave guide that may be produced by reproduction method in easy and simple manner, and has a structure that prevents light signal in its inside from leaking out from core, and a method for producing the same optical wave guide. A concave slot for forming a core is formed on the upper surface of a cladding substrate. And on both sides of the concave slot, cavities are formed via flat portions. An ultraviolet ray hardening type transparent resin is applied onto the surface of the cladding substrate, thereafter the transparent resin is pressed by a stamper. At this moment, a core is formed in the concave slot and excessive transparent resin is pressed between the stamper and the flat portions flows into cavities, as a result, it is possible to make the transparent resin thin in a short time. Thereby, it is possible to make the transparent resin left on the flat portions into thickness and width enough to prevent light in the core from leaking out.

31 Claims, 37 Drawing Sheets

FOREIGN PATENT DOCUMENTS

| | | |
|---|---|---|
| JP | 10-090544 | 4/1998 |
| JP | 11-305055 | 11/1999 |
| JP | 2000-19337 | 1/2000 |
| JP | 2000-258649 | 9/2000 |
| JP | 2000-321459 | 11/2000 |
| JP | 2001-042150 | 2/2001 |
| JP | 2001-133650 | 5/2001 |
| JP | 2001-154052 | 6/2001 |
| JP | 2001-235646 | 8/2001 |
| JP | 2001-337239 | 12/2001 |

OTHER PUBLICATIONS

Patent Abstracts of Japan, Publication No. 2000-321459, Published Nov. 24, 2000, 2 pages.
Patent Abstracts of Japan, Publication No. 2001-133650, Published May 18, 2001, 2 pages.
Patent Abstracts of Japan, Publication No. 2001-154052, Published Jun. 8, 2001, 2 pages.
English translation of Abstract of DE19721721, 1 pg.
English translation of Abstract of JP02-131202, 1 pg.
English translation of Abstract of JP-09281351, 1 pg.
Notification of Reason(s) for Refusal for Japanese Application No. 2004-182699 mailed on Sep. 28, 2004 and English translation thereof, 7 pages.
Notification of Reason(s) for Refusal for Japanese Application No. 2004-182699 mailed on May 17, 2005, 5 pages.
First Notification of Reasons for Refusal for Chinese Application No. 02144433.1 mailed on Dec. 10, 2004 and English translation thereof, 15 pages.
Patents Abstracts of Japan, Publication No.: 2001-235646, Publication Date: Aug. 31, 2001, 2 pages.
Patents Abstracts of Japan, Publication No.: 11-305055, Publication Date: Nov. 5, 1999, 2 pages.
Patents Abstracts of Japan, Publication No.: 06-250034, Publication Date: Sep. 9, 1994, 2 pages.
Patents Abstracts of Japan, Publication No.: 2001-337239, Publication Date: Dec. 7, 2001, 2 pages.
Patents Abstracts of Japan, Publication No.: 2000-258649, Publication Date: Sep. 22, 2000, 2 pages.
Patents Abstracts of Japan, Publication No.: 2000-019337, Publication Date: Jan. 21, 2000, 2 pages.
Patents Abstracts of Japan; Publication No.: 2001-042150; Date of publication: Feb. 16, 2001 (2 pages).
Patents Abstracts of Japan; Publication No.: 10-090544; Date of publication: Oct. 4, 1998 (2 pages).
Japanese Office Action dated Jun. 6, 2006; Application No. 2002-232918 (4 pages).

* cited by examiner

Ultraviolet ray

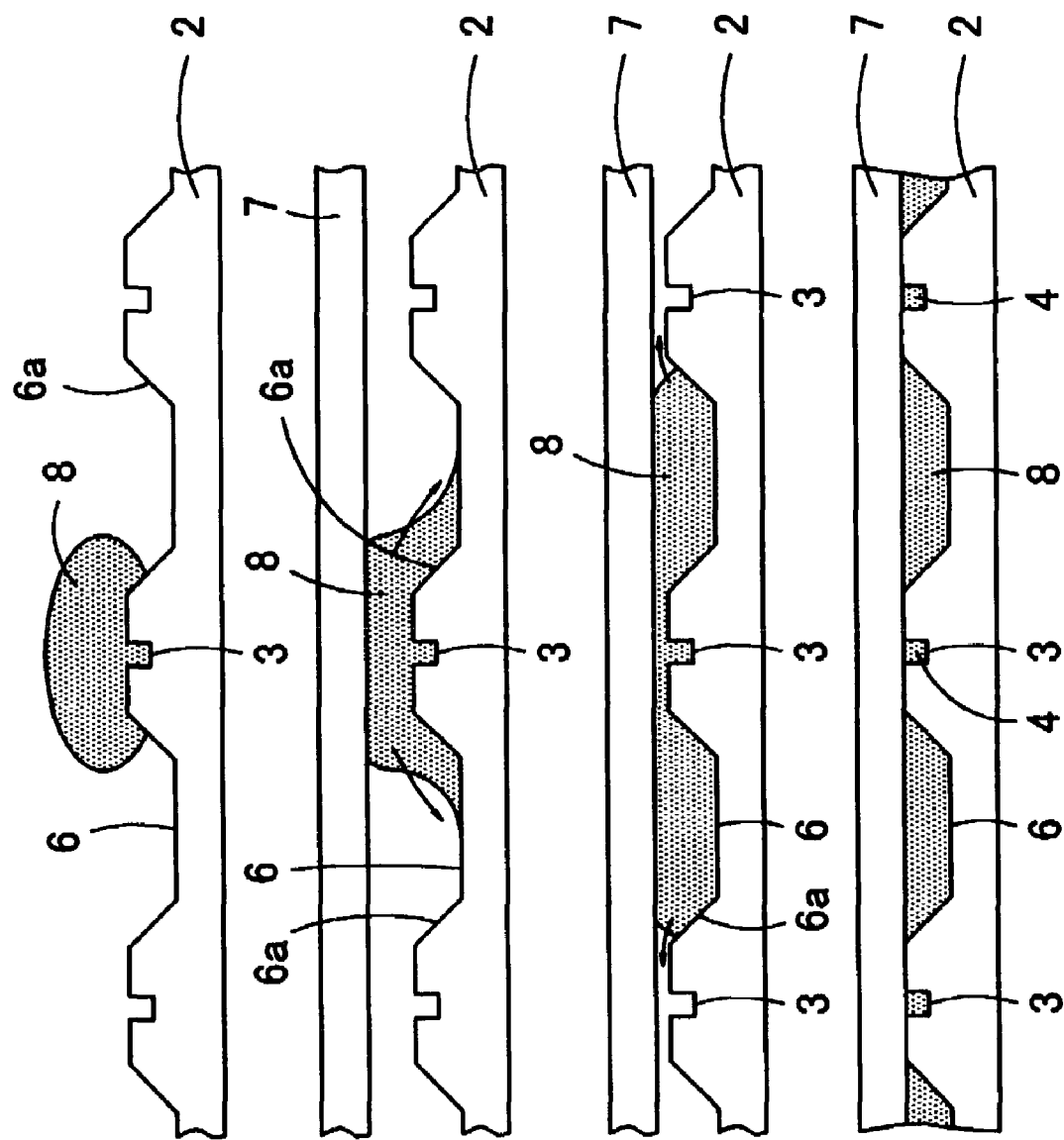

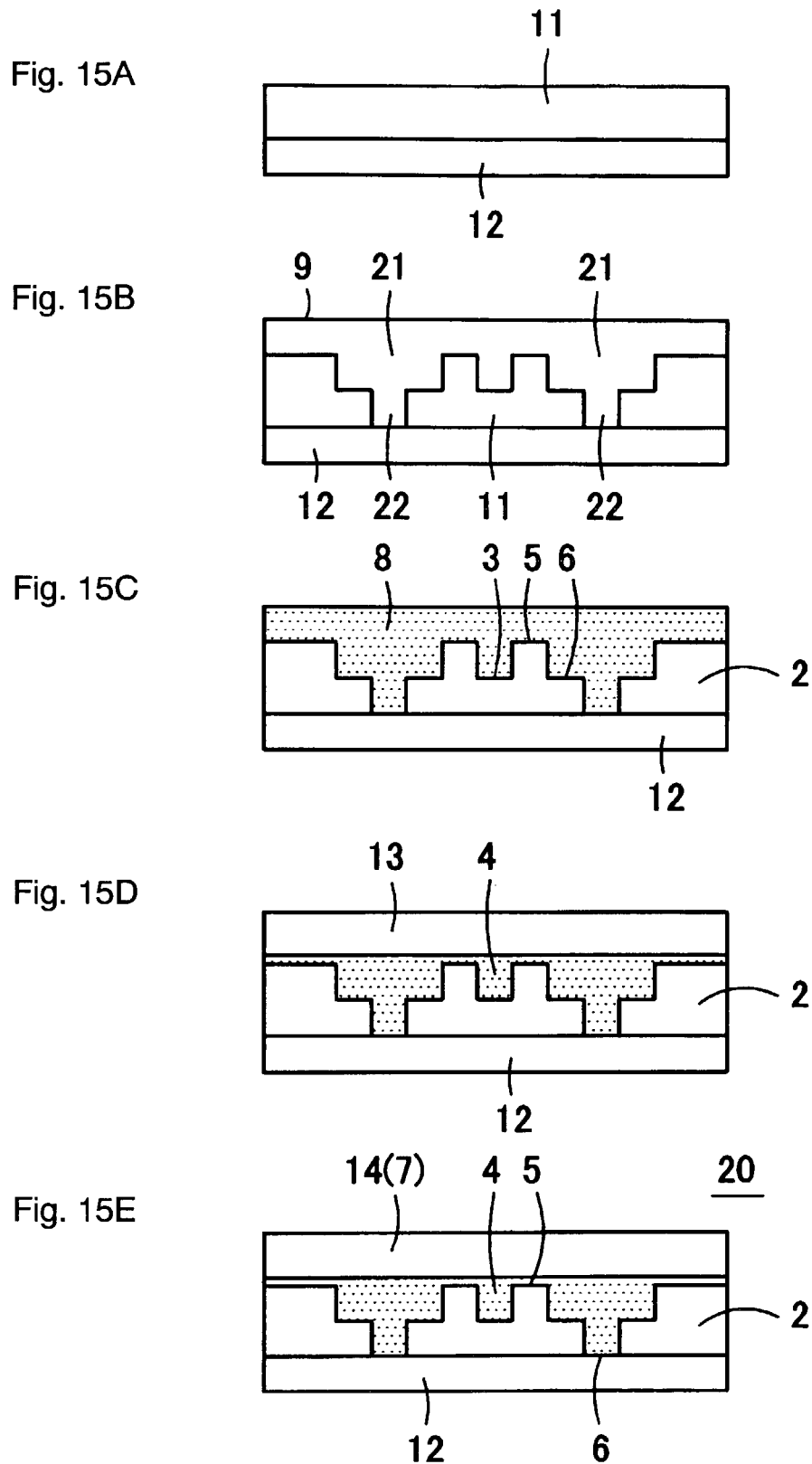

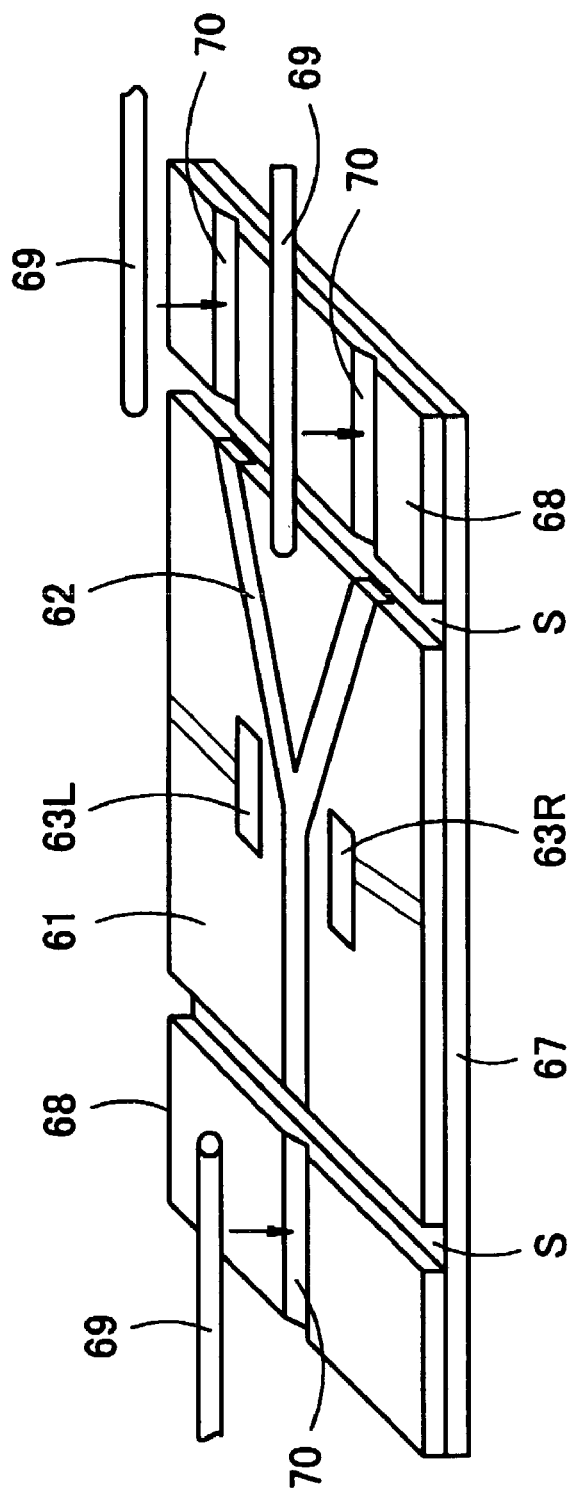
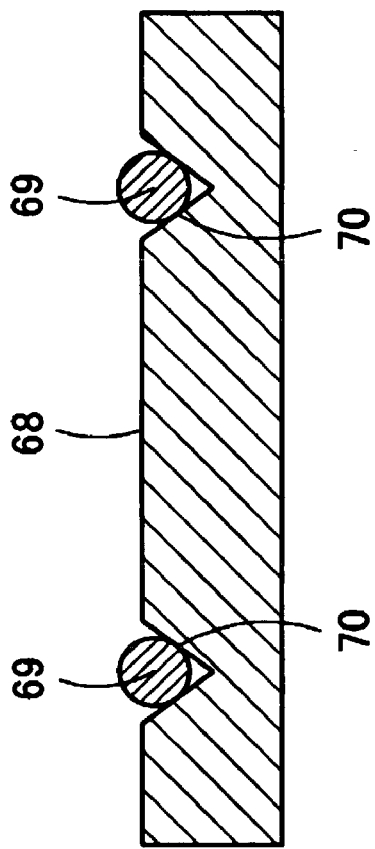
Fig. 36A
Fig. 36B

OPTICAL WAVE GUIDE AND METHOD FOR PRODUCING THE SAME

BACKGROUND OF INVENTION

1. Field of the Invention

The present invention relates to an optical wave guide and a method for producing the same.

2. Description of the Background Art

In a conventional optical wave guide, quartz material is employed, and a core and a cladding layer are formed by applying ion implantation, ion exchange, or the like to the quartz material. Therefore, its production process required a semiconductor production process employing highly priced facilities and devices, leading to high costs.

Some trials have been conducted wherein low costs of optical wave guides are attained by producing optical wave guides by reproduction method (or stamper method). The most simple and low cost method in reproduction methods may be that core material (transparent resin) is only applied onto the surface of a cladding substrate on which a groove to be an optical wave guide core is formed by a stamper. Alternatively, an applied core material is pressed flat. However, the former method only applying a core material brings about concaves and convexes on a surface of the core, and light may reflect diffusely on the surface of core and light in the core may leak out. Further, the latter method of pressing an applied core material, light in the core may leak out through a portion of the core material pressed and extended on the surface of a cladding layer. As a result, in these methods, deterioration of characteristics such as decline of S/N ratio of a light signal and the like may occur. Therefore, it has been impossible to produce optical wave guides that meet required standards.

Accordingly, the following improved reproduction methods have been proposed conventionally. For instance, according to the method for producing a high polymer optical wave guide disclosed in Patent Publication (Unexamined) No.63-281351, a groove to be an optical wave guide core is formed on the surface of a cladding substrate by means of reproduction using a stamper, and a core material (transparent resin) is poured into the groove. After this core material hardens, excessive core material protruding from the groove is cut out, thereby an optical wave guide core is formed within the groove.

According to a method for producing a high polymer optical wave guide disclosed in Patent Publication (Unexamined) No.9-281351, core material is applied into grooves reproduced on a cladding substrate. Then, before the core material hardens, unnecessary core material protruding from the groove is scraped off by a rubber pallet, a scraper, or the like, and thereafter the core material is hardened.

These reproduction methods as mentioned above enable optical wave guides to be produced with simple production facilities and through simple production process. Therefore, they are advantageous in producing extremely low priced optical wave guides. However, these methods for producing optical wave guides by the reproduction method have had the following problems.

First, in the former method wherein core material is cut off after core material hardens, because the refractive indexes of cladding substrate and core are not so large, the border surface of the core and the cladding layer is hard to see, and consequently it is difficult to judge to what extent the core should be cut off. Further, when the core is removed by grinding, since the thickness of applied core material and the thickness of cladding substrate are uneven, an unnecessary portion of core material may be removed completely, or the cladding substrate may be cut off excessively. If an unnecessary portion of core material is left, leakage of light cannot be prevented and yield decreases. Also, if the cladding substrate is cut to excess, its core size changes, resulting in optical wave guides having different characteristics. In contrast to this, if core is to be cut carefully and individually, the hassle of labor increases, and productivity decreases. As a result, product costs become high.

In the latter method wherein core material is scraped off before the core material hardens, it is difficult to completely remove the core material in unhardened status by a rubber pallet or the like, and an unnecessary portion of the core material may be left on cladding substrate. Further, when the unnecessary core material is left partially, it is not possible to confine light within the core, resulting in yield loss. Furthermore, if the excessive core material is scraped completely off by the rubber pallet or the like, the surface of the core material becomes concave based on surface tension of the core material. If the core material is harden in such status, the concave shape of the core surface remains as it is. As a result, performance of confining light is deteriorated, and S/N ratio decreases. In addition, different characteristics appear, resulting in yield loss.

Additionally, in U.S. Pat. No. 2,679,760, an optical wave guide where slots are arranged at both sides of core is described. However, in this optical wave guide, the top surface of the core is not released. Further, unnecessary core material does not flow from the core into slots. In Patent Publication (Unexamined) No.9-101425, space is formed at both sides of a groove arranged on cladding substrate. However, this is for core material remaining in the groove even after spin coating, and core material in groove exists only at the bottom of groove. Also, the core material within the groove does not flow into a space when pressed by an upper cladding portion.

SUMMARY OF INVENTION

The present invention has been made in consideration of the above-mentioned problems in the prior art. Accordingly, an object of the present invention is to provide an optical wave guide that may be produced by a reproduction method, and that has a structure that prevents light (signal) from leaking out from the core. Further, another object of the present invention is to provide a method for producing an optical wave guide that enables production of the optical wave guide.

A first optical wave guide according to the present invention may be embodied as an optical wave guide, wherein core material is filled into a concave portion arranged at interface of a cladding portion, and the above core material is pressed by a mold surface to form a core, and the above optical wave guide is characterized by that at least one space connecting to the interface of the above cladding portion, and the thickness of the core material at the interface of the above cladding portion is so made enough to prevent light in the core from leaking out. Herein, the mold surface is the surface for forming or leveling the core material, and is formed in, for example, a stamper, a metallic mold, or a separate molded cladding portion. Further, the space herein means a wide concept including a cavity, opening, clearance, atmospheric air and the like, and may be either closed space or open space. And the interface of cladding portion includes interface between cladding portions of an identical resin formed by different processes.

In the first optical wave guide according to the present invention, core material is filled into a concave portion arranged at interface of a cladding portion, and the above core material is pressed by a mold surface to form a core, and at least one space connecting to the interface of the above cladding portion is arranged. Accordingly, core material attaching onto the interface of cladding portion and core material protruding from concave portion may flow into the above space when pressed with the mold surface. As a consequence, it is possible to make core material left on cladding portion interface around core thin enough to prevent light in core from leaking out, in practically and sufficiently short time. Further, since it is possible to core material left at the interface of cladding portion thin in swift manner, the speed for core material to spread may be made faster, and it is possible to obtain an optical wave guide having high productivity.

In one embodiment according to the present invention, between the above concave portion and the above space, the thickness of the core material existing in the interface of the above cladding portion is 3 µm or below. When the thickness of core material at this position is thicker than 3 µm, light in core will leak out through core material at this position. Thus, it is preferable to make this thickness 3 µm or below.

A second optical wave guide according to the present invention may be embodied as an optical wave guide, wherein core material is filled into a concave portion arranged at interface of a cladding portion, and the above core material is pressed by a mold surface to form a core, and the above optical wave guide is characterized by that at least one space connecting to the interface of the above cladding portion, and the shortest distance between the above concave portion along the interface of the above cladding portion and the above space is set so far enough to prevent light in the core from leaking out. Herein, the mold surface is the surface for forming or leveling the core material, and is formed in, for example, a stamper, a metallic mold, or a separate molded cladding portion. Further, the space herein means a wide concept including a cavity, opening, clearance, atmospheric air and the like, and may be either closed space or open space. Furthermore, the interface of cladding portion includes interface between cladding portions of an identical resin formed by different processes.

In the second optical wave guide according to the present invention, wherein core material is filled into a concave portion arranged at interface of a cladding portion, and at least one space connecting to the interface of the above cladding portion, is arranged, accordingly, core material attaching onto the interface of cladding portion and core material protruding from concave portion may flow into the above space when pressed with the mold surface. As a consequence, it is possible to make core material left on cladding portion interface around core thin enough to prevent light in core from leaking out, in practically and sufficiently short time. Further, since the shortest distance between the above concave portion along the interface of the above cladding portion and the above space is set so far enough to prevent light in the core from leaking out, it is possible for core material at the interface of cladding portion to preferably shut light in from viewpoints of both thickness and width, to increase S/N ratio of an optical wave guide, and to make preferable the transmission characteristics of an optical wave guide. Furthermore, since it is possible to make core material at the interface of cladding portion thin in swift manner, the speed for core material to spread may be made faster. Thus, it is possible to obtain an optical wave guide having high productivity.

In one embodiment according to the present invention, the shortest distance between the above concave portion along the interface of the above cladding portion and the above space is 5 µm or more. If the distance between the concave portion and the space is set shorter than 5 µm, the concave portion and the space are set too close to each other. As a result, even when the thickness of core material is made thin, light in core is likely to leak out into space. Thus, to obtain a distance to prevent light in core from leaking, it is preferable to make the shortest distance between the concave portion and the space 5 µm or more.

In another embodiment according to the present invention, in the above space, the core material pushed out by the above mold surface is held at the interface of the above cladding portion. Since unnecessary core material is kept within the space, according to this embodiment, it is possible to make it easy to produce optical wave guides without high precision required for the supply amount of core material to be supplied to the concave portion.

Further, in order that unnecessary core resin flows into space and the thickness of core material at the interface of cladding portion becomes thin swiftly, it is preferred to set the volume of the above space larger than that of the above concave portion, also it is preferred to set the flat area of the above space larger than that of the above concave portion.

In another embodiment according to the present invention, it is preferred to arrange the above space along the above core. By arranging the space to keep unnecessary core material along core, it is possible to decrease light leakage in almost the entire core.

In another embodiment according to the present invention, it is preferred to release the above space to atmospheric air. If the space is released to atmospheric air, when the amount of unnecessary core material is larger than the volume of the space, it is possible to discharge unnecessary core material from the space to the outside. Further, even when there is a large amount of excessive core material, it is available to make the core material thickness thin swiftly.

In another embodiment according to the present invention, it is preferred to set the thickness of the above cladding portion in the deepest section of the above space 7 µm or below. If the thickness of the above cladding portion in the deepest section of the above space is thick, it is difficult to form the interface of the cladding portion horizontally, in forming the cladding portion by means of a stamper or the like. If the thickness of the above cladding portion in the deepest section of the above space is set thin, the surface at the lowest position of the stamper or the like is pressed into the position where it contacts the undersurface component (substrate or the like) of the cladding portion through the cladding portion in a thin film status. Thus, it is easy to form the interface of the cladding portion horizontally. Specifically, to attain such an effect, the thickness of the above cladding portion in the deepest section of the above space may be set 7 µm or below.

In another embodiment according to the present invention, it is preferred to arrange the depth of the above space deeper than that of the concave portion arranged in the above cladding portion. If the depth of the above space is deeper than that of the concave portion arranged in the above cladding portion, the thickness of the cladding portion at the bottom of the concave portion will not become thin. Consequently, light transmitting through core is unlikely to leak out of the core. Among other things, when the thickness of the concave portion arranged in the cladding portion is made thin, the thickness of the cladding portion at the concave portion becomes thin accordingly. However, if the thickness of the above space is set deeper than the depth of the concave portion, it is possible to prevent the thickness of the cladding portion at the bottom of the concave portion from becoming thinner than a specific thickness even if the thickness of the cladding portion at the bottom of the above space becomes thin. Thus, light is unlikely to leak out from the core.

In another embodiment according to the present invention, it is preferred that: a plurality of cladding portions having concave portions are formed on interface; core material is dropped down to a substrate and the above core material is extended by a mold surface, and thereby the core material is filled into the above concave portions; the above cladding portions are separately cut off from each other; and the side wall surfaces of the above space are inclined. By arranging the side wall surfaces of the above space inclined, it is possible to prevent air bubbles from being caught in core resin flowing into the above space, and also to make preferable the mold release property in forming the cladding portion. Moreover, when core material is filled into each core by expanding core material by the mold surface, core material overflowing the concave portion and flowing into the above space can flow smoothly upward on the inclined surfaces of the space once again. Thus, in the process that core material is pressed and extended to a plurality of cladding portions and filled into each concave portion, it is possible to make core material fluidity preferable, and also to make core forming property preferable. Further, by arranging the side wall surfaces of the above space inclined, it is available to ease stress concentration occurring inbetween the cladding portions and a stamper or the like in forming cladding portions. Accordingly, it is possible to prevent the optical characteristics of cladding portions from becoming uneven.

By structuring an optical communication component by using an optical wave guide according to the present invention and a connector to be a connecting means of the above optical wave guide, light leakage in optical wave guide can be reduced. Thus, it is possible to produce an optical communication component having little signal loss.

A first method for producing an optical wave guide according to the present invention may be embodied as one comprising steps of: arranging a concave portion for forming a core on the surface of a cladding substrate: arranging a space on the surface of the above cladding substrate or a mold surface of a stamper: supplying a core material to the above concave portion of the above cladding substrate: pressing the mold surface of the stamper and the above cladding substrate to each other thereby forming a core in the above concave portion, and causing the core material pinched between the cladding substrate and the stamper to be pushed out to the above space between the above concave portion and the above space. Herein, a stamper is not limited to a stamper (forming mold) to be used repeatedly. It may be such one used as a portion of an optical wave guide, after forming a core, like a second cladding component.

In the first method for producing an optical wave guide according to the present invention, the core material pinched between the cladding substrate and the stamper at the portion adjacent to the concave portion where the core is formed may flow into the space, it is possible to make the thickness of the core material thin in swift manner. As a consequence, it is possible to shorten the time required for process producing core, and also to produce an optical wave guide with little light leakage.

A second method for producing an optical wave guide according to the present invention may be embodied as one comprising steps of: arranging a concave portion for forming a core on the mold surface of a stamper; arranging a space on the surface of the above cladding substrate or the mold surface of the stamper, supplying a core material to the above concave portion of the above stamper, pressing the mold surface of the stamper and the above cladding substrate to each other thereby forming a core in the above concave portion, and causing the core material pinched between the cladding substrate and the stamper to be pushed out to the above space inbetween the above concave portion and the above space.

Also, in the second method for producing an optical wave guide according to the present invention, the core material pinched between the cladding substrate and the stamper at the portion adjacent to the concave portion where core is formed may flow into the space. By this, it is possible to make the thickness of the core material thin swiftly. As a consequence, it is possible to shorten the time required for process producing core, and also to produce an optical wave guide with little light leakage.

In one embodiment under the present invention, a cladding substrate may be formed on a supporting substrate such as a glass substrate or the like. When a cladding substrate is formed on a supporting substrate such as a glass substrate or the like, it is possible to form a cladding substrate by a stamper or the like too.

In another embodiment according to the present invention, a plurality of optical wave guides may be formed as a body, and a space for causing the core material to be pushed out may be formed on the set of the above optical wave guides. Namely, in the case where a plurality of optical wave guides are produced as a body on a wafer, it is possible to arrange space not only in optical wave guides but also in the outside area thereof.

The structural elements described above may be combined as many as possible.

BRIEF DESCRIPTION OF DRAWINGS

FIGS. 5A, 5B, 5C, and 5D show cross sectional views for explaining a method for pressing a cladding substrate onto which transparent resin has been applied, by a stamper without catching air bubbles in.

FIGS. 10A, 10B, 10C, and 10D show cross sectional views for explaining a process for pressing and expanding transparent resin into grooves and thereby forming cores.

FIGS. 15A, 15B, 15C, 15D, and 15E show cross sectional views for explaining a method for producing an optical wave guide according to another embodiment under the present invention.

FIG. 21A shows a top view of another embodiment according to the present invention, while

FIG. 25A shows a schematic diagram of another device for arranging in advance grooves and cavities in the lower cladding sheet shown in FIG. 22, while

FIG. 31A shows a cross sectional view of an optical wave guide according to another embodiment under the present invention, while

FIGS. 36A and 36B show a perspective view of a concrete structure of an optical switch shown in FIG. 34.

DETAILED DESCRIPTION

First Embodiment

Figure 1A:
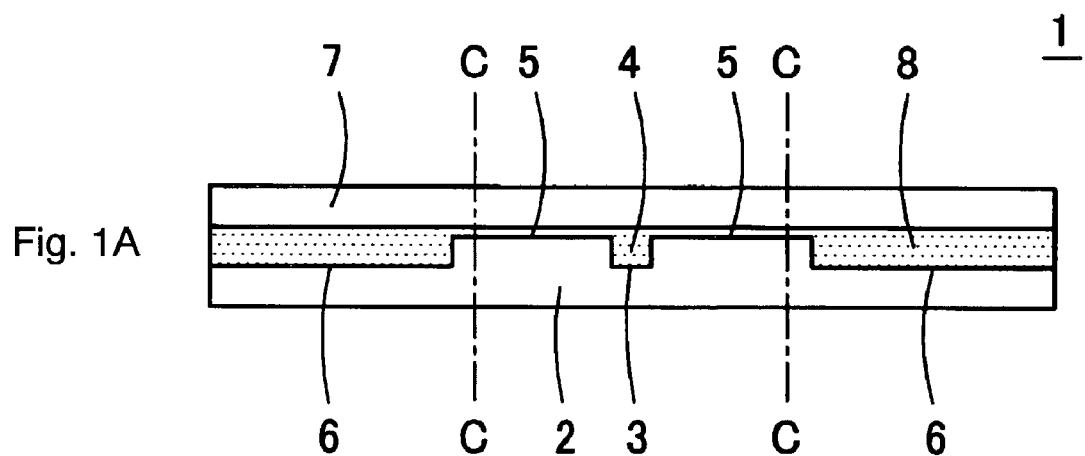
FIG. 1A shows a cross section of the structure of an optical wave guide according to one embodiment under the present invention.

FIG. 1A shows a cross section of the structure of an optical wave guide 1 according to a preferred embodiment under the present invention. In this optical wave guide 1, a core 4 is formed on a groove 3 of a cladding substrate 2. The cladding substrate 2 is formed of a transparent resin having a relatively high refractive index, and on part of the top thereof. The groove 3 to be an optical wave guide core is arranged, and a flat portion 5 is formed on the top of the cladding substrate 2 around the groove 3. At the area across the flat portion 5 to the groove 3, a relatively large cavity 6 is formed on the upper surface of the cladding substrate 2. In the groove 3, a transparent resin having a higher refractive index than that of the transparent resin used to the cladding substrate 2 is embedded to form the core 4. On the upper surface of the cladding substrate 2, an upper cladding portion 7 of a plate shape is stuck. The width and height of the core 4 may be around 6 µm for a single mode optical wave guide. The core 4 is formed of a transparent resin having a higher refractive index than that of the transparent resin employed to the upper cladding portion 7 and the cladding substrate 2. Although the transparent resin of the upper cladding portion 7 may be different from the transparent resin of the cladding substrate 2, it is preferred to employ an identical resin.

It is ideal that the upper surface of the flat portion 5 and the lower surface of the upper cladding portion 7 are closely adhered to each other. However, a transparent resin 8 that forms the core 4 may expand thinly therebetween. The thickness of the transparent resin 8 between the upper cladding portion 7 and the flat portion 5 and the width L of the flat portion 5 must be the thinness and the width enough to prevent light (signal) transmitting through the core 4 from leaking from the core 4 via the transparent resin 8 to the cavity 6, respectively. For example, the thickness of the transparent resin 8 between the upper cladding portion 7 and the flat portion 5 is set 3 μm or below, preferably 1 μm or below. While, the width of the flat portion 5 is set in the range from 5 μm to 5 mm, preferably around 50 μm.

Figure 1B:
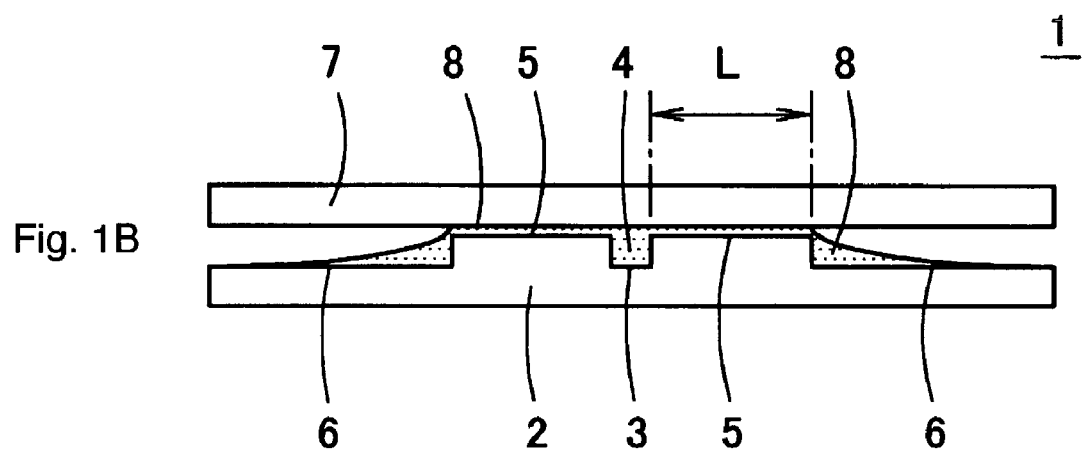
FIG. 1B shows a cross section of the structure of the same optical wave guide, wherein spaces are left in cavities.
Figure 2A:
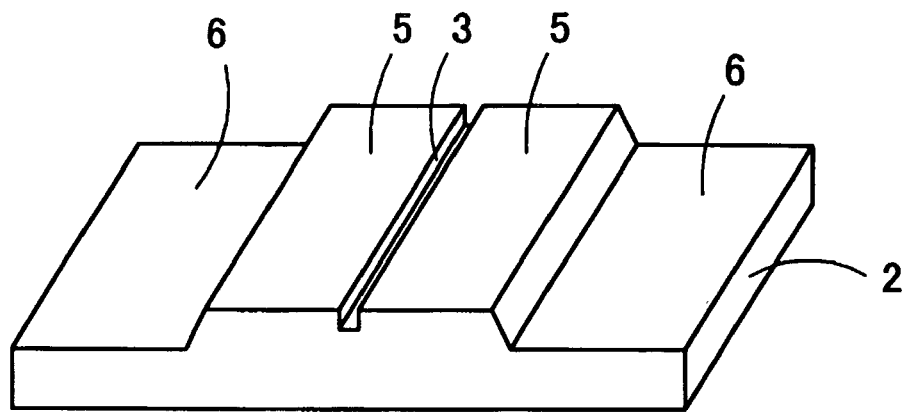
FIGS. 2A, 2B, and 2C show perspective views for explaining various forms of cladding substrate to be employed in the above optical wave guide.
Figure 2B:
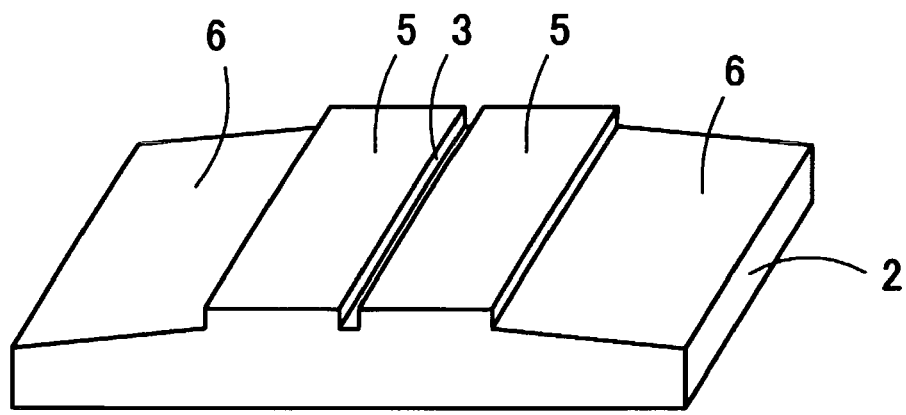
Figure 2C:
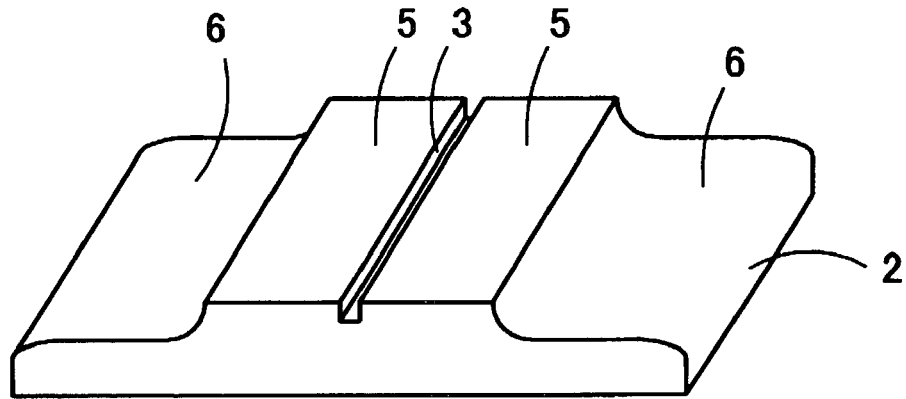

The cavity 6 is a space to receive excessive transparent resin 8 in forming the core 4. In the cavity 6, a transparent resin 8 may be filled as shown in FIG. 1A. Alternatively, empty space may exist as shown in FIG. 1B. Therefore, in the cavity 6, there should be space only enough to receive the transparent resin 8 pushed out from the groove 3. For example, the volume of the cavity 6 may be larger than the volume of the groove 3. Alternatively, the depth of the cavity 6 may be at least 10 μm or more, for example, it may be set 30 μm. In addition, although the cavity 6 appears of a rectangular in FIGS. 1A and 1B, side wall surfaces of the cavity 6 may be arranged inclined as shown in FIG. 2A. Alternatively, it may be made into sloped surfaces by tapering the bottom surface of the cavity 6 as shown in FIG. 2B. Also, it may be formed with moderately curved surfaces of circular shapes or the like as shown in FIG. 2C.

The optical wave guide 1 illustrated in FIG. 1 may be a final product or an intermediate product. Namely, it may be used as a product of optical wave guide in the shape shown in FIG. 1 as it is. Alternatively, a remaining portion that is obtained by cutting off a portion of the cavity 6 at the dot line C as shown in FIG. 1 may be used as a final product (therefore, in this case, the cavity 6 does not exist in the optical wave guide that is the final product).

Figure 3A:
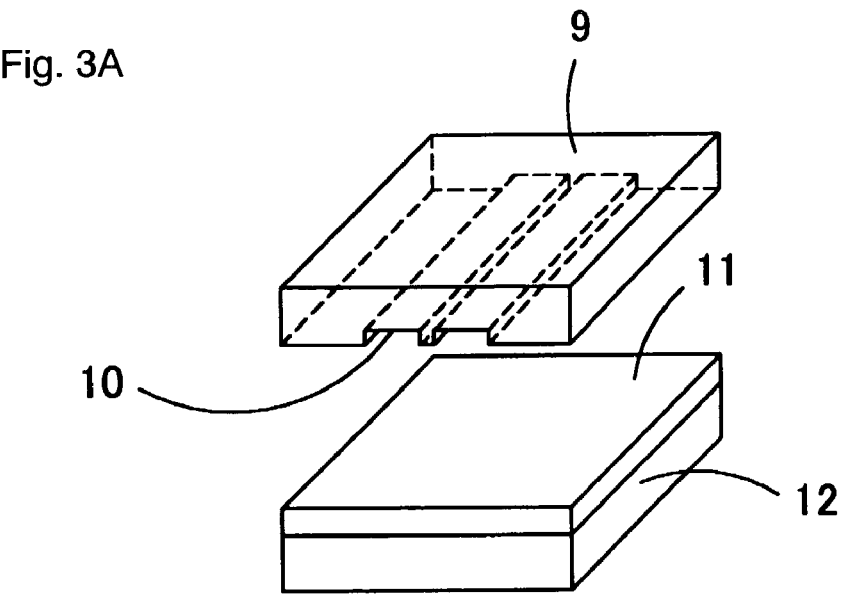
FIGS. 3A, 3B, and 3C show perspective views for explaining a process for producing a cladding substrate by use of a stamper.
Figure 3B:
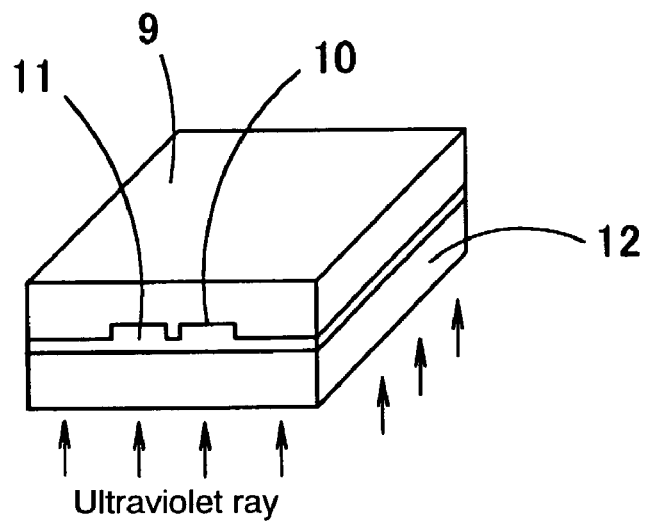
Figure 3C:
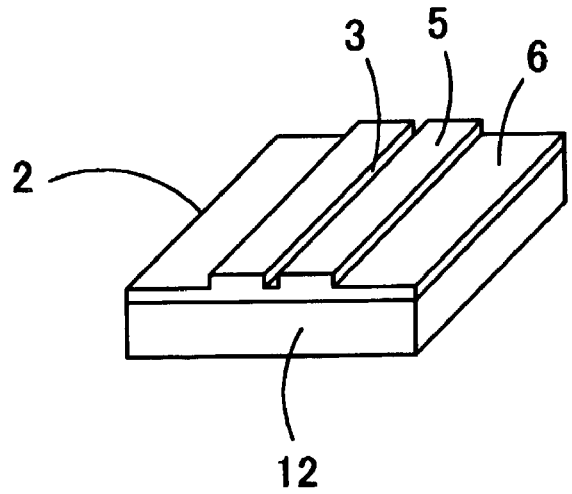

FIGS. 3A, 3B and 3C show perspective views for explaining the process to produce a cladding substrate 2 by use of a stamper 9. Also, FIGS. 4A, 4B, 4C and 4D show perspective views for explaining the process to produce an optical wave guide by use of the cladding substrate 2. The stamper 9 is made of a synthetic resin or a metal, and on the under surface of the stamper 9, concave portions 10 of the shape corresponding to the above cladding substrate 2 (i.e., the shape having negative concavity and convexity of the cladding substrate 2). Thereby, as shown in FIG. 3A, a transparent resin (ultraviolet ray hardening type cladding resin) 11 for forming the cladding substrate 2 is applied onto the glass substrate 12, and thereafter, the stamper 9 is pressed over the transparent resin 11 onto the glass substrate 12. By this, the transparent resin 11 is pinched between the concave portions 10 of the stamper 9 and the glass substrate 12, and the transparent resin 11 is pressed and expanded onto the entire inside of the concave portions 10. Subsequently, as shown in FIG. 3B, ultraviolet ray (UV ray) is radiated onto the ultraviolet ray hardening type transparent resin 11 via the glass substrate 12, and thereby the transparent resin 11 is hardened. When the transparent resin 11 hardens, the stamper 9 is released from the glass substrate 12, and, as a result, the cladding substrate 2 is formed on the glass substrate 12 as shown in FIG. 3C. On the upper surface of the cladding substrate 2 formed as explained above, flat portions 5 and cavities 6 are formed across the groove 3 as mentioned above.

Figure 4A:
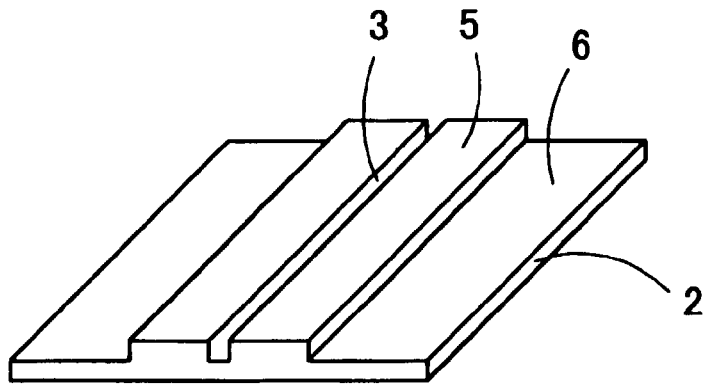
FIGS. 4A, 4B, 4C, and 4D show perspective views for explaining a process for producing an optical wave guide by use of the above cladding substrate.
Figure 4B:
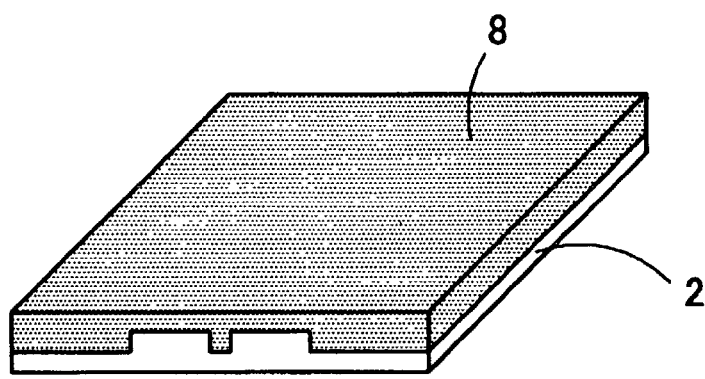

As shown in FIG. 4A, the cladding substrate 2 is released from the glass substrate 12 (or, the glass substrate 12 may be left under the cladding substrate 2), and thereafter, as shown in FIG. 4B, a transparent resin 8 (ultraviolet ray hardening type core resin) to be core material is applied onto the surface of the cladding substrate 2. Instead of application, the transparent resin 8 may be supplied onto the surface of the cladding substrate 2 by means of filling, implantation, dropping, spin coating, dip coating, or other method. At this moment, the transparent resin 8 may be applied onto the whole surface of the cladding substrate 2, or may be supplied into only the groove 3 or only the flat portions 5. Also, the transparent resin 8 may be applied into only the cavity 6 (in the case wherein the side surface of the cavity 6 is released), or may be applied so that the inside of the cavity 6 should be space (for example, application is not carried out in the cavity 6). In the case of applying the transparent resin 8 on the whole surface of the cladding substrate 2, the transparent resin 8 may be applied so that the surface thereof should be flat, and there should be no damp on the surface as shown in FIG. 4B.

Figure 4C:
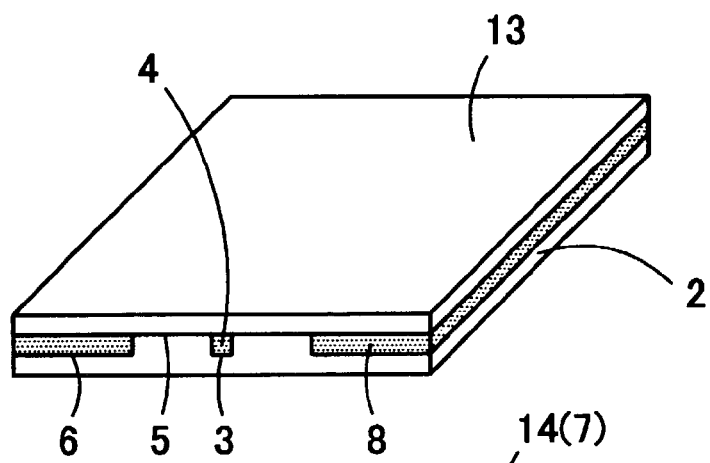
Figure 5A:
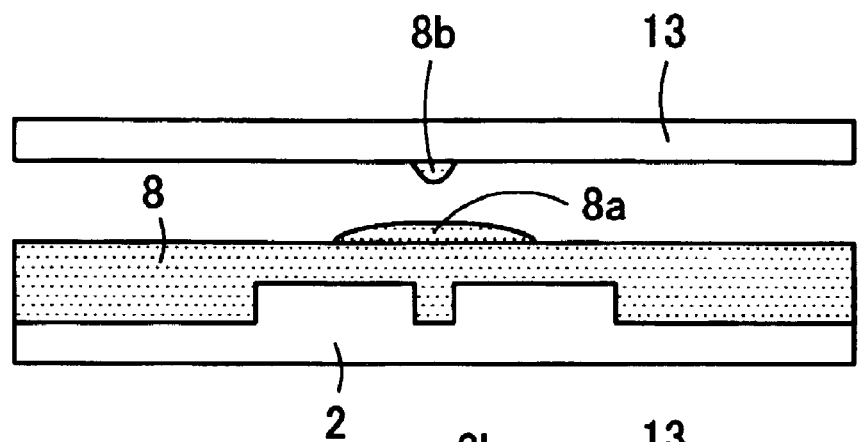
Figure 5B:
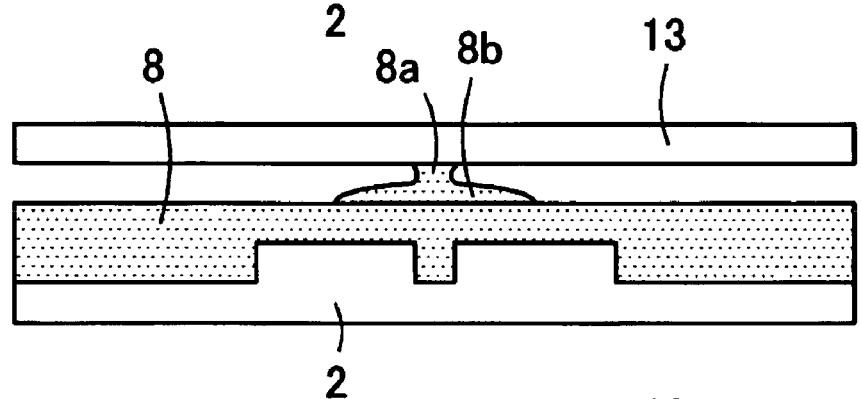
Figure 5C:
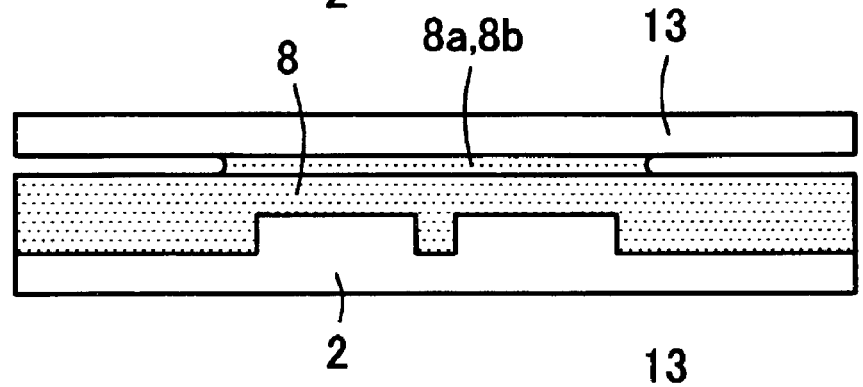
Figure 5D:
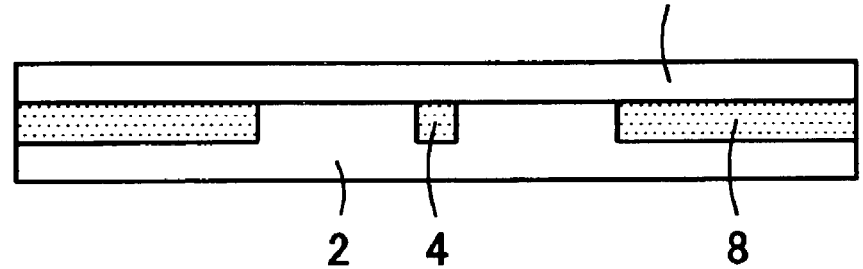

Then, a stamper 13 of a flat-like shape is pressed over the transparent resin 8 onto the cladding substrate 2, as shown in FIG. 4C, and the transparent resin 8 on the flat portions 5 is pressed and expanded thin. At this moment, to prevent air bubbles from being trapped between the stamper 13 and the transparent resin 8, a method shown in FIG. 5 is effective. Namely, as illustrated in FIG. 5A, a transparent resin 8a made of the same material as the transparent resin 8 is dropped onto the central portion of the transparent resin 8 applied on the surface of the cladding substrate 2, and the transparent resin 8b is attached onto the under surface of the stamper 13 so as to hang down therefrom. After that, the stamper 13 is lowered, and, as shown in FIG. 5B, the end of the transparent resin 8b hanging down from the under surface of the stamper 13 gets in contact with the transparent resin 8a raising on the cladding substrate 2. The stamper 13 is lowered further, then as shown in FIG. 5C, the transparent resins 8a and 8b expand from the contact points to the space between the stamper 13 and the transparent resin 8, and, as shown in FIG. 5D, the space between the stamper 13 and the transparent resin 8 is filled with the transparent resin 8 (8a, 8b) without trapping air bubbles therein.

In addition, to prevent air bubbles from being trapped in, in combination with the above method, or a method wherein the stamper 13 is pressed and also moved in horizontal direction is also effective. In FIG. 5, the method to prevent air bubbles from being trapped is explained in the case forming a single optical wave guide. In general cases, a plurality of optical wave guides are produced on a wafer or the like (Refer to FIG. 6 and its explanation). In such cases, to prevent air bubbles from being trapped, instead of attaching the transparent resins 8a and 8b to respective optical wave guides, the transparent resins 8a and 8b may be attached to the cladding substrate side and the under surface of the stamper on the central portion of a wafer, respectively. The transparent resins 8a and 8b may be expanded from the center of the wafer to its circumferential area.

In this manner, when the transparent resin 8 is pressed and expanded between the stamper 13 and the cladding substrate 2 as shown in FIG. 4C, the transparent resin 8 is filled into the groove 3 and a core 4 is formed therein. At the same time, excessive transparent resin 8 is brought out into the cavity 6 through the clearance between the flat portion 5 and the stamper 13, and finally, the transparent resin 8 between the flat portion 5 and the stamper 13 is pressed until it is made into an extremely thin layer (for example, a layer whose thickness being 3 μm or below, preferably 1 μm or below).

Normally, as the thickness of a resin becomes thinner, the flow rate and flow amount thereof will be decreased, and fluidity thereof will be deteriorated. Accordingly, the thinner the resin thickness becomes, the longer the time to be required for making the thickness thinner becomes. Specifically, when the thickness of the transparent resin 8 pinched between the under surface of the stamper 13 and the flat portion 5 is defined as h, the viscosity of the transparent resin 8 as μ, the pressing force working onto the transparent resin 8 as Δp, the width for the transparent resin 8 flow (length of the flat portion 5) as b, and the length for the transparent resin 8 flow (width of the flat portion 5) as L, then the flow rate Q for the pressed transparent resin 8 to flow through the clearance between the stamper 13 and the flat portion 5 is defined by the following equation (1).

$$Q = \frac{bh^3}{12\mu L}\Delta p \quad (1)$$

As shown in the above equation (1), the flow rate Q is proportional to the cube of the thickness h of the transparent resin 8. Accordingly, when the thickness of the transparent resin 8 becomes thin, the transparent resin 8 hardly flows through the clearance between the stamper 13 and the flat portion 5. Then, when the fluidity of the transparent resin 8 is increased by making the width L of the flat portion 5 short, it is possible to make the transparent resin 8 thin in swift manner. However, if the width L of the flat portion 5 is too shortened, light in the core 4 may leak out through the transparent resin 8 on the flat portion 5. Therefore, it is preferred to make the width L of the flat portion 5 to the range between 5 μm and 5 mm. By way of this, unnecessary transparent resin 8 between the flat portion 5 and the stamper 13 is flowed through the area of the flat portion 5 into the cavity 6. Because the groove 3 is sufficiently deep, the transparent resin 8 in the groove 3 may flow smoothly in the groove 3 without flow rate decreasing even when pressed with the stamper 13, and it is possible to distribute the transparent resin 8 evenly into the groove 3.

Supposing that a model according to the present invention wherein a 6-inch substrate was used and flat portions whose width L being 500 μm were formed on both sides of the concave portion, and a cavity was formed in the outside thereof, and another model according to the prior art wherein flat portions of a sufficient width were formed on both sides of the concave portion and a cavity was not formed. Further, a case wherein resin of viscosity 160 cp was applied to the above models, respectively, and the models were pressed with a stamper thereby load of 180 kg was impressed onto the models was assumed. Time required for the resin to become thin enough to get a specified film thickness was obtained by simulation, and the results are as shown below.

(1) Time required for making the resin thickness from 4 μm to 3 μm

Case of the model according to the prior art: around 2 hours

Case of the model according to the present invention: around 0.1 second (2) Time required for making the resin thickness from 3 μm to 2 μm Case of the model according to the prior art: around 4.6 hours Case of the model according to the present invention: around 0.2 second (3) Time required for making the resin thickness from 2 μm to 1 μm Case of the model according to the prior art: around 15.5 hours Case of the model according to the present invention: around 0.6 second (4) Time required for making the resin thickness from 1 μm to 0.5 μm Case of the model according to the prior art: around 66 hours Case of the model according to the present invention: around 2.5 seconds As shown above, according to the model under the present invention, the time required for making the film thickness into a desired thinness has appeared to be nearly 1/90000 in comparison with the other model according to the prior art.

As is ascertainable from the above, in this process, by pressing the transparent resin 8 sufficiently, and reducing the thickness of the transparent resin 8 pinched between the flat portions 5 and the stamper 13, the thickness of the resin 8 is reduced so that light signal transmitting through the core 4 does not leak out via the layer of the transparent resin 8. (It is preferable that the transparent resin 8 does not remain between the stamper 13 and the flat portions 5). As a result, it is possible to produce an optical wave guide 1 that does not cause filling shortage of the core 4 and light leakage (signal leakage), by reproduction method (stamper method), in short time and in easy and simple manners.

In this manner, after the transparent resin 8 covering the surface of the flat portions 5 is made sufficiently thin, ultraviolet ray is radiated onto the ultraviolet hardening type transparent resin 8 from the back surface side of the cladding substrate 2, and thereby the transparent resin 8 is hardened. In the case where the stamper 13 is made of a light transmitting type material, ultraviolet ray may be radiated onto the transparent resin 8 over the stamper 13, and the transparent resin 8 may be hardened. By hardening the transparent resin 8 in such a status where the transparent resin 8 is pressed by the stamper in this manner, Advantageously, it is possible to decrease hardening contraction of the transparent resin 8.

Figure 4D:
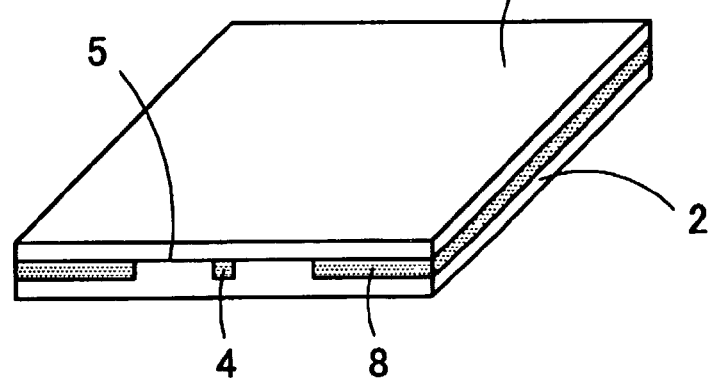

Then, after the stamper 13 is released from the cladding substrate 2, as shown in FIG. 4D, a transparent ultraviolet ray hardening type cladding resin 14 is applied onto the hardened transparent resin 8 by a spin coating method, dip coating method, or the like. Ultraviolet ray is radiated to harden the cladding resin 14, and the upper cladding portion 7 is made to contact onto the upper surface of the transparent resin 8. Finally, an optical wave guide 1 as the purpose is obtained.

As explained above, the case of a single optical wave guide 1 has been explained. In actual production processes, a plurality of optical wave guides are produced at one time, and then divided into individual optical wave guides in final process. For example, in the preferred embodiment shown in FIG. 6, a plurality of optical wave guides 1A are arranged with intervals on a sheet of large glass substrate (wafer), a cladding substrate, or the like. The optical wave guides 1A herein comprise a core 4 (groove 3) and flat portion 5, and may not include a cavity 6. The cavity 6 (the area where the cavity 6 is formed is shown shaded in FIG. 6, as well as FIG.

Figure 8:
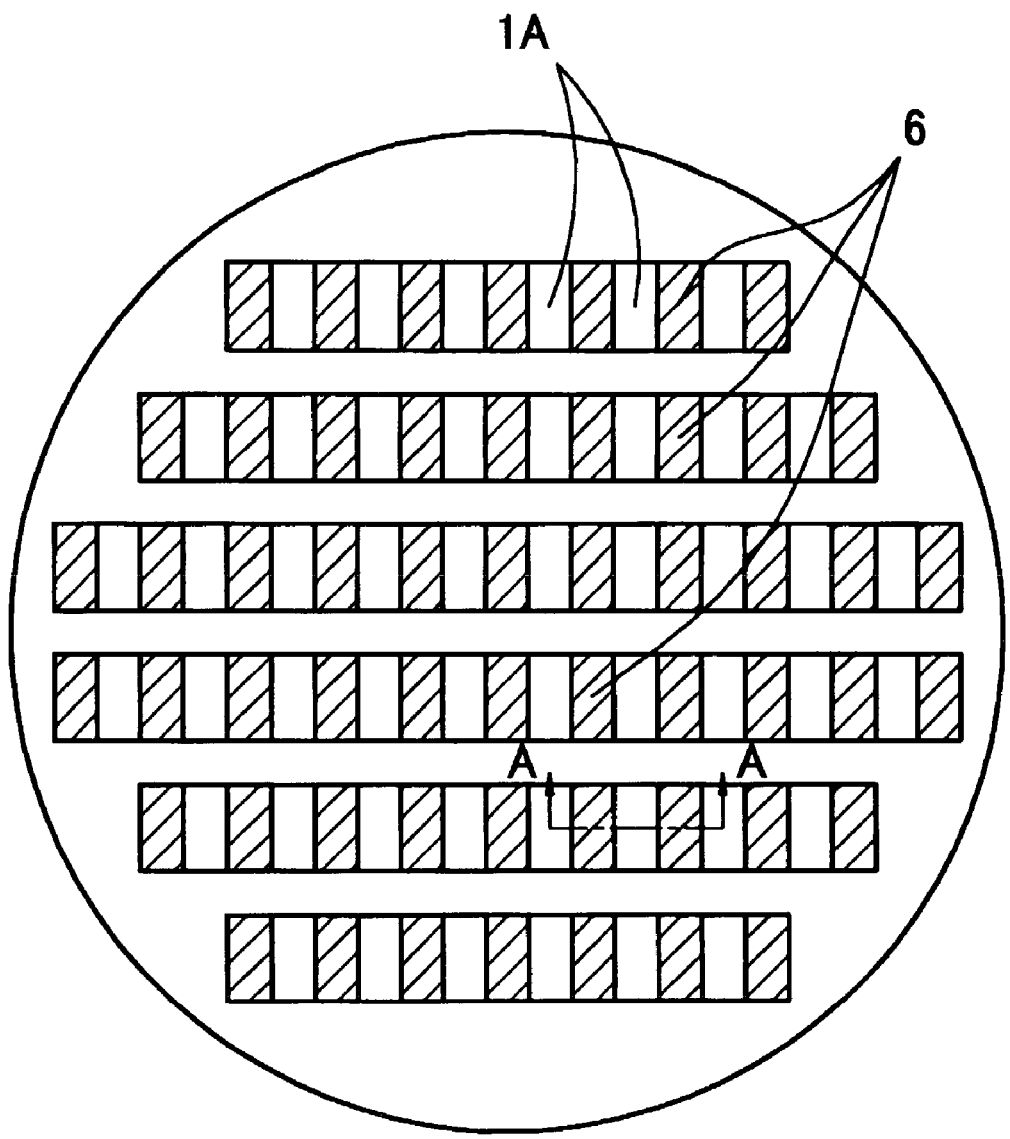
FIG. 8 shows a top view for explaining further another method for forming cavities on a wafer on which optical wave guides have been formed.

7 and FIG. 8) is formed on almost all of other area than areas where optical wave guides 1A are formed. In particular, the cavity 6 reaches to the external circumference of the substrate and is released to the outside at the external circumferential surface of the substrate. When the transparent resin 8 is supplied onto the cladding substrate, it is important to control the application amount of the transparent resin 8, and to adjust so that the transparent resin does not run off the edge of the substrate. In such a structure shown in FIG. 6, excessive transparent resin 8 is discharged from the edge of the substrate. Also, by opening the cavity 6 at the edge of the substrate, the pressure of the transparent resin 8 in the cavity 6 will not increase, and thereby it is possible to discharge unnecessary transparent resin 8 smoothly from the groove 3 and flat portion 5.

Figure 6:
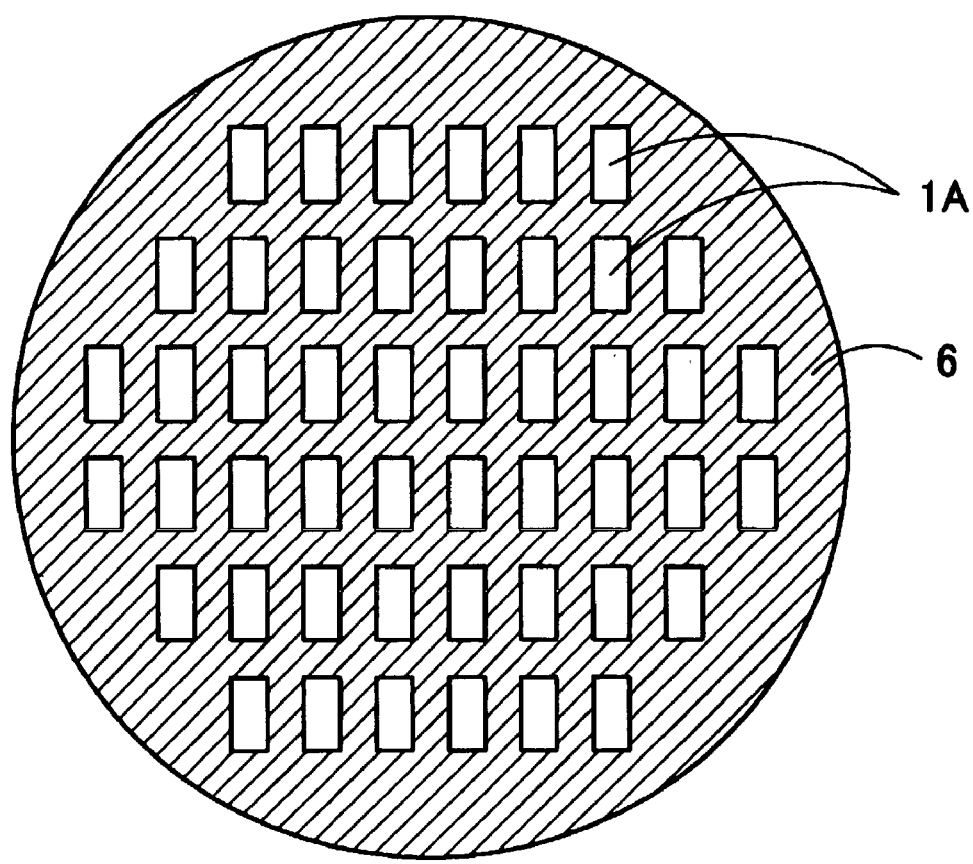
FIG. 6 shows a top view for explaining a method for forming cavities on a wafer on which optical wave guides have been formed.
Figure 7:
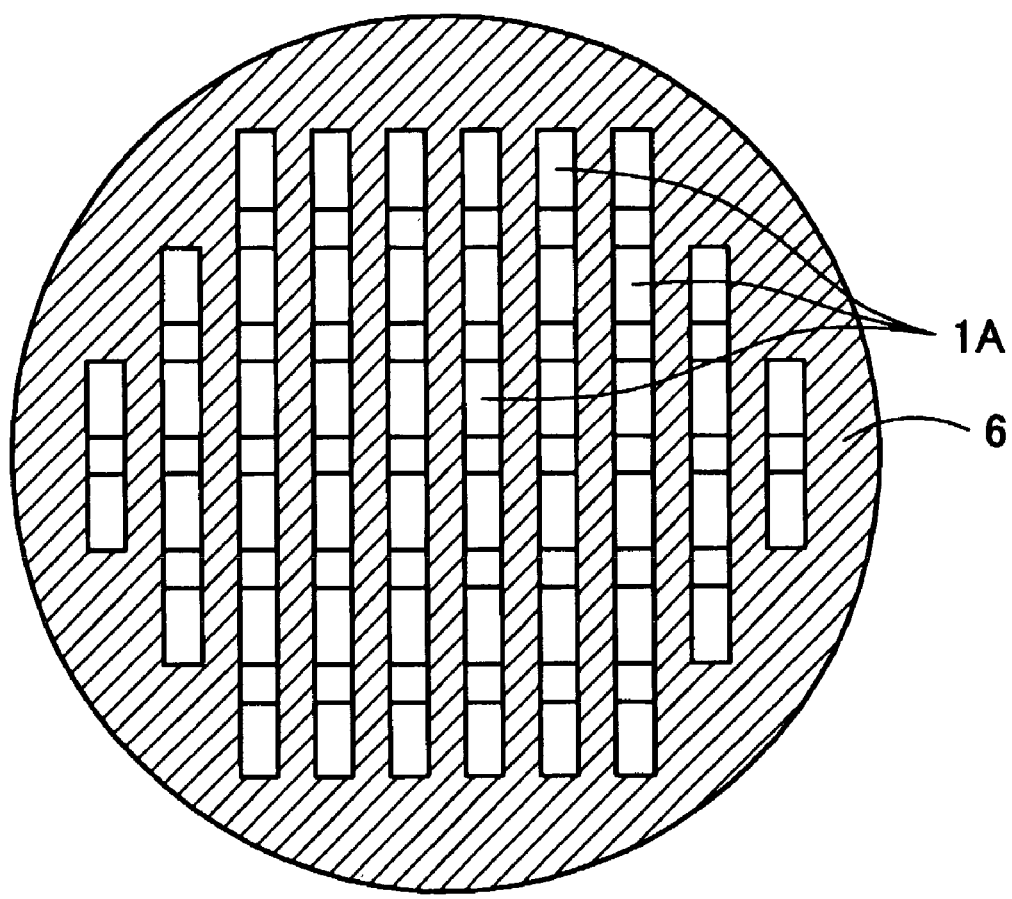
FIG. 7 shows a top view for explaining another method for forming cavities on a wafer on which optical wave guides have been formed.

Further, the cavities 6 may not be formed in grid shape as shown in FIG. 6. It may be formed also as continuous in one direction as shown in FIG. 7.

Figure 9:
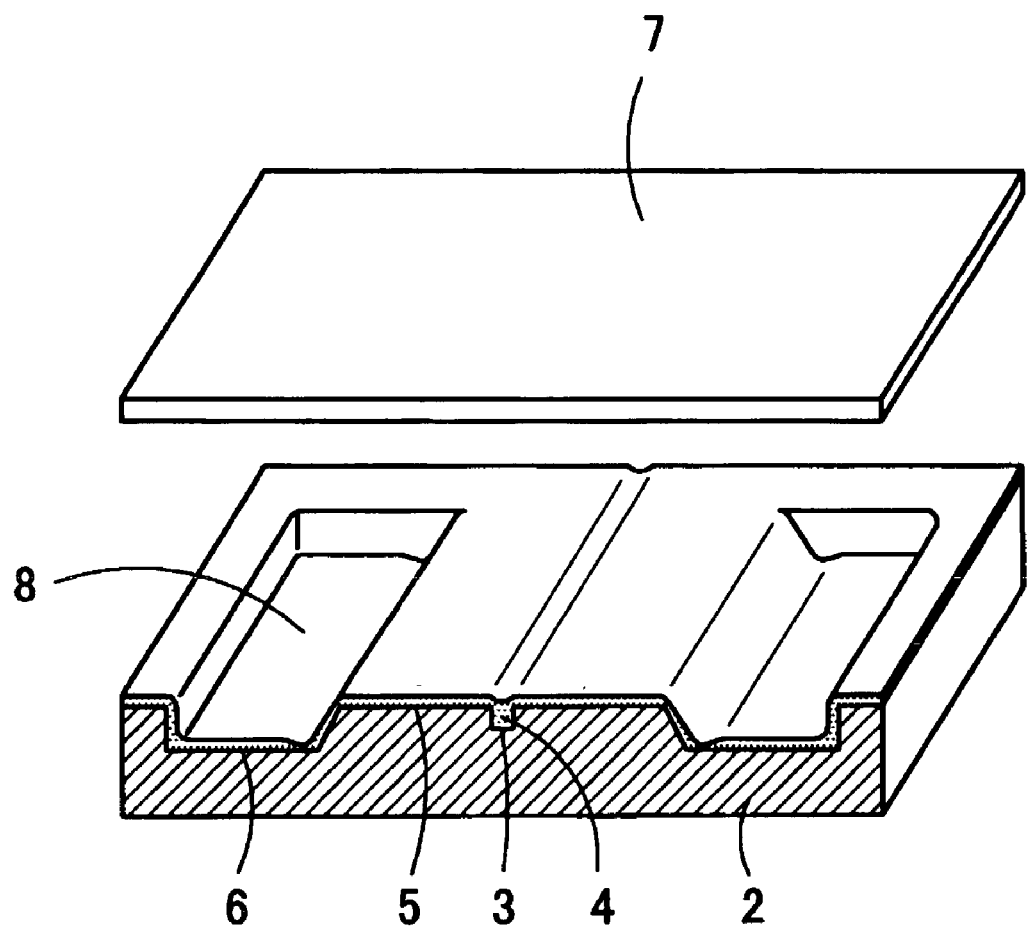
FIG. 9 shows a perspective view of a cutaway at line A–A in FIG. 8.

Furthermore, the cavities 6 may not be connected continuously. As shown in FIG. 8, the cavities 6 may be arranged as if small ponds lie scattered over the entire substrate. A perspective view at the cross section line A–A in this case is shown in FIG. 9. In FIG. 8, when the method that the transparent resin 8 is applied onto the whole surface of the cladding substrate 2 and pressing is made with the upper cladding portion 7 is employed, air bubbles may be trapped between the transparent resin 8, or the core 4, and the upper cladding portion 7. Therefore, in most cases, the transparent resin 8 is dropped onto the central portion of the cladding substrate 2 having area of several optical wave guides, and the transparent resin 8 is pressed with the upper cladding portion 7 and expanded from the central portion to circumferential portion. By this, the transparent resin 8 is filled into each groove 3.

Further, when pressing to extend the transparent resin 8 dropped onto the central portion, the transparent resin 8 that is pushed out from the groove 3 and invades the cavities 6 must be pressed out of the groove 3, which is positioned in the outside thereof. However, if the edges of the cavities 6 are of vertical surfaces, the transparent resin 8 is prevented by the side wall surfaces of the cavities 6. As a result, the flow of the transparent resin 8 may be deteriorated, and air bubbles may be trapped in the transparent resin 8.

Further, if the side wall surfaces of the cavities 6 are vertical, the thickness of the cladding substrate 2 changes rapidly therein. Thus, when forming the cladding substrate 2 by pressing a stamper, stress concentration occurs at an end area around to side wall surfaces of the cavities 6 among the interface (i.e., surface of the area of large thickness where the groove 3 is formed) of the cladding substrate 2. Accordingly, side wall surfaces to be vertical surfaces may be warped in a convex shape, or concave shape, and deformed unevenly. As a result, the cladding substrate 2 is deformed, and further, it is difficult to forecast how it is deformed. Furthermore, at the occurrence of deformation in side wall surfaces of the cladding substrate 2, it may be difficult to release the stamper, and the cladding substrate 2 may be damaged if the stamper is released forcibly, and dust may occur. At occurrence of deformation in the area where the groove 3 is formed among the cladding substrate 2, the core shape is also deformed, leading to fluctuations in characteristics owing to loss such as light leakage and so forth. At occurrence of stress concentration in the cladding substrate 2, polarization dependency of wave guided light occurs, and characteristics of PDL (Polarization Dependent Loss) may be deteriorated. Then, other optical characteristics may become uneven, as a result, abnormal external appearances may occur, and characteristics may be fluctuated greatly owing to temperature changes.

Accordingly, in this preferred embodiment, as shown in FIG. 10A, side wall surfaces 6a of the external circumference of the cavities 6 are inclined, and thereby fluidity of the transparent resin 8 is improved. Namely, as shown in FIG. 10A, the transparent resin 8 is dropped onto the central portion of the cladding substrate 2, the transparent resin 8 is pressed by the upper cladding portion 7, and, by the transparent resin 8 filled into the groove 3, core 4 is formed. Most of the transparent resin 8 overflowing the groove 3 flows along the inclined surfaces of cavities 6 and flows into cavities 6 as shown in FIG. 10B. When the transparent resin 8 is further expanded, as shown in FIG. 10C, the transparent resin 8 in the cavities 6 goes upward smoothly on the inclined surfaces, flows into the adjacent grooves 3, and is filled therein. By repetition of such processes, as shown in FIG. 10D, the transparent resin 8 is filled into the grooves 3 all over the cladding substrate 2 and the core 4 is formed. Subsequently, the transparent resin 8 is hardened by radiation of ultraviolet ray, and the whole wafer is cut into individual pieces, and thereby respective optical wave guides 1 are obtained.

Further, if the side wall surfaces 6a of the cavities 6 are inclined upward and outward, in forming the cladding substrate 2 by the stamper method or the like, it is possible to make the releasing property of stamper enhanced. Thus, it is easy to release the cladding substrate 2 from the stamper. (refer to FIG. 31B.) When the releasing property of the stamper is increased preferably, not only it facilitates forming the cladding substrate 2, but also it is eliminated to scratch the cladding substrate 2 by the edge of the stamper and to cause damage on the surface of the cladding substrate 2. Further, it is possible to eliminate attachment of scratch or dust and to improve the yield of optical wave guides. Furthermore, in expanding the transparent resin 8, it is possible to prevent air bubbles from being trapped in corners of the cavities 6.

Moreover, if the side wall surfaces 6a of the cavities 6 are inclined, it makes it possible to even out resin deformation in forming the cladding substrate 2, and it is possible to control stress occurring in the cladding substrate 2. As a result, the optical characteristics of the inside of the cladding substrate 2 become uniform, and accordingly it is possible to improve temperature characteristics that are weak points of polymer wave guide, and increase the reliability of optical wave guides. Further, since stress of the cladding substrate 2 is under control, it is possible to prevent cracks from occurring on the cladding substrate 2, and also to restrain deformation at forming.

As mentioned above, by providing the side wall surfaces 6a of the cavities 6, the transparent resin 8 can be expanded smoothly over the whole surface of the cladding substrate 2, and it is possible to produce optical wave guides 1 with preferable quality at preferable yield.

With regard to the inclination of the side wall surfaces 6a of the cavities 6, the inclination to a normal line on the cladding substrate 2 may be 7 degree or higher. To improve the releasing property of the stamper, the inclination may be set 30 degrees or higher. However, if the inclination of the side wall surfaces 6a of the cavities 6 are too large, the surface area of the cladding substrate 2 becomes large. Thus, it is assumed that the range from 10 degrees to 15 degrees is suitable. Also, the inclined side wall surfaces 6a of the cavities 6 are not limited to flat surfaces. They may be curved surfaces.

The effects of inclination of the side wall surfaces 6a of the cavities 6 in the case where the cavities 6 are independent respectively is explained. As is clear from the above reason, even in the case where adjacent cavities 6 are connected to each other as shown in FIG. 6 and FIG. 7, by providing the side wall surfaces 6a of the cavities 6 inclined, the effect that the transparent resin 8 flows smoothly from the cavities 6 into the groove 3 may be attained.

In the above preferred embodiment, the transparent resin 8 on the flat portions 5 is made thin by pressurizing the transparent resin 8 by the stamper 13. While, by use of a formed upper cladding portion 7, or a substrate wherein an upper cladding layer is formed on its under surface, the transparent resin 8 may be pressed thin. According to such a method, the stamper 13 is unnecessary, it is possible to decrease the number of processes. In the above preferred embodiment, the ultraviolet ray hardening type transparent resins 8 and 11 and the cladding resin 14 are employed. Instead of the above resins, a thermal hardening type resin may be employed. Further, the process for forming the cladding substrate 2 is not limited to the reproduction method using the stamper 9, but the cladding substrate 2 may be also formed by thermal pressing or etching. For the transparent resin 8 for core and the transparent resin 11 for cladding, and cladding resin 14, PMMA (polymethyl methacrylate), photo-PCB (photo-curable polychlorobiphenyl), alicyclic epoxy resins, photo-cationic polymerization initiators, acrylate-type resins (containing Si, F), photo-radical polymerization initiators, fluorinated polyimide, and so forth may be employed. (The materials are not limited to photo hardening type. In the meanwhile, for the transparent resin 8 for core, it is necessary to use resin having a larger refractive index than those of the transparent resin 11 for cladding and the resin 14 for cladding.)

By forming the stamper 13 of a soft material, it is possible to uniformly press the surface of the cladding substrate 2 even if there are a bit warp, bending, or concavity or convexity thereon.

Without arranging the upper cladding portion 7 at final stage, optical wave guides in status where only the stamper 13 is released may be made as final products of optical wave guides. In this case, air functions as a cladding layer.

Second Embodiment

Figure 11A:
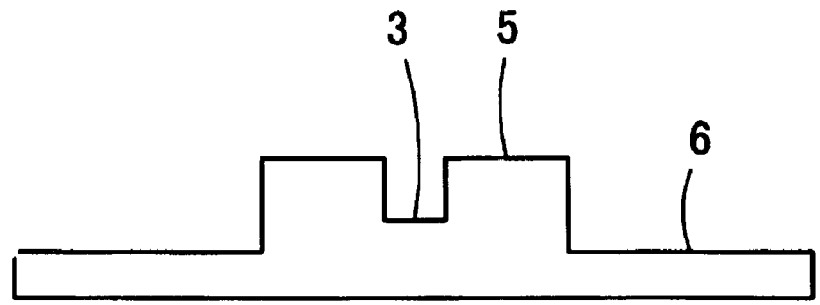
FIGS. 11A, 11B, 11C, and 11D show cross sectional views for explaining a method for producing an optical wave guide according to another embodiment under the present invention.
Figure 11B:
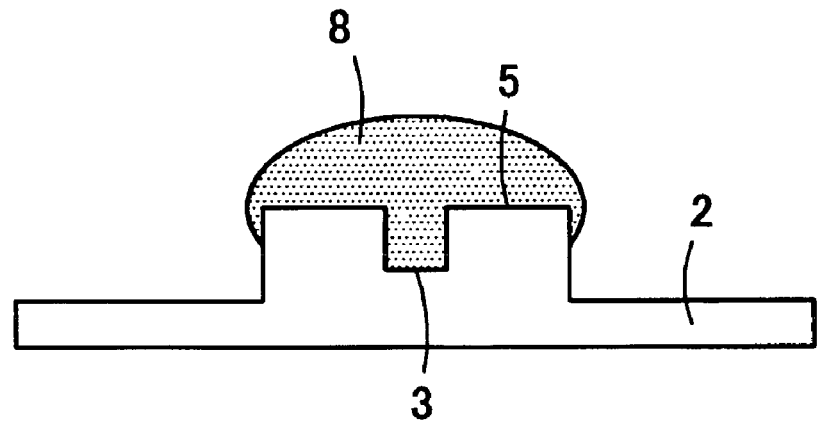
Figure 11C:
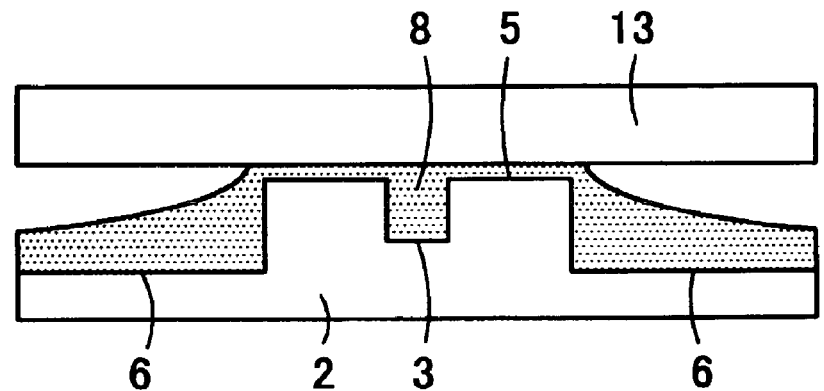
Figure 11D:
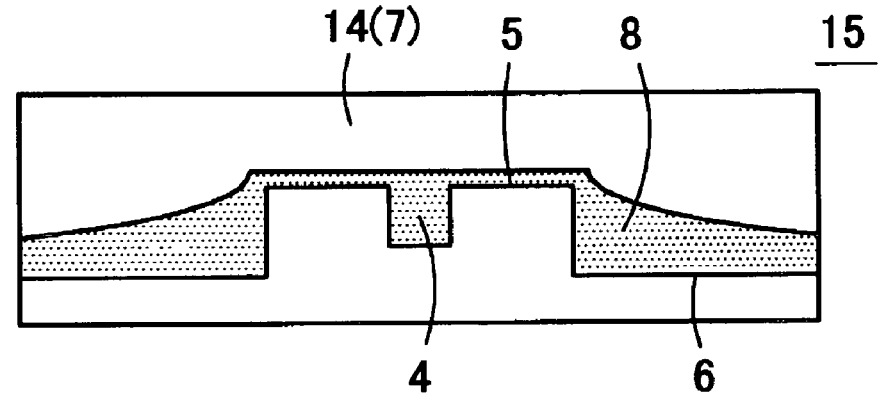

FIGS. 11A, 11B, 11C, and 11D show cross sectional views for explaining a method for producing an optical wave guide 15 according to another preferred embodiment under the present invention. In this preferred embodiment, after the cladding substrate 2 having the groove 3, the flat portions 5, and the cavity 6 is produced by, for example, the process shown in FIG. 3 (FIG. 11A), an ultraviolet ray hardening type transparent resin 8 is dropped onto this cladding substrate 2 (FIG. 11B). Subsequently, the transparent resin 8 on the cladding substrate 2 is pressed by the stamper 13, and thereby the transparent resin 8 is filled into the grooves 3 and the transparent resin 8 on the flat portions 5 is expanded thin, and excessive transparent resin 8 is flowed into the cavities 6 (FIG. 11C). A specific pressure is imposed on the transparent resin 8 until the film thickness of the transparent resin 8 between the flat portions 5 and the stamper 13 becomes a desired film thickness. After a specific time, ultraviolet ray is radiated from the back surface side of the cladding substrate 2 onto the transparent resin 8, and thereby the transparent resin 8 is hardened. After the transparent resin 8 hardens, the stamper 13 is released, an ultraviolet ray hardening type cladding resin 14 is applied onto the transparent resin 8, and ultraviolet ray is radiated for hardening. (FIG. 11D).

In this case, also, to prevent air bubbles from being trapped, the transparent resin 8 is raised on the cladding substrate 2 as shown in FIG. 11B, while the same transparent resin may be attached onto the under surface of the stamper 13 to hang down there. (Refer to FIG. 5.) After pressing by the stamper 13, the stamper may be moved horizontally.

Third Embodiment

Figure 12A:
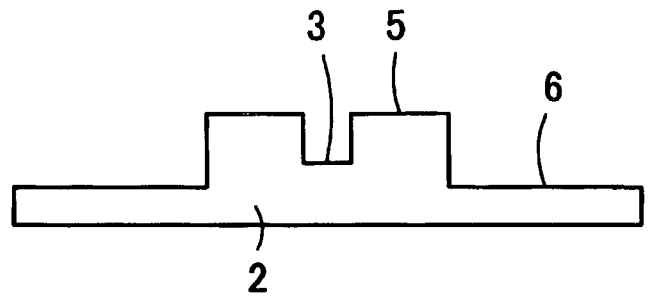
FIGS. 12A, 12B, 12C, 12D, and 12E show cross sectional views for explaining a method for producing an optical wave guide according to another embodiment under the present invention.
Figure 12B:
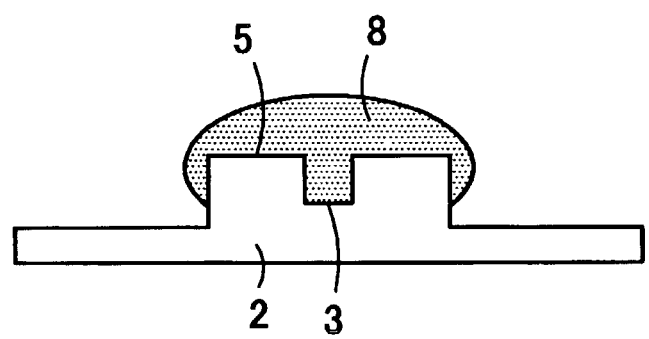
Figure 12C:
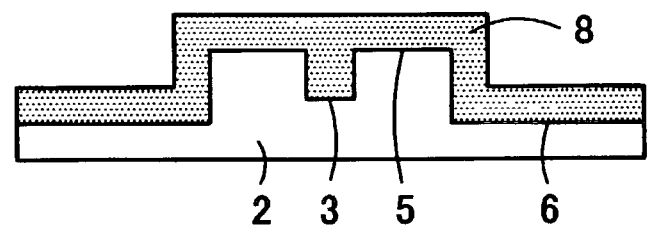

FIGS. 12A, 12B, 12C, 12D, and 12E show cross sectional views for explaining a method for producing an optical wave guide 16 according to further another preferred embodiment under the present invention. In this preferred embodiment, after the cladding substrate 2 having the groove 3, the flat portions 5, and the cavity 6 is produced by, for example, the process shown in FIG. 3 (FIG. 12A), an ultraviolet ray hardening type transparent resin 8 is dropped onto this cladding substrate 2 (FIG. 12B). Subsequently, the transparent resin 8 is extended over the cladding substrate 2 by spin coating the cladding substrate 2 in light matter or spraying air onto the transparent resin 8 (FIG. 12C). Then, the transparent resin 8 on the cladding substrate 2 is pressed by the stamper 13, and thereby the transparent resin 8 is filled into the grooves 3 and the transparent resin 8 on the flat portions 5 is expanded thin.

Figure 12D:
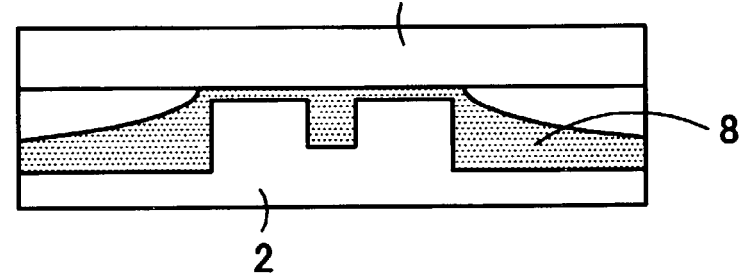
Figure 12E:
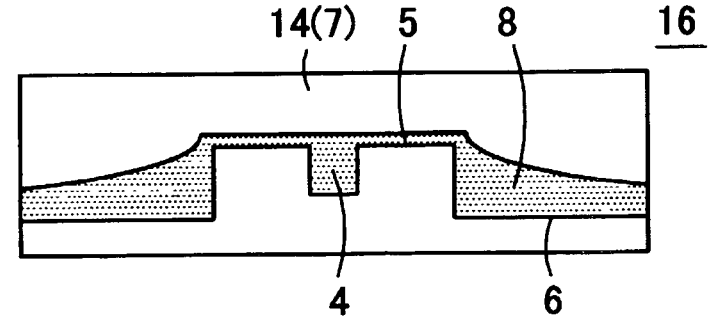

Thus, excessive transparent resin 8 is flowed into the cavities 6 (FIG. 12D). By expanding the transparent resin 8 by means of spin coating or air blowing, a space is made in the cavities 6. Thus, when the transparent resin 8 is pressurized by the stamper 13, the transparent resin 8 on the flat portions 5 may easily move to the area with space (cavities 6). Accordingly, it is possible to make the film thickness of the transparent resin 8 on the flat portions 5 thin swiftly. In addition, if the depth of the cavities 6 is formed sufficiently deep, it is more effective. Thereafter, a specific pressure is imposed on the transparent resin 8 until the film thickness of the transparent resin 8 between the flat portions 5 and the stamper 13 becomes a desired film thickness. After a specific time, ultraviolet ray is radiated from the back surface side of the cladding substrate 2 onto the transparent resin 8, and thereby the transparent resin 8 is hardened. After the transparent resin 8 hardens, the stamper 13 is released, and an ultraviolet ray hardening type cladding resin 14 is applied onto the transparent resin 8. Then, ultraviolet ray is radiated for hardening. (FIG. 12E).

Fourth Embodiment

Figure 13A:
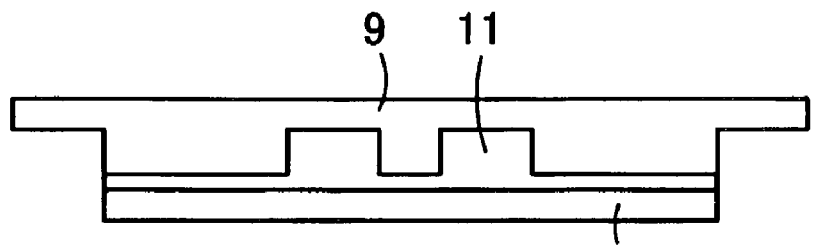
FIGS. 13A, 13B, 13C, 13D, 13E, and 13F show cross sectional views for explaining a method for producing an optical wave guide according to another embodiment under the present invention.
Figure 13B:
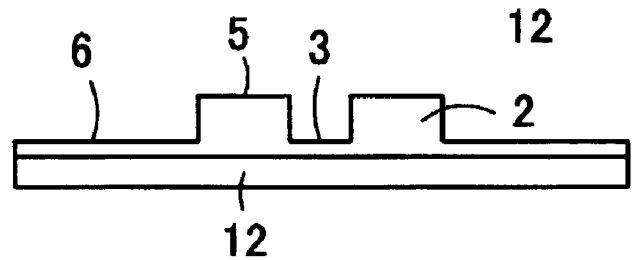
Figure 13C:
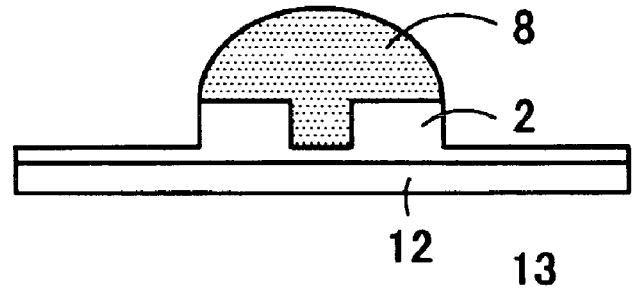
Figure 13D:
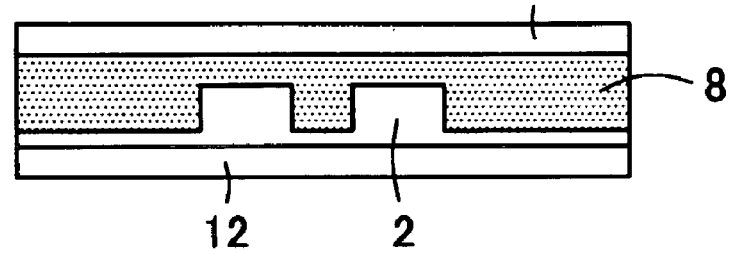
Figure 13E:
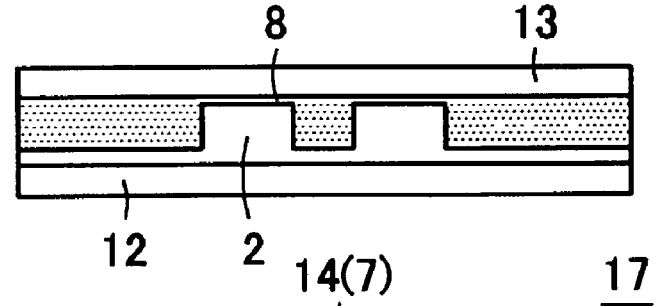

FIGS. 13A, 13B, 13C, 13D, 13E, and 13F show cross sectional views for explaining a method for producing an optical wave guide 17 according to still further another preferred embodiment under the present invention. In this preferred embodiment, the transparent resin 11 dropped onto the glass substrate 12 is pressed by the stamper 9 (FIG. 13A), and ultraviolet ray is radiated onto the transparent resin 11, thereby the cladding substrate 2 is formed on the glass substrate 12 (FIG. 13B). On the upper surface of the cladding substrate 2, the groove 3 and the flat portions 5 and the cavities 6 are formed. Thereafter, an ultraviolet ray hardening type transparent resin 8 is dropped onto this cladding substrate 2 (FIG. 13C). Then, the transparent resin 8 on the cladding substrate 2 is pressed by the stamper 13, and thereby the transparent resin 8 is filled into the grooves 3 and the transparent resin 8 on the flat portions 5 is expanded thin, and excessive transparent resin 8 is flowed into the cavities 6 (FIG. 13D).

Figure 13F:
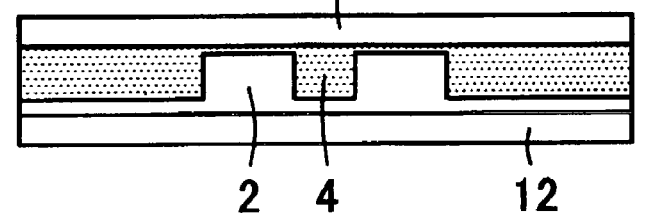

Thereafter, a specific pressure is imposed on the transparent resin 8 until the film thickness of the transparent resin 8 between the flat portions 5 and the stamper 13 becomes a desired film thickness. After a specific time (FIG. 13E), ultraviolet ray is radiated from the back surface side of the cladding substrate 2 onto the transparent resin 8, and thereby the transparent resin 8 is hardened. After the transparent resin 8 hardens, the stamper 13 is released, and an ultraviolet ray hardening type cladding resin 14 is applied onto the transparent resin 8. Then, ultraviolet ray is radiated for hardening. (FIG. 13F).

As seen in optical wave guides produced in these manners, the cavities 6 are not necessarily arranged in the cladding substrate 2, but they may be arranged out of the cladding substrate 2, for example, on the glass substrate 12 and the like.

Fifth Embodiment

Figure 14A:
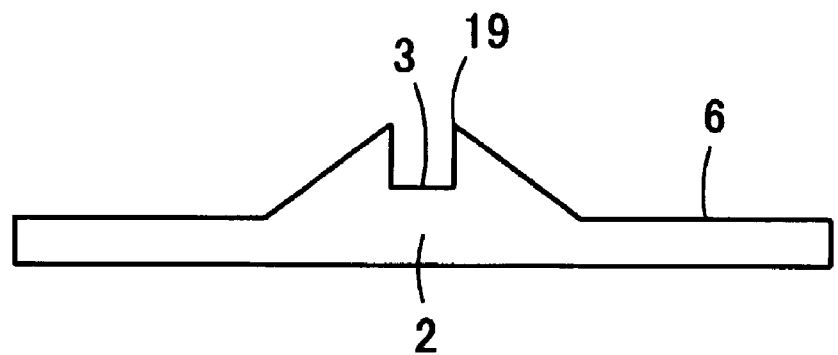
FIGS. 14A, 14B, 14C, and 14D show cross sectional views for explaining a method for producing an optical wave guide according to another embodiment under the present invention.
Figure 14B:
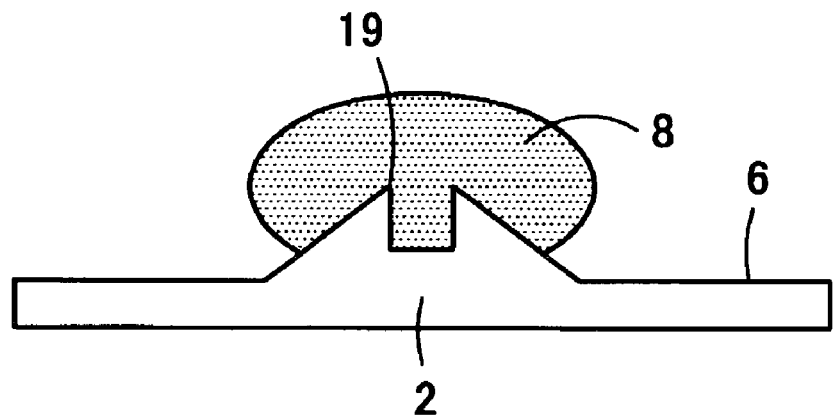

FIGS. 14A, 14B, 14C, and 14D show cross sectional views for explaining a method for producing an optical wave guide 18 according to still further another preferred embodiment under the present invention. In this preferred embodiment, in a cladding substrate 2 fresh after production, as shown in FIG. 14A, the portion between the groove 3 and the cavity 6 is formed into a triangle whose top end is shaped into a pointed portion 19, and the flat portion 5 is not formed therein. An ultraviolet ray hardening type transparent resin 8 is dropped onto this cladding substrate 2 (FIG. 14B). Then, the transparent resin 8 on the cladding substrate 2 is pressed by the stamper 13, and thereby the transparent resin 8 is filled into the grooves 3.

Figure 14C:
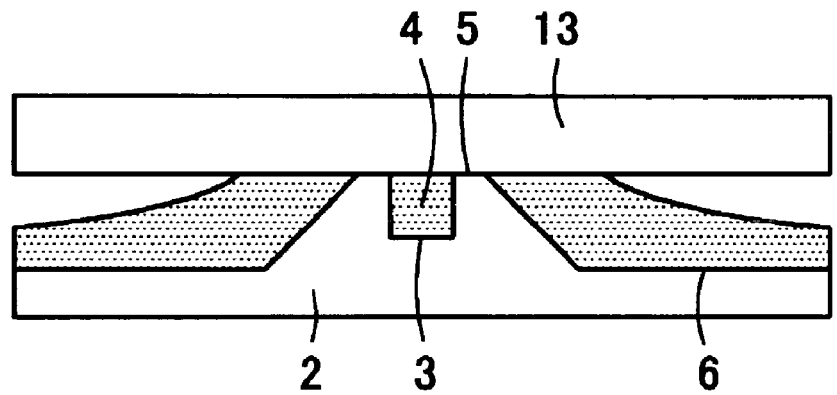
Figure 14D:
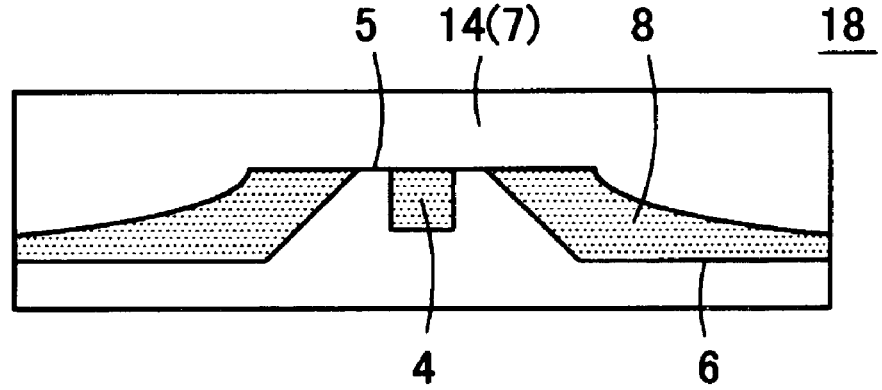

At the same time, by pressing force of the stamper 13, the pointed portions 19 at both sides of the groove 3 are pressed flat, thereby flat portions 5 are formed on both sides of the groove 3. The transparent resin 8 on the flat portions 5 is expanded thin, while excessive transparent resin 8 is flowed into the cavities 6 (FIG. 14C). Thereafter, ultraviolet ray is radiated from the back surface side of the cladding substrate 2 onto the transparent resin 8, and thereby the transparent resin 8 is hardened. After the transparent resin 8 hardens, the stamper 13 is released, and an ultraviolet ray hardening type cladding resin 14 is applied onto the transparent resin 8. Then, ultraviolet ray is radiated for hardening. (FIG. 14D).

FIGS. 15, 15B, 15C, 15D, and 15E show cross sectional views for explaining a method for producing an optical wave guide 20 according to still further another preferred embodiment under the present invention. In this preferred embodiment, after an ultraviolet ray hardening type transparent resin 11 is applied onto the glass substrate 12 (FIG. 15A), the transparent resin 11 is pressed by the stamper 9 to form the glass substrate 12 (FIG. 15B). In the stamper 9 employed herein, a narrow protrusion 22 is arranged at the bottom end of the cavity forming portion 21. Thus, when the stamper 13 is pressed onto the transparent resin 11, the end of the protrusion 22 goes into the transparent resin 11 and contacts the glass substrate 12. Accordingly, the distance between the stamper 13 and the glass substrate 12 is kept in a specific distance, and it is possible to attain the thickness precision of the glass substrate 12.

When the cladding substrate 2 is formed with precise thickness, ultraviolet ray is radiated via the glass substrate 12 onto the transparent resin 11 and thereby the cladding substrate 2 is hardened. When the cladding substrate 2 hardens, the stamper 13 is released from the cladding substrate 2. Thereafter, the transparent resin 8 is applied onto the cladding substrate 2 (FIG. 15C), and the transparent resin 8 on the cladding substrate 2 is expanded thin by the stamper 13. Thus, excessive transparent resin 8 is flowed into the cavities 6 (FIG. 15D). Then, ultraviolet ray is radiated via the glass substrate 12 onto the transparent resin 8, and thereby the transparent resin 8 is hardened. When the core 4 is formed in the groove 3 in this manner, the stamper 13 is released from the transparent resin 8, and the cladding resin 14 is applied onto the transparent resin 8 and hardened thereon. Thus, the upper cladding portion 7 is formed (FIG. 15E).

According to the optical wave guide 20 produced in the above manner, the thickness precision of the cladding substrate 2 is increased, and the height precision from the surface of the glass substrate 12 to the core 4 is increased, as a result, positioning with an optical fiber becomes easy.

Sixth Embodiment

Figure 16A:
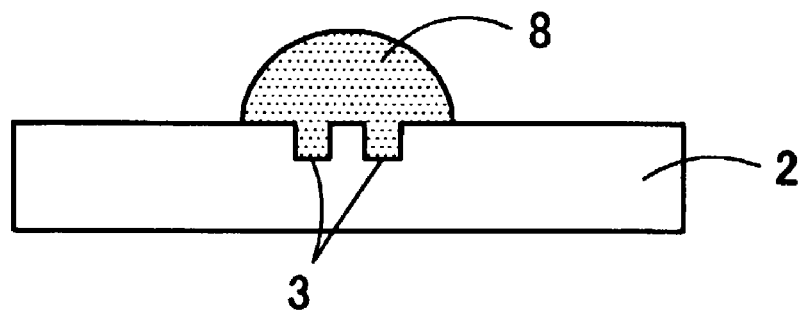
FIGS. 16A, 16B, 16C, and 16D show cross sectional views for explaining a method for producing an optical wave guide according to another embodiment under the present invention.
Figure 16B:
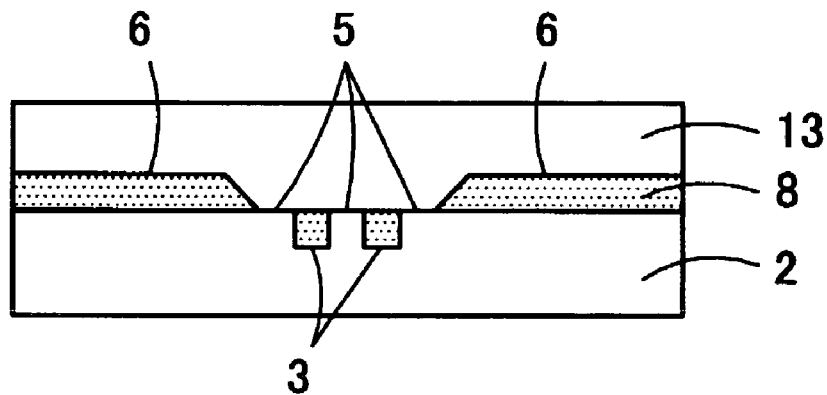

FIGS. 16A, 16B, 16C, and 16D show cross sectional views for explaining a method for producing an optical wave guide 23 according to still further another preferred embodiment under the present invention. In this preferred embodiment, cavities 6 are arranged on the stamper 13. Namely, in the cladding substrate 2 to be employed in this preferred embodiment, as shown in FIG. 16A, only the grooves 3 and the flat portions 5 are arranged, while cavity 6 is not arranged. An ultraviolet ray hardening type transparent resin 8 is dropped onto this cladding substrate 2, and thereafter the transparent resin 8 is pressed by the stamper 13 (FIG. 16B). On the under surface of the stamper 13, cavities 6 are arranged at the positions displaced a specific distance from the groove 3 of the cladding substrate 2. Accordingly, in such a structure of optical wave guide as this one, only the areas pinched by the area corresponding to the cavities 6 and the area between the grooves 3 are flat portions 5. Even with such a structure, when forming a core 4, excessive transparent resin 8 on the flat portions 5 can flow to the cavities 6 of the stamper 13. Thus, it is possible to make the transparent resin 8 at the flat portions 5 thin swiftly.

Figure 16C:
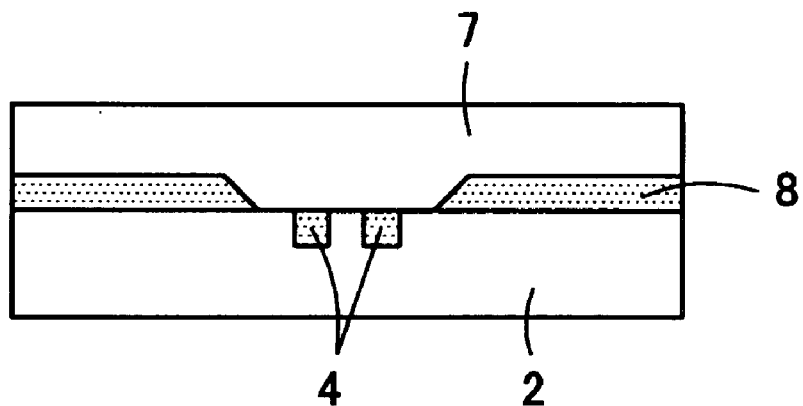
Figure 16D:
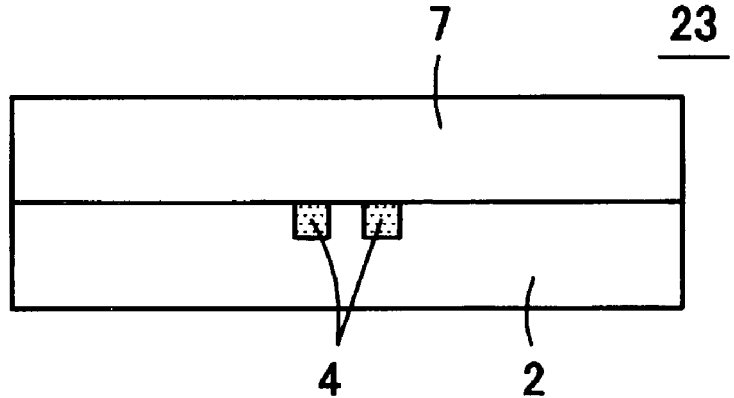

Ultraviolet ray is radiated from the back surface side of the cladding substrate 2 onto the transparent resin 8, and thereby the transparent resin 8 is hardened. Then, the stamper 13 is released from the transparent resin 8, and thereby the upper cladding portion 7 is formed on the transparent resin 8. At this moment, if the transparent resin 8 in the cavities 6 does not released together with the stamper 13 and remains on the cladding substrate 2, the structure of the optical wave guide 23 becomes as shown in FIG. 16C. If the transparent resin 8 in the cavities 6 releases together with the stamper 13, then the structure of the optical wave guide 23 becomes as shown in FIG. 16D.

It is also possible to cavities 6 on both the cladding substrate 2 and the stamper 13. In this preferred embodiment, an optical wave guide having plural cores 4 has been shown. However, one core 4 may be employed in the place of plural ones. In optical wave guides according to other preferred embodiments herein, it is possible to arrange plural cores 4.

Seventh-Tenth Embodiments

FIGS. 17A, 17B, 17C, and 17D show cross sectional views of other structures of optical wave guides. In the preferred embodiment shown in FIG. 17A, plural cladding substrates 2 are arranged, and a space 24 for letting the transparent resin 8 out is arranged between respective cladding substrates 2. In this preferred embodiment, after the transparent resin 8 is dropped onto each cladding substrate 2, the transparent resin 8 is pressed by the stamper 13 or the formed upper cladding portion 7, and the transparent resin 8 on the flat portions 5 (the upper surface of the cladding substrate 2) flows into the spaces 24. Thus, it is possible to make the transparent resin 8 on the upper surface of the cladding substrates 2 thin in swift manner. This space 24 may correspond to a space between cladding substrates 2 in the case wherein respective cladding substrates 2 are arranged. Also, in the case where cladding substrate 2 is of a wafer shape, the above space 24 may be formed by an opening made on the set (wafer) of cladding substrates 2.

Figure 17A:
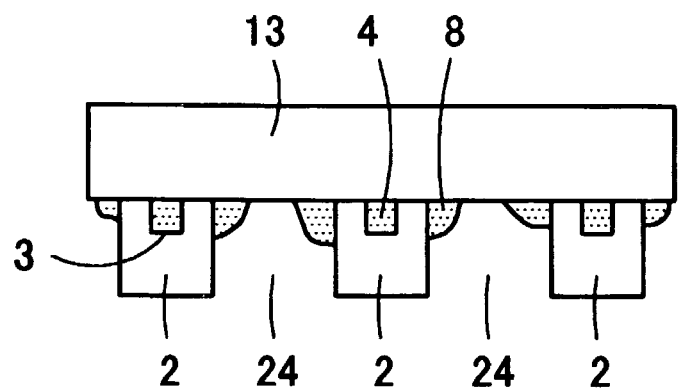
FIGS. 17A, 17B, 17C, and 17D show cross sectional views of other structures of optical wave guides.
Figure 17B:
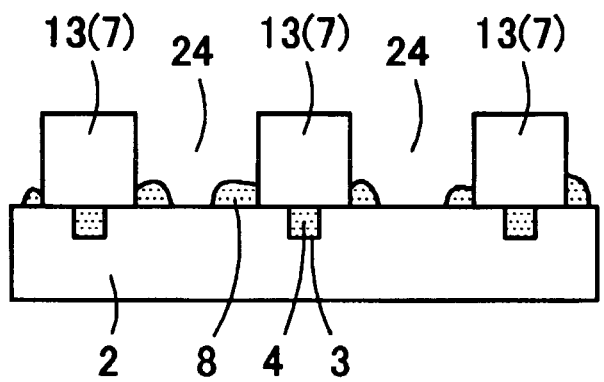

In the preferred embodiment shown in FIG. 17B, a plurality of stampers 13 or a plurality of formed upper cladding portions 7 are arranged and spaces 24 for letting out the transparent resin 8 are formed between them. In this preferred embodiment, the transparent resin 8 is applied onto the cladding substrate 2. Thereafter, the transparent resin 8 is pressed by the stampers 13 or the formed upper cladding portions 7, and the transparent resin 8 on the flat portions 5 (the upper surface of the cladding substrate 2) flows into the spaces 24. Thus, it is possible to make the transparent resin 8 on the upper surface of the cladding substrate 2 thin swiftly.

Figure 17C:
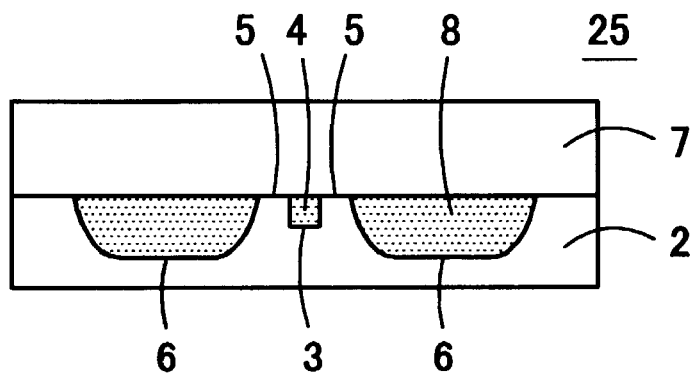

While, in an optical wave guide 25 shown in FIG. 17C, cavities 6 are not released to both sides, but are closed. In such a structure as this one, there is no problem even if the transparent resin 8 can be flowed into cavities 6 at forming a core 4.

Figure 17D:
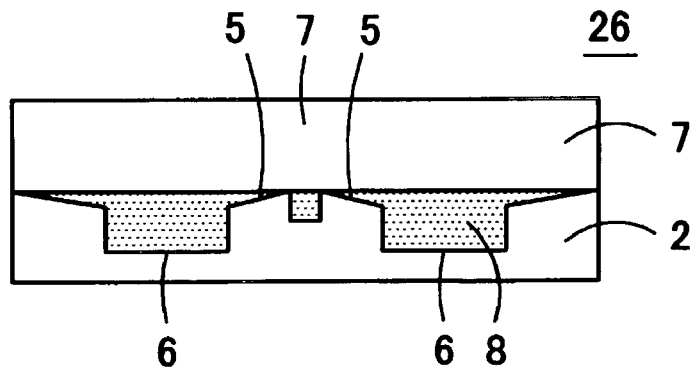

Additionally, in an optical wave guide 26 shown in FIG. 17D, the flat portions 5 of the cladding substrate 2 are tapered, and inclined to the under surface of the upper cladding portion 7. In this way, the flat portions 5 are not necessarily to be parallel with the under surface of the upper cladding portion 7. However, sharp inclination is not preferable, and, preferably, the inclination is enough to keep the film thickness of the transparent resin 8 thin over a certain distance (in the width necessary to prevent light from leaking out). For example, the difference in height at the both sides of the flat portion 5 may be set 3 μm or below.

Eleventh Embodiment

Explanations so far have been made on a single mode optical wave guides, while hereinafter, multi-mode optical wave guides are explained. FIGS. 18A, 18B, 18C, and 18D show examples of optical wave guides wherein a core 4 is branched and combined. In such multi mode optical wave guides, the width and depth of the core 4 may be set several 10 μm respectively.

First, in the preferred embodiment shown in FIGS. 18A, 18B, 18C, and 18D, a Y-shaped core is arranged wherein one core 4 is on one side, while it is branched into two cores 4 on the other side. Among them, in the optical wave guide 27 shown in FIG. 18A, the flat portion 5 is formed so as to be almost the same as the chip shape of the optical wave guide, or to be a shape similar to it, and the cavity 6 is formed around the flat portion 5. In the optical wave guide 28 shown in FIG. 18B, the flat portion 5 is formed along the shape of the core 4, and the cavity 6 is formed at the external circumference thereof. In the optical wave guide 29 shown in FIG. 18C, at the side where the core 4 expands, the width of the flat portion 5 is widened in a step shape. In the optical wave guide 30 shown in FIG. 18D, a plurality of cavities 6 are formed in island shapes so as to be adjacent to the core 4, and the other areas than the core 4 and the cavities 6 are made as the flat portion 5. In these optical wave guides 27–30, ends of the core 4 are not exposed, but, by cutting the ends of the respective optical wave guides 27–30 by dicing, ends of the core 4 are exposed.

Figure 18A:
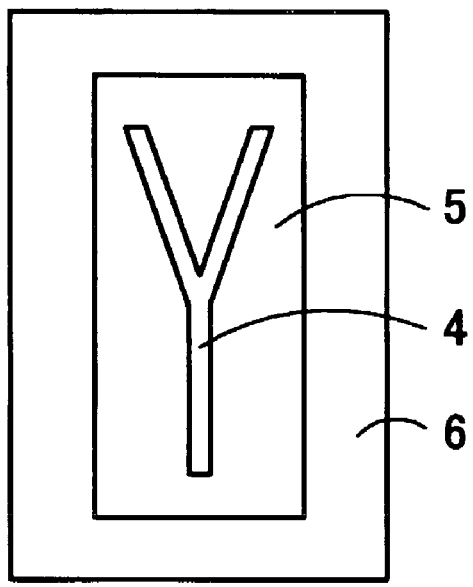
FIGS. 18A, 18B, 18C, and 18D show top views of various forms of multi mode optical wave guides wherein cores are branched and combines.
Figure 18B:
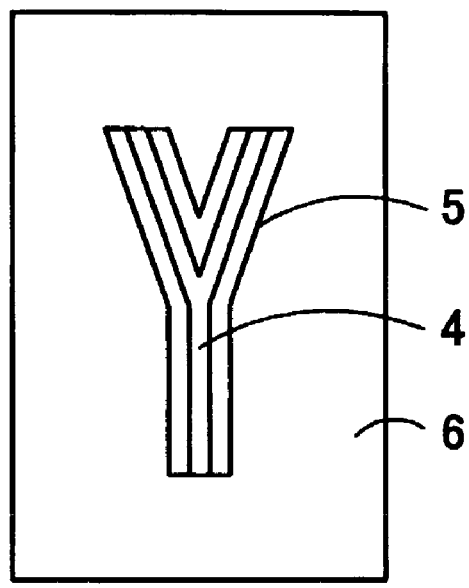
Figure 18C:
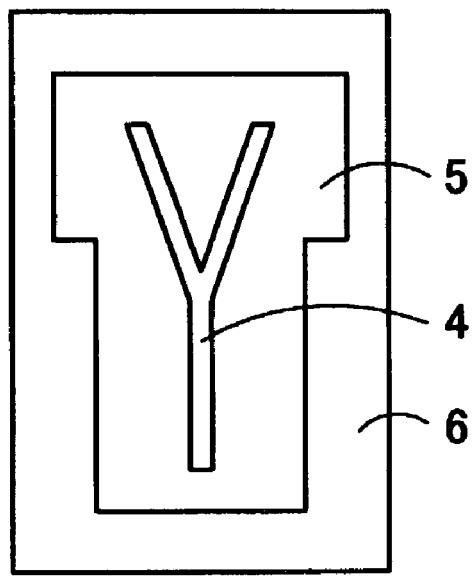
Figure 18D:
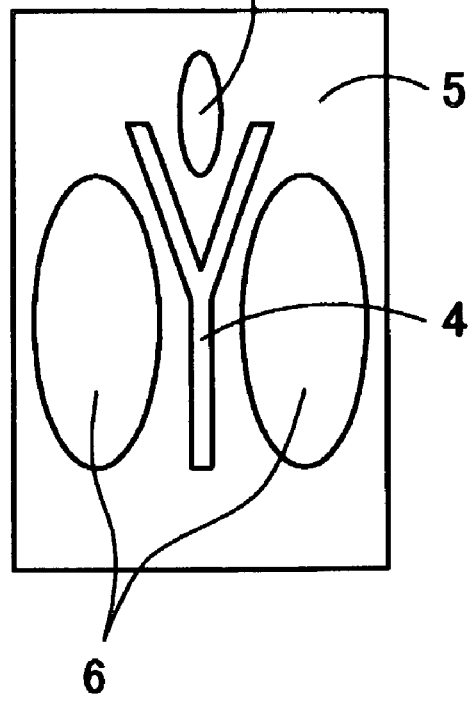
Figure 19:
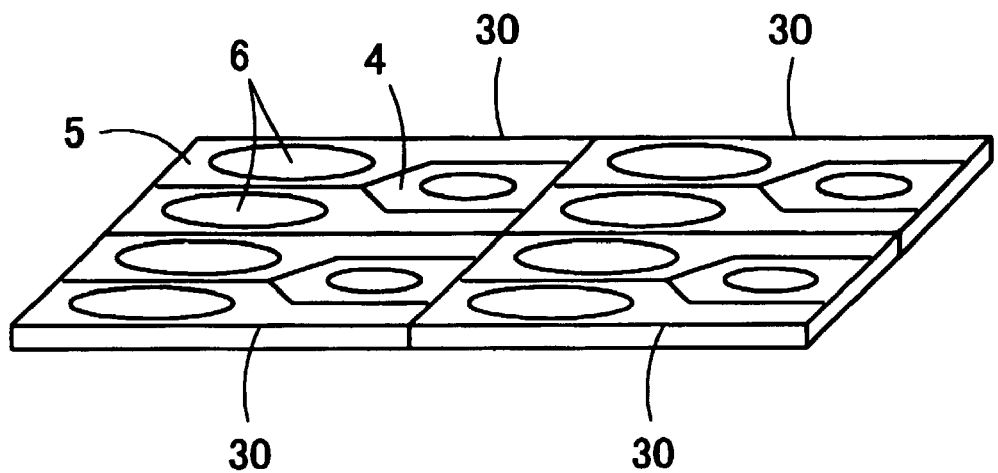
FIG. 19 shows a wafer wherein plural optical wave guides are formed.

Further, as shown in FIG. 19, in the case where a plurality of optical wave guides (for example, optical wave guides 30 as shown in FIG. 18D) are formed on a wafer at one time, if the distance between the ends of the core 4 between adjacent optical wave guides is set shorter than the width (blade thickness) of the blade to be used for dicing, it is possible to make ends of the core 4 exposed at one time when optical wave guides are divided into pieces by means of dicing. Alternatively, as shown in FIG. 18, both ends of the core 4 may be closed in the cladding substrate 2, and the core 4 may be made as optical wave guides without dicing the core 4.

Twelfth Embodiment

Figure 20:
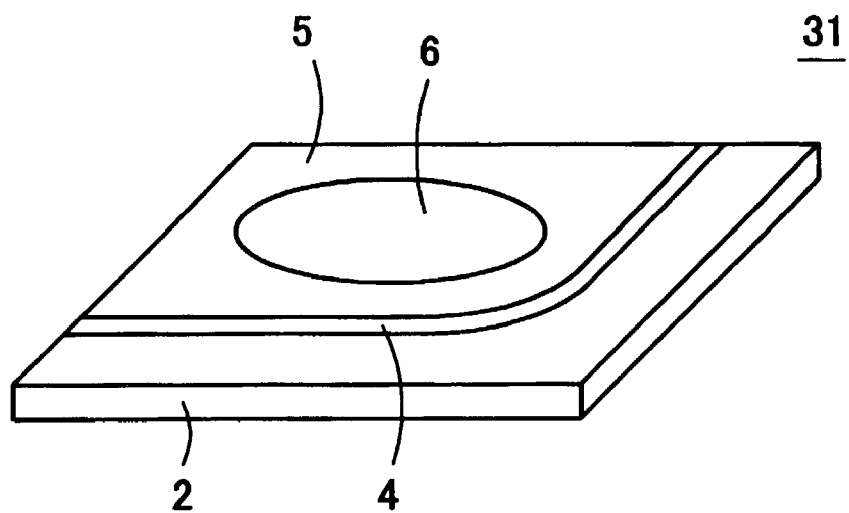
FIG. 20 shows a perspective view of an optical wave guide having a core 4 of a curved shape.

FIG. 20 shows an optical wave guide 31 having a core 4 of a curved shape, wherein a cavity 6 of a circular shape or an oval shape is arranged along the curved portion of the core 4, on the cladding substrate 2.

Thirteenth Embodiment

Figure 21A:
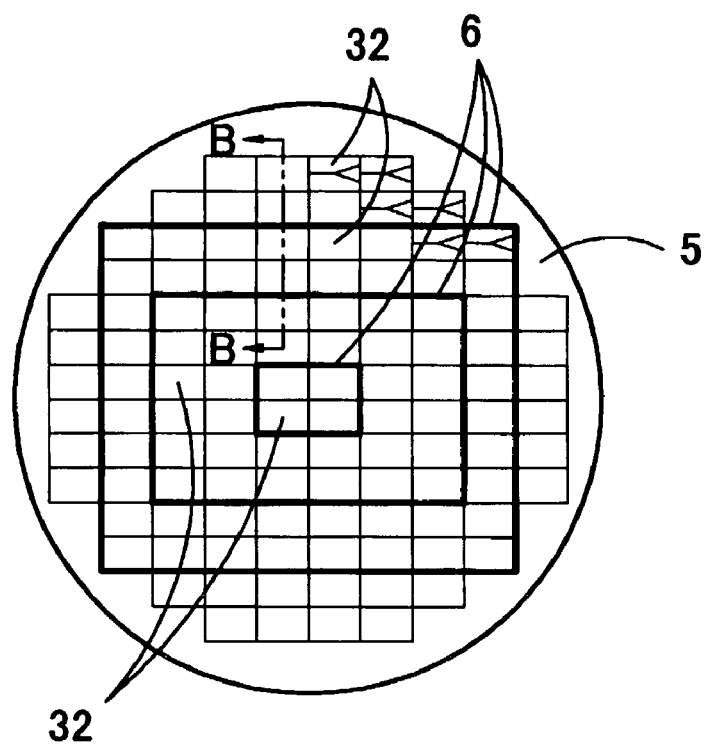
Figure 21B:
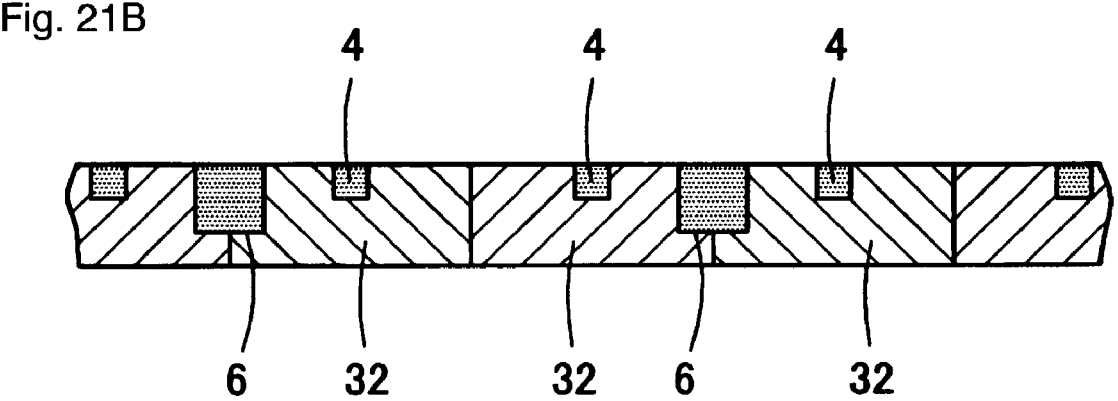
FIG. 21B shows an enlarged cross sectional view along the line B–B of FIG. 21A.

FIG. 21A shows a top view of further another preferred embodiment according to the present invention, while FIG. 21B shows an enlarged cross sectional view along the line B–B of FIG. 21A. This preferred embodiment is for explaining that cavities 6 need not always to be arranged in each unit of optical wave guides 32. The cavities 6 is provided along the borders between the optical wave guides 32 and only at part of borders. In such a structure as this one, as shown in FIG. 21B, the cavities 6 are positioned at one side adjacent to each core 4, and thereby excessive transparent resin 8 may be absorbed.

Fourteenth Embodiment

Figure 22:
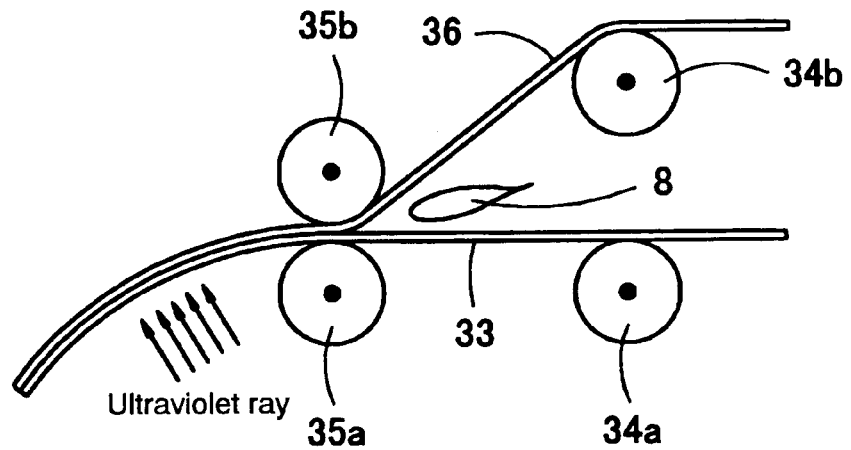
FIG. 22 shows a schematic diagram for explaining a method for producing an optical wave guide according to another embodiment under the present invention.

FIG. 22 shows a schematic diagram for explaining a method for producing an optical wave guide according to still another preferred embodiment under the present invention. In this preferred embodiment, the cladding substrate 2 and the upper cladding portion 7 are structured by use of a film-form material or a sheet material. A lower cladding sheet-form 33 to become cladding substrate 2 passes a roller 34a and is fed between press rollers 35a and 35b, while an upper cladding sheet 36 to become the upper cladding portion 7 passes a roller 34b and is fed inbetween the press rollers 35a and 35b. The lower cladding sheet 33 and the upper cladding sheet 36 pass in piled status and are supplied between the press rollers 35a and 35b, and just before thereof, the transparent resin 8 for the core is applied onto the lower cladding sheet 33.

Then, the lower cladding sheet 33 onto which the transparent resin 8 has been applied and the upper cladding sheet 36 are impressed even pressure by the press rollers 35a and 35b, and thereby the transparent resin 8 is pressed and expanded inbetween both the sheets 33 and 36. Thereafter, ultraviolet ray is radiated onto both the sheets 33 and 36 coming out from the press rollers 35a and 35b, the transparent resin 8 is hardened, and thereby optical wave guides are produced in continuous manner. Continuously, the produced optical wave guides are cut at specific position by use of a cutter or the like. According to such a method described above, it is possible to produce optical wave guides by continuous process and at high speed, and further, by arranging cavities 6 for letting resin out on both the sheets 33 and 36, it is possible to produce optical wave guides of preferable quality.

Figure 23:
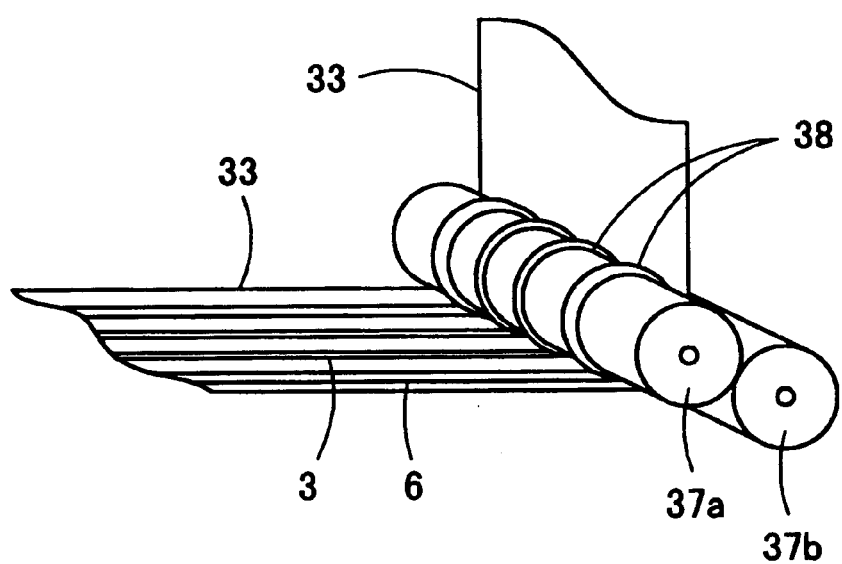
FIG. 23 shows a schematic diagram of a machine for arranging grooves and cavities in the above lower cladding sheet shown in FIG. 22 in advance.
Figure 24:
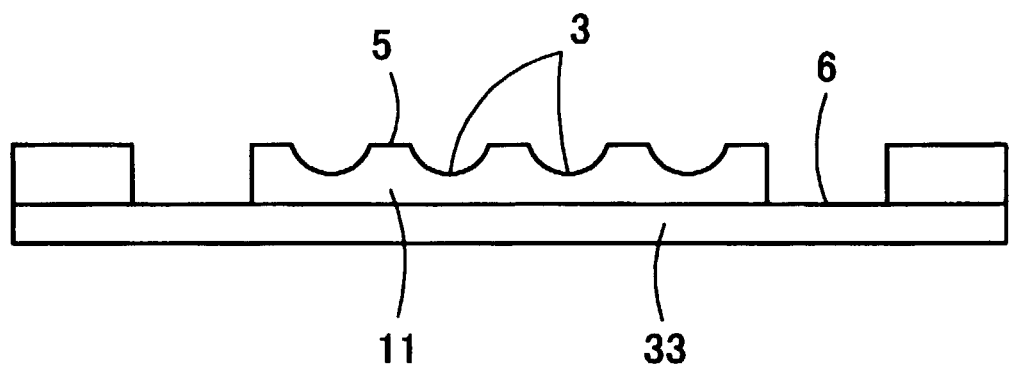
FIG. 24 shows a cross sectional view of a lower cladding sheet formed on the device in FIG. 23.

FIG. 23 shows a schematic diagram of a device for arranging grooves 3 and cavities 6 in the above lower cladding sheet 33 in advance. Among a pair of press rollers 37a and 37b, on the external circumferential surface of the press roller 37a, projections 38 for forming the grooves 3 and the cavities 6 on the lower cladding sheet 33 are arranged on the external circumferential surface thereof along the circumferential direction. Thus, as the lower cladding sheet 33 onto which the transparent resin 11 has been applied passes between the press rolls 37a and 37b, as shown in FIG. 24, the grooves 3 and the cavities 6 are continuously formed on the transparent resin 11 on the surface of the lower cladding sheet 33, and then the transparent resin 11 is hardened by ultraviolet ray radiation.

Figure 25A:
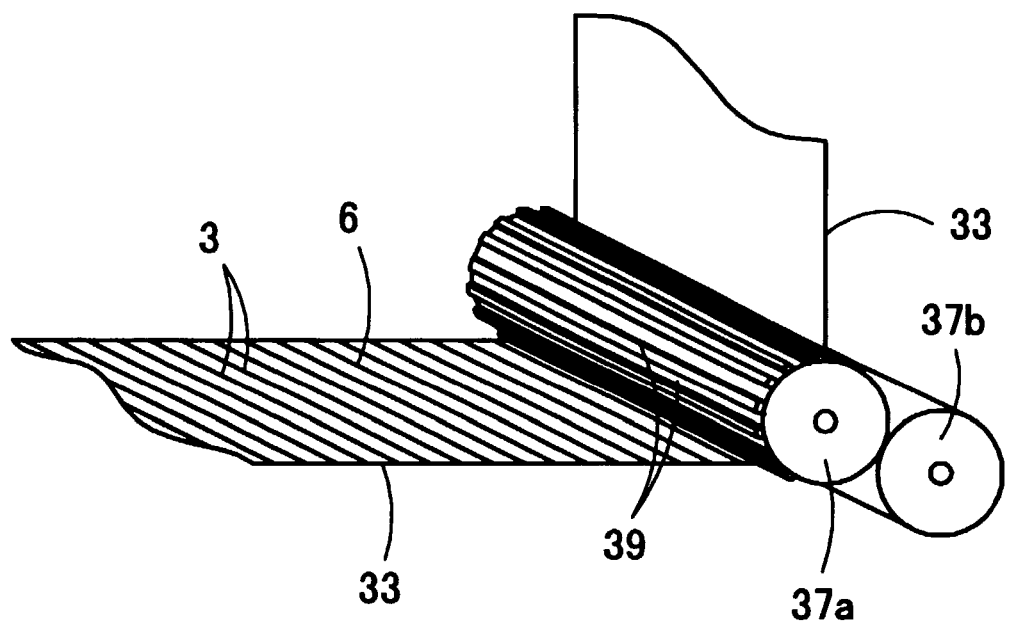
Figure 25B:
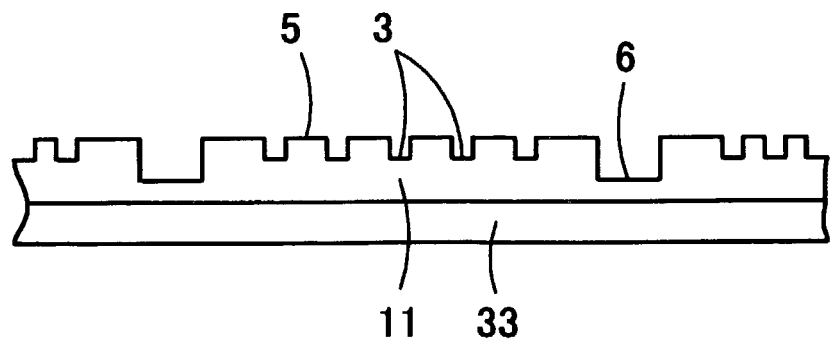
FIG. 25B shows a cross sectional view of a lower cladding sheet formed by the device concerned.

And, in order to form grooves 3 and cavities 6 in advance in the lower cladding sheet 33, as shown in FIG. 25A, on the external circumferential surface of the press roller 37a, the protrusions 39 for forming grooves 3 and cavities 6 in the lower cladding sheet 33 may be arranged along the axial direction. In this case, when the lower cladding sheet 33 onto which the transparent resin 11 has been applied passes inbetween the press rollers 37a and 37b, as shown in FIG. 25B, grooves 3 and cavities 6 are formed with intervals on the transparent resin 11 on the surface of the lower cladding sheet 33, and the transparent resin 11 is hardened by ultraviolet ray radiation.

Fifteenth Embodiment

Figure 26:
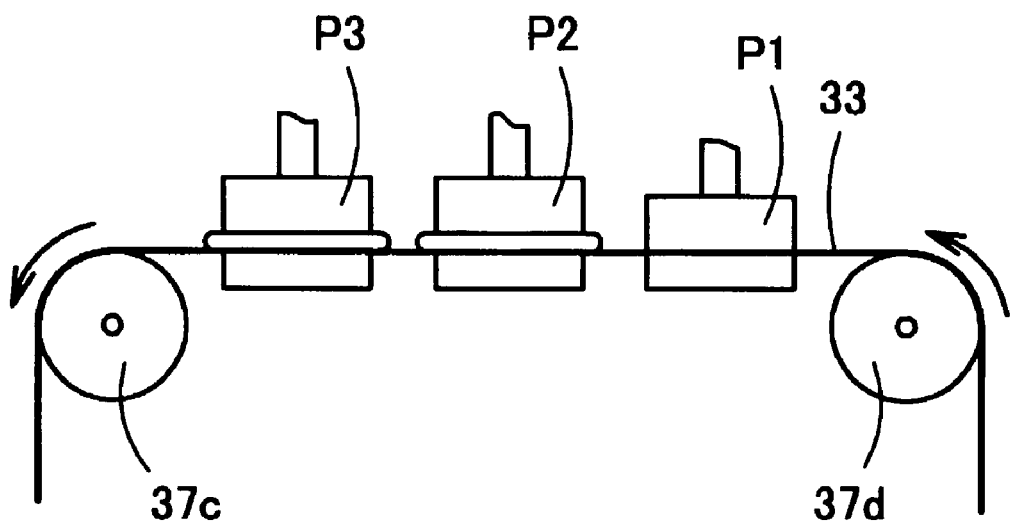
FIG. 26 shows a schematic diagram for explaining a method for producing an optical wave guide according to another embodiment under the present invention.

FIG. 26 shows a schematic diagram for explaining a method for producing an optical wave guide according to still further another preferred embodiment under the present invention. In this preferred embodiment, the lower cladding sheet 33 onto which the transparent resin 11 has been applied is fed by a pair of rolls 37c and 37d, and at a first press portion P1, a mold is pressed onto the transparent resin 11. Then, the ultraviolet ray is radiated onto the transparent resin 11. By this, the grooves 3, the flat portions 5, the cavities 6 and the like are formed, and thereby cladding substrate 2 is formed on the lower cladding sheet 33. Thereafter, the transparent resin 8 is supplied onto the cladding substrate 2, then the transparent resin 8 is pressed by the stamper 13 at the core forming portion P2. After that, the ultraviolet ray is radiated thereon and core 4 is formed and at the same time excessive transparent resin 8 is discharged into cavities 6. Thereafter, the cladding resin 14 is supplied onto the hardened transparent resin 8, then the cladding resin 14 is pressed at the upper cladding forming portion P3. The ultraviolet ray is radiated thereon and the upper cladding portion 7 is formed. According to this method too, it is possible to continuously produce optical wave guides.

Sixteenth Embodiment

Figure 27A:
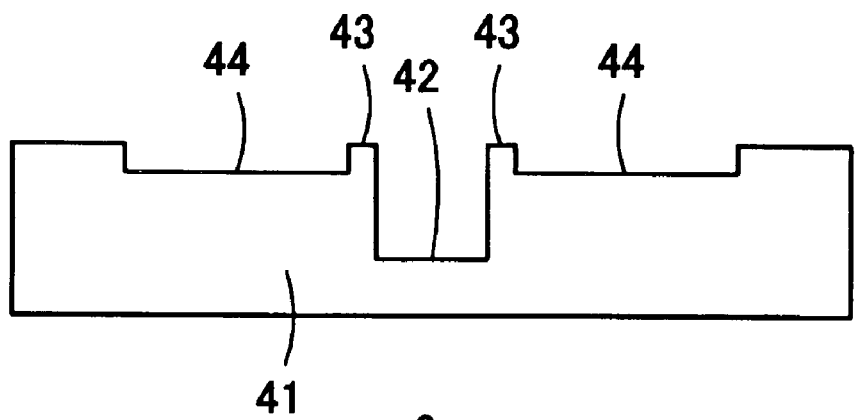
FIGS. 27A, 27B, 27C, and 27D show cross sectional views for explaining a method for producing an optical wave guide according to another embodiment under the present invention.
Figure 27B:
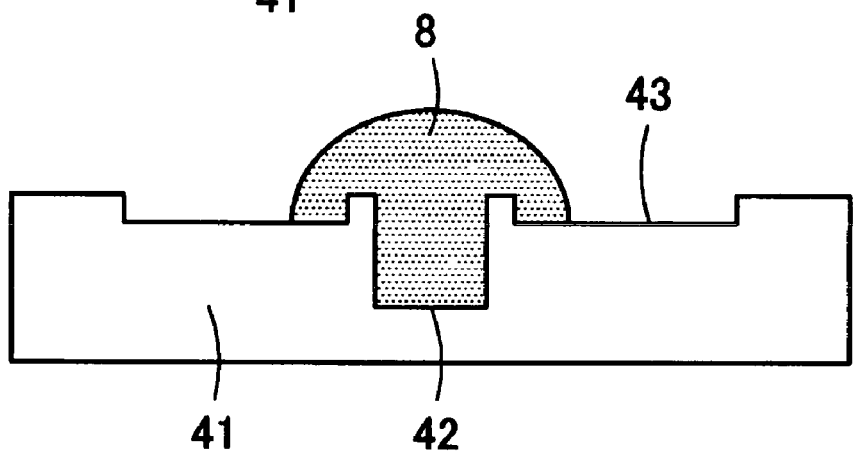

FIGS. 27A, 27B, 27C, and 27D show cross sectional views for explaining a method for producing an optical wave guide 40 according to still further another preferred embodiment under the present invention. In this preferred embodiment, a metallic mold 41 is employed. In the metallic mold 41, as shown in FIG. 27A, a groove 42 for forming the core 4 is arranged, and flat portions 43 are arranged at both sides thereof. Further cavities 44 are formed at both sides thereof.

Figure 27C:
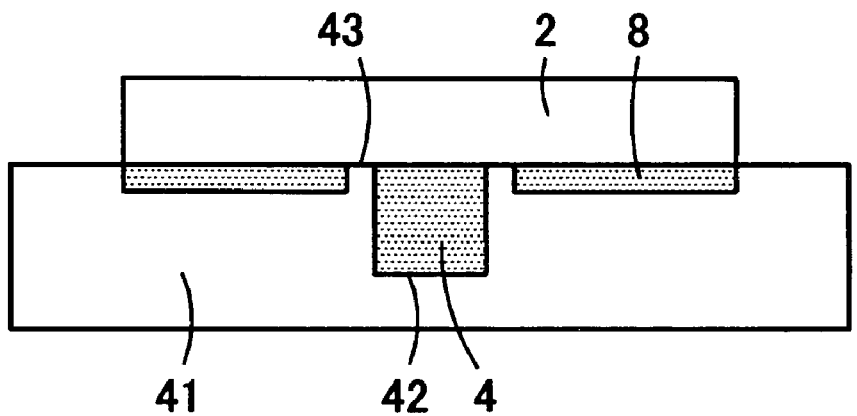
Figure 27D:
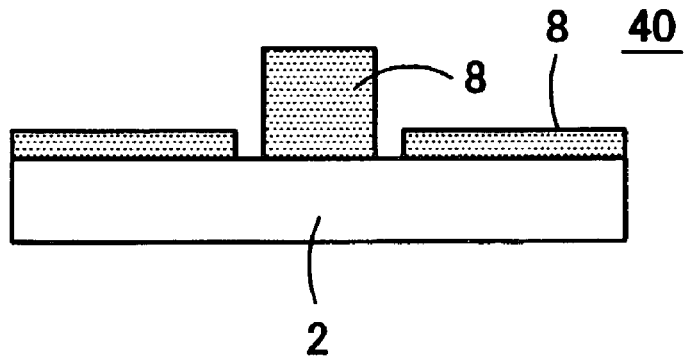

An ultraviolet ray hardening type transparent resin 8 is dropped onto this metallic mold 41 (FIG. 27B), and the transparent resin 8 is pressed by a formed cladding substrate 2. At this moment, as shown in FIG. 27C, sufficient pressure is imposed onto the cladding substrate 2, and thereby the transparent resin 8 on the flat portions 5 becomes sufficiently thin. Also, excessive transparent resin 8 is flowed into cavities 8. Thereafter, the optical wave guide 40 formed in this manner is released from the metallic mold 41, and the optical wave guide 40 as shown in FIG. 27D is obtained.

In this optical wave guide 40, on the upper surface of the cladding substrate 2 of a flat plane shape, the core 4 formed by the groove 42, and the convex portions 45 formed by cavities 44 are exposed. The upper surface and side surfaces of the core 4 are of an air cladding layer. In such an optical wave guide 40, since the portion between the core 4 and the convex portion 45 is connected only by a sufficiently thin layer of the transparent resin 8, light signal in core 4 is not leak out of the convex portion 45. Thus, it is possible to keep signal quality.

Seventeenth–Twentieth Embodiments

Figure 28A:
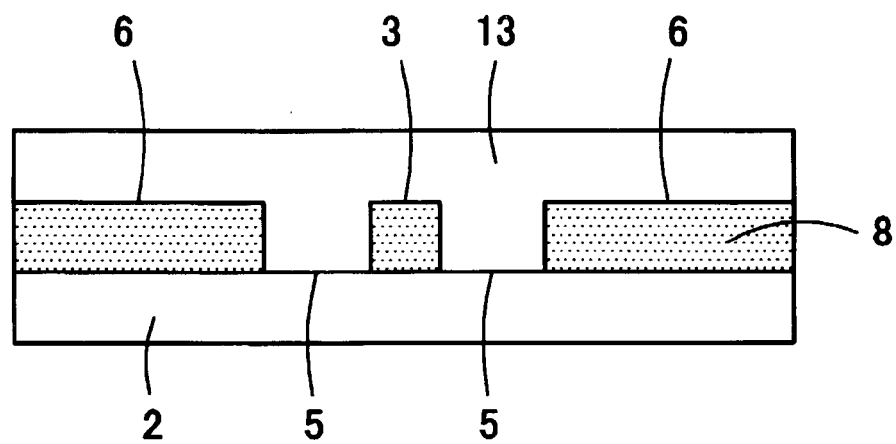
FIGS. 28A, 28B, and 28C show cross sectional views for explaining intermediate processes in a method for producing an optical wave guide according to another embodiment under the present invention.
Figure 28B:
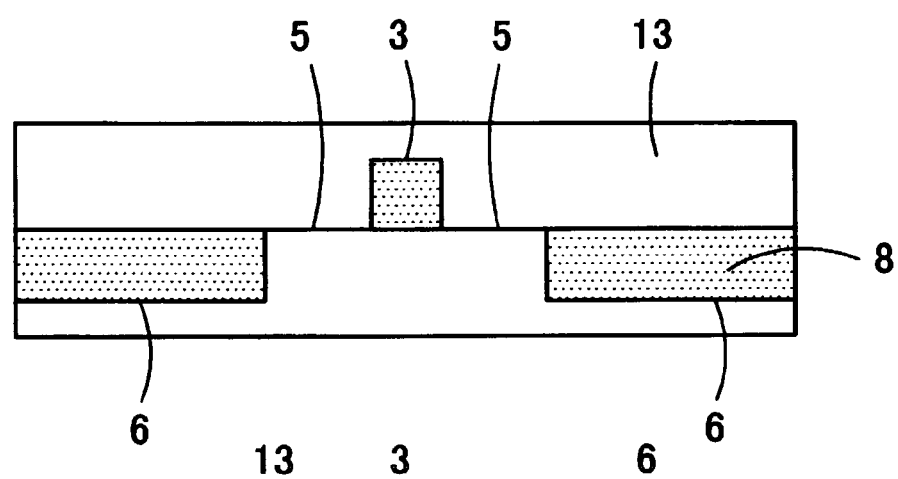
Figure 28C:
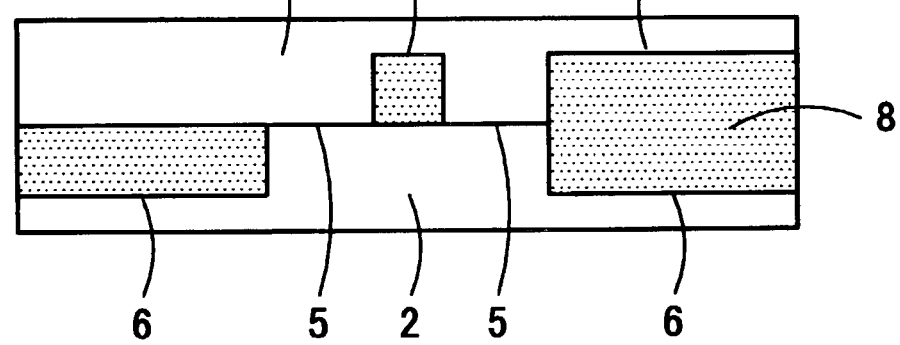

FIGS. 28A, 28B, and 28C show cross sectional views for explaining intermediate processes in a method for producing an optical wave guide according to still further another preferred embodiment under the present invention. In the preferred embodiment shown in FIG. 28A, on the under surface of the stamper 13, a groove 3 for forming core, cavities 6 for flowing transparent resin 8, and flat portions 5 for discharging transparent resin 8 and pressing transparent resin 8 sufficiently thin are formed.

In the preferred embodiment shown in FIG. 28B, on the under surface of the stamper 13, a groove 3 for forming core is arranged, and on the upper surface of cladding substrate 2, the cavities 6 for letting transparent resin 8 out are arranged. The flat portions 5 for discharging transparent resin 8 and pressing the transparent resin 8 sufficiently thin are formed on the under surface of the stamper 13 and the upper surface of the cladding substrate 2.

Further, in the preferred embodiment shown in FIG. 28C, the groove 3 for forming the core is arranged on the under surface of the stamper 13, one cavity 6 is arranged on the upper surface of the cladding substrate 2, and another cavity 6 is arranged inbetween the upper surface of the cladding substrate 2 and the under surface of the stamper 13. The flat portions 5 for discharging the transparent resin 8 and pressing the transparent resin 8 sufficiently thin are formed on the under surface of the stamper 13 and the upper surface of the cladding substrate 2.

Figure 29:
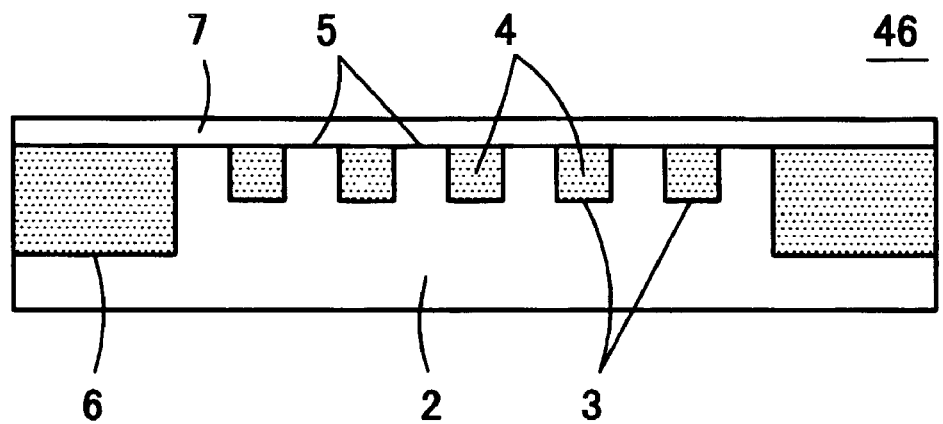
FIG. 29 shows a cross sectional view of an optical wave guide according to another embodiment under the present invention.

FIG. 29 shows a cross sectional view of an optical wave guide 46 according to still another preferred embodiment under the present invention. In this optical wave guide 46, the plurality of cores 4 are formed on the upper surface of the cladding substrate 2. The cavities 6 are arranged at both ends of sides of the cladding substrate 2 and between grooves 3 or between groove 3 and cavity 6. The flat portions 5 are formed on the upper surface of the cladding substrate 2. In the case where the plurality of cores 4 are formed like this preferred embodiment, there is no need to arrange one cavity 6 corresponding to each core 4, but only one cavity 6 may be arranged to the plurality of cores 4.

Figure 30A:
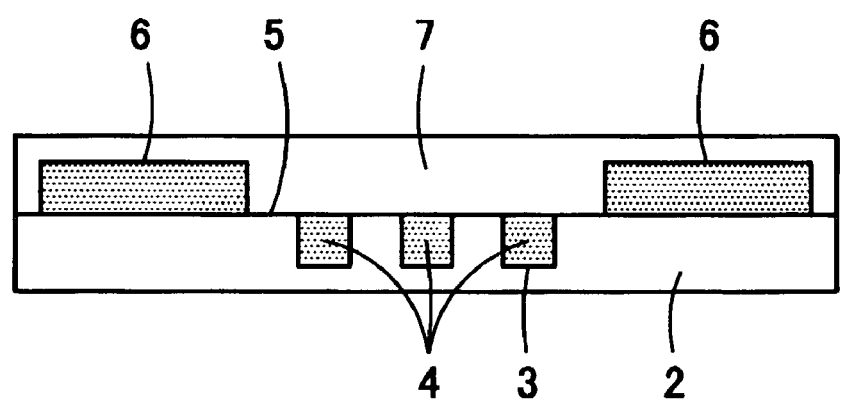
FIGS. 30A and 30B show cross sectional views of an optical wave guide, wherein plural cores are formed on the upper surface of the cladding substrate.
Figure 30B:
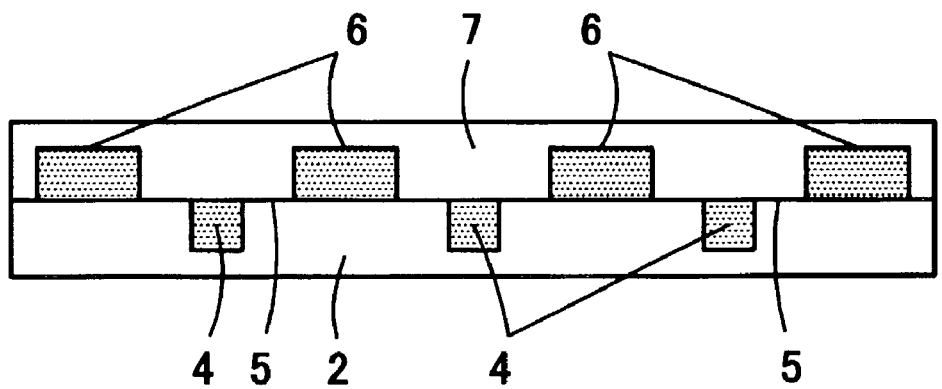

FIG. 30A shows a cross sectional view of an optical wave guide, in which the plurality of cores 4 are formed on the upper surface of the cladding substrate 2. The cavities 6 are arranged on the under surface of the upper cladding portion 7 at the outside of the area of the cores 4. Further, FIG. 30B also shows a cross sectional view of an optical wave guide, in which the plurality of cores 4 are formed on the upper surface of the cladding substrate 2. The cavities 6 are arranged on the under surface of the upper cladding portion 7 so as to be positioned at the center between the core 4 and the core 4.

Twenty-First Embodiment

Figure 31A:
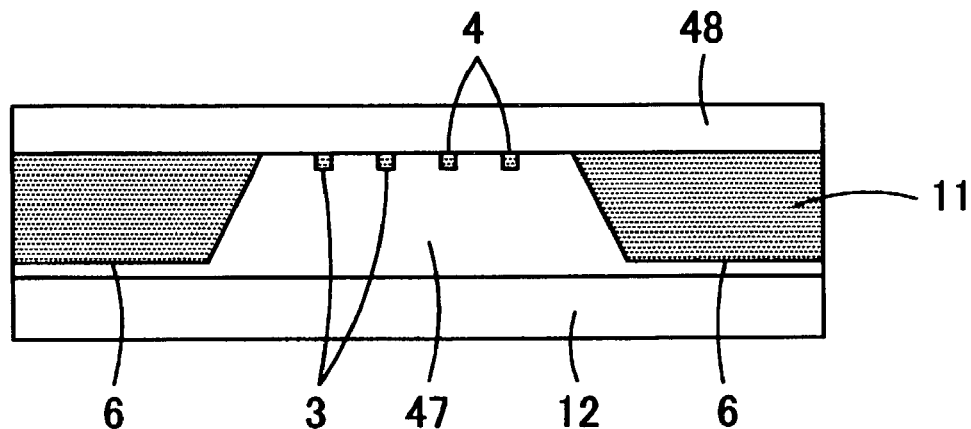

FIG. 31A shows a cross sectional view of an optical wave guide according to another preferred embodiment under the present invention. In the preferred embodiment shown in FIG. 31A, a lower cladding portion 47 having the plurality of grooves 3 for forming cores is formed on a glass substrate 12. Further, transparent resin 11 for forming cores is filled into the grooves 3, and thereby the cores 4 are formed. At both sides of the grooves 3, the cavities 6 deeper than the depth of the grooves 3 are formed. The transparent resin 11 overflowing the grooves 3 collects. On the upper surface of the lower cladding portion, an upper cladding portion 48 is laminated.

Figure 31B:
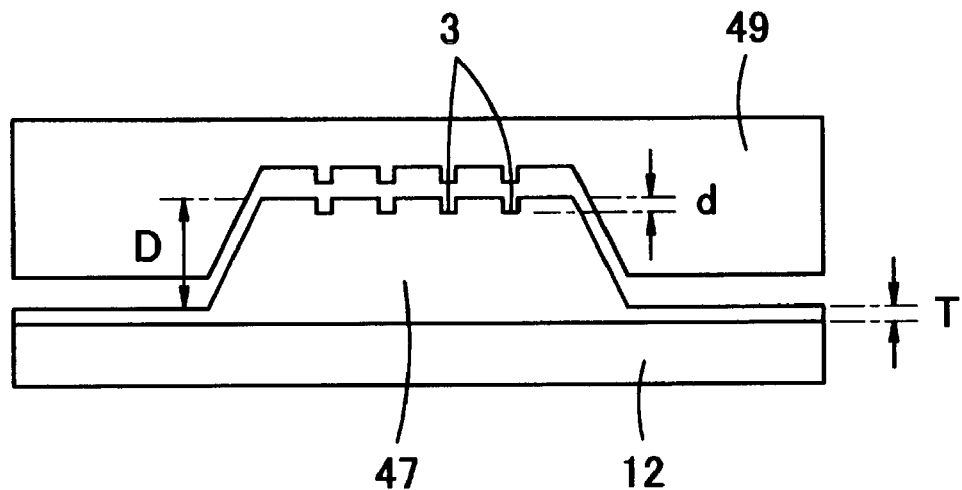
FIG. 31B shows a schematic diagram of part of the production process just after the abovementioned lower cladding portion is formed.

FIG. 31B shows a schematic diagram of part of the production process for the above-mentioned lower cladding portion 47. Specifically, an ultraviolet ray hardening type cladding resin is dropped onto the glass substrate 12, the cladding resin is pressed by the stamper 47, and thereby the lower cladding portion 47 is formed. Further, ultraviolet ray is radiated onto the lower cladding portion 47, and the lower cladding portion 47 is hardened. Then, as shown in FIG. 31B, the stamper 49 is released from the lower cladding portion 47, and thereby the lower cladding portion 47 is formed on the glass substrate 12.

In the optical wave guide according to the present invention, the core material is filled into grooves 3. Further, the core material is pressed by the mold surface of stamper or a formed lower cladding portion 47 and thereby the cores 4 are formed in grooves 3. Thus, to reduce the thickness of transparent resin layer remaining between the upper surface of the lower cladding portion 47 and the upper cladding portion 48, and prevent light from leaking out from the cores 4 by making an even the thickness thereof, it is necessary that the interface of the lower cladding portion 47 is formed horizontally in precise manner. Since the lower cladding portion 47 is formed as shown in FIG. 31B, to form the interface of the lower cladding portion 47 horizontally, it is required to hold the stamper horizontally and press it onto the cladding resin.

However, if the thickness of the lower cladding portion 47 at the bottom surface of cavities 6 (the thickness of the lower cladding portion 47 between the bottom surface of the cavities 6 and the upper surface of the glass substrate 12) is thick, when pressing the cladding resin by the stamper 49, variations in the pressure occurs, and the stamper 49 is likely to incline. As a result, it is difficult to make the interface of the lower cladding portion 47 horizontally.

Accordingly, in this preferred embodiment, the thickness T of the lower cladding portion 47 at the bottom surface of the cavities 6 is extremely thin. It is preferred to make this thickness as thin as possible (i.e., 0 μm). Actually, this thickness T may be 7 μm or below, preferably 5 μm or below. In order to make the thickness of the lower cladding portion 47 at the bottom surface of the cavities 6 extremely thin, the stamper 49 is pressed so strongly that it almost contacts the surface of the glass substrate 12 at forming the lower cladding portion 47. Thus, the stamper 49 is pressed horizontally. As a result, the height of other portions than the cavities 6 on the lower cladding portion 47 (area wherein grooves 3 are formed) and the surface of the lower cladding portion 47 become a flat and horizontal surface. In order to make the thickness of the lower cladding portion 47 at the bottom surface of the cavities 6 thin, it is effective to devise the shape of the stamper 49 (for example, depth of escape slot).

Thereby, the surface of the lower cladding portion 47 is finished flat and horizontal. When the cores 4 are filled into grooves 3, the surface of the cores 4 is pressed horizontally. Thus, it is possible to decrease light leakage from the cores 4. Further, the unevenness of cores 4 in vertical direction is decreased, and consequently, combination loss when to combine fiber array or the like to end surfaces of cores 4 is reduced.

When the thickness of the lower cladding portion 47 at the bottom surface of the cavities 6 is made extremely thin, if the depth of the cavities 6 is equal to the depth d of the grooves 3, the thickness of the lower cladding portion 47 at the bottom surface of the grooves 3 becomes extremely thin. Thus, that light transmitting through the cores 4 may penetrate into the lower cladding portion 47 from the bottom surface of the cores 4 and leak to the glass substrate 12.

Accordingly, in this preferred embodiment according to the present invention, the depth D of the cavities 6 is set to become extremely deep compared with the depth d of the grooves 3. Specifically, to the depth of the grooves 3 being around 6 μm, the depth D of the cavities 6 may be 10 μm or more, preferably 15 μm or more, more preferably 20 μm or more. As a consequence, even when the thickness of the lower cladding portion 47 at the bottom surface of the cavities 6 is made thin, it is possible to avoid the thickness of the lower cladding portion 47 at the bottom surface of the grooves 3. Thus, it is available to minimize leakage of light transmitting through the cores 4.

Twenty-Second Embodiment

Figure 32:
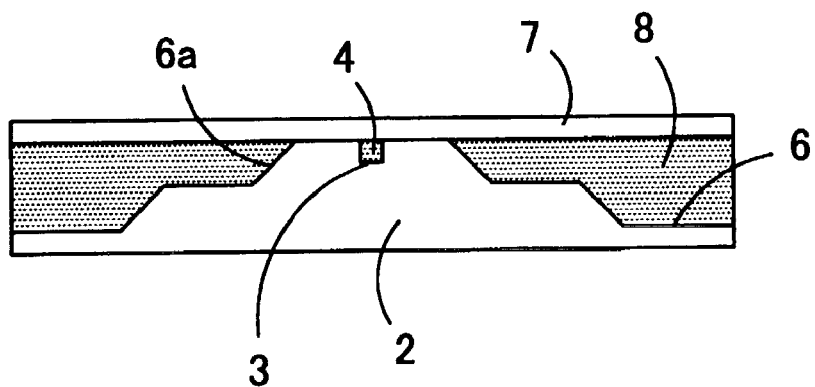
FIG. 32 shows a cross sectional view of a structure of an optical wave guide according to another embodiment under the present invention.

FIG. 32 shows a cross sectional view of a structure of an optical wave guide according to another preferred embodiment under the present invention. In this optical wave guide, side wall surfaces 6a of the cavities 6 arranged on the cladding substrate 2 are formed in a step shape. The side wall surfaces 6a may also be vertical surfaces, and may be inclined surfaces as illustrated therein. Also, the number of steps and the width of the step portion (landing portion) in the side wall surfaces 6a may be optional.

Applied Embodiment 1

Figure 33:
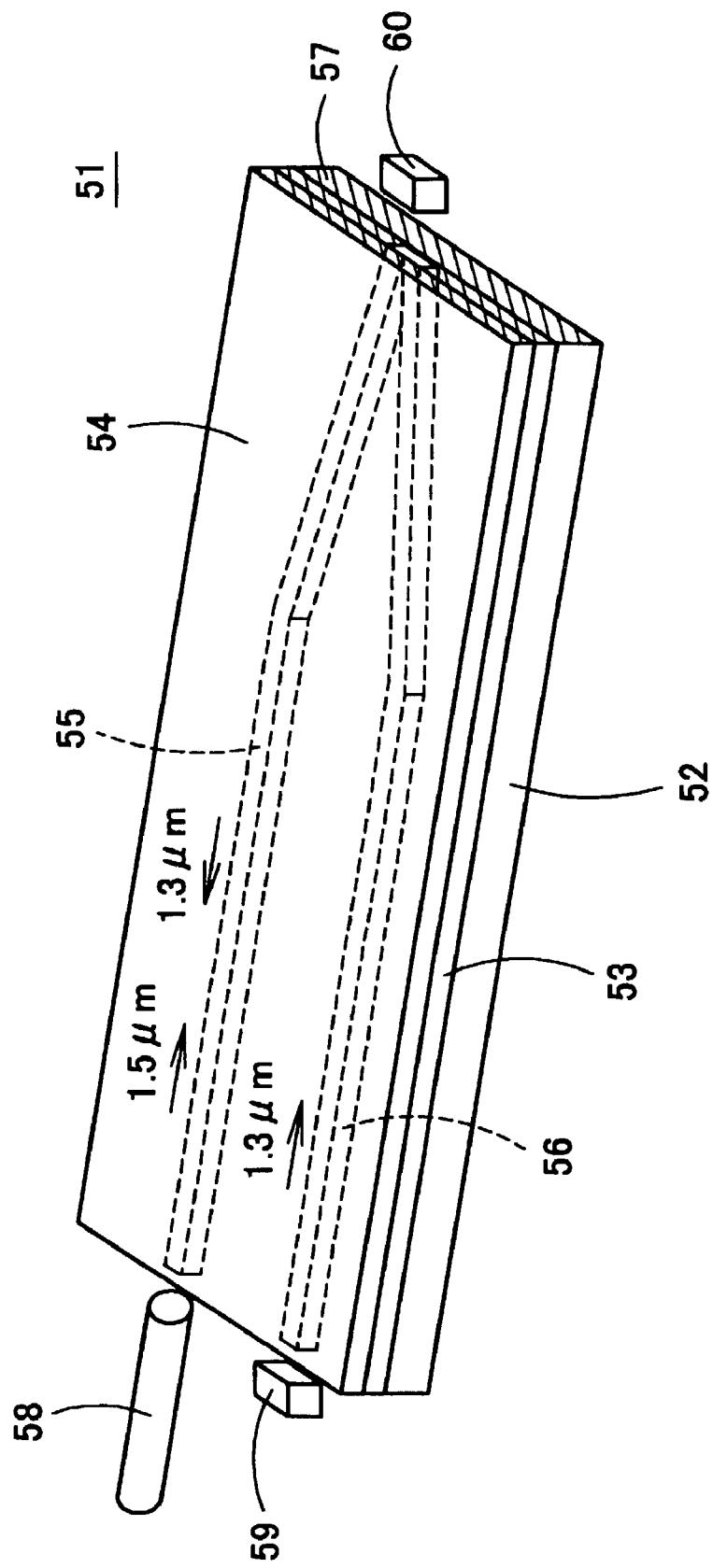
FIG. 33 shows a perspective view of an optical transceiver according to the present invention.

Applied embodiments of optical wave guides according to the present invention are explained hereafter. FIG. 33 shows a perspective view of an optical transceiver 51. In this optical transceiver 51, a lower cladding portion 53 (cladding substrate 2) is laminated onto the substrate 52, and an upper cladding portion 54 (upper cladding portion 7) is laminated onto the lower cladding portion 53. Also, two cores 55 and 56 are embedded in V shape on the lower cladding portion 53. The end surfaces of the cores 55 and 56 are arranged apart at one end surface, while the cores 55 and 56 are combined at the other end surface. Further, a wavelength filter 57 is attached to the above other end surface.

In the service status of this optical transceiver 51, an optical fiber 58 is connected to the exposed end surface of the core 55 at one end surface. A light emitting element 59 such as a semiconductor laser or the like is arranged at the exposed end surface of the core 56 at one end surface, and a light receiving element 60 such as a photo diode or the like is arranged at the position corresponding to the cores 55 and 56 at the other end surface. The above wavelength filter 57 has characteristics, for example, to penetrate light of wavelength 1.5 μm and reflect light of wavelength 1.3 μm.

Accordingly, when a light signal of wavelength 1.5 μm is transmitted from the optical fiber 58, this light signal goes via the end surface of the core 55 into the core 55, and is transmitted through the core 55 and reaches the other end of the core 55. The light signal of wavelength 1.5 μm that has reached the end surface of the core 55 penetrates through the wavelength filter 57, and is received by the light receiving element 60.

When a light signal of wavelength 1.3 μm is output from the light emitting element 59, this light signal goes via the end surface of the core 56 into the core 56, and is transmitted through the core 56 and reaches the other end of the core 56. The light signal of wavelength 1.3 μm that has reached the end surface of the core 56 is reflected by the wavelength filter 57, and then the light signal reflected by the wavelength filter 57 is transmitted through the core 55 and reaches the end surface at the side where the optical fiber is connected. Then, the light signal goes out from the end surface of the core 55 and goes into the optical fiber 58, and then is sent through the optical fiber 58.

This optical transceiver 51, which employs an optical wave guide according to the present invention, can restrict light from leaking from a core, and minimize the deterioration of signal quality. Further, since it may be produced by reproduction method and the like, its productivity is preferable.

Applied Embodiment 2

Figure 34:
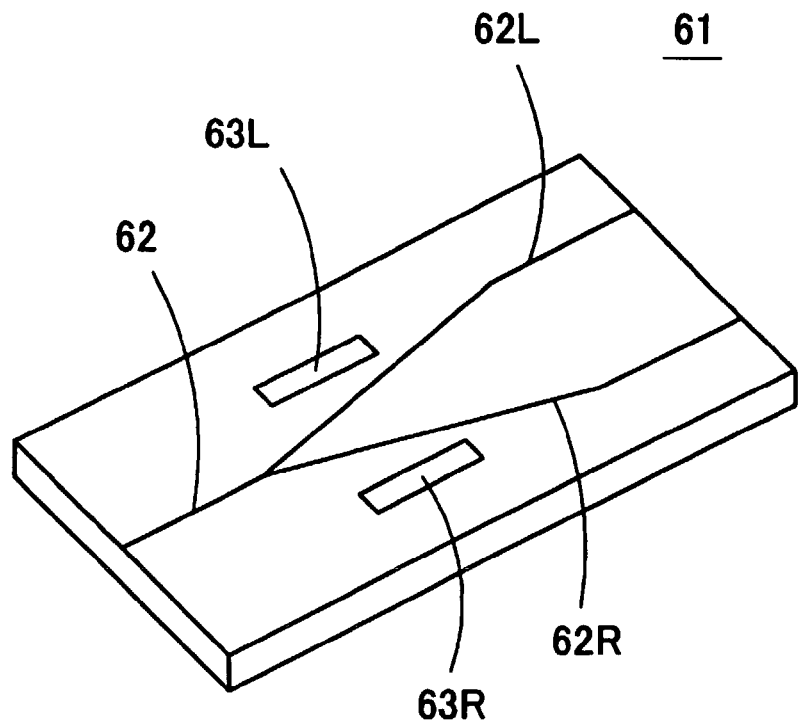
FIG. 34 shows a schematic perspective view of a structure of an optical switch according to the present invention.

FIG. 34 shows a schematic perspective view of a structure of an optical switch 61 according to the present invention. In this optical switch 61, a core 62 branched into Y shape is arranged, and heaters 63R and 63L are arranged at both sides of the branch portion of the core 62. Since the core 62 shuts out a light signal when heat is imposed thereon. For example, when electricity is supplied only to the heater 63R to get it hot, a light signal is transmitted through the core 62L at the opposite side of the heater 63R and output. On the other hand, when electricity is supplied only to the heater 63L to get it hot, a light signal is transmitted through the core 62R at the opposite side of the heater 63L and output. Accordingly, in this optical switch 61, by controlling ON/OFF of the heaters 63R and 63L, it is possible to switch output destinations of a light signal.

Figure 35:
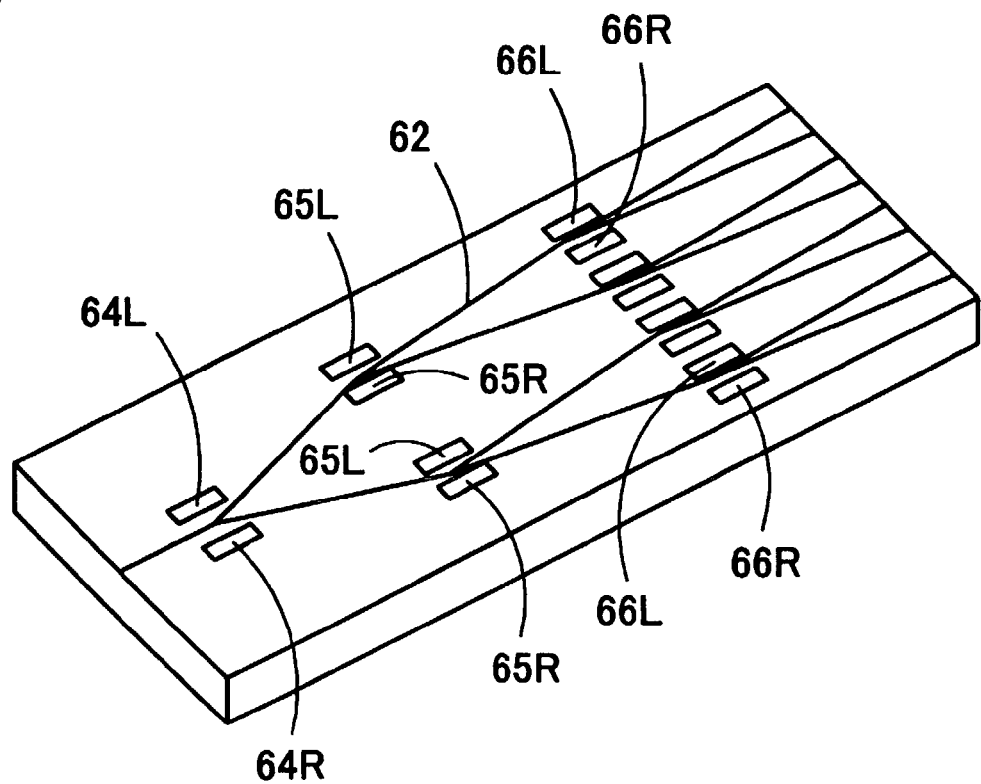
FIG. 35 shows a schematic perspective view of another structure of an optical switch according to the present invention.

In addition, by repeating such a structure as shown in FIG. 34 in plural steps, it is possible to switch a light signal to further more output destinations. For example, as shown in FIG. 35, by repeating such a branching structure as shown in FIG. 34 in 3 steps, and arranging heaters 64R and 64L, heaters 65R and 65L, and heaters 66R and 66L, it is possible to switch the output destinations of a light signal into 8 directions according to control of each heater.

FIGS. 36A and 36B show a perspective view of a concrete structure of an optical switch shown in FIG. 34. This optical switch 61 is attached to the top central portion of a base 67, fiber supporting plates 68 are fixed so as to face both end surfaces of the optical switch 61. On the upper surfaces of the fiber supporting plates 68, V-shaped fiber fixing portions 70 for centering and positioning the optical fiber 69 are arranged, and the optical fiber 69 is pressed into the fiber fixing portions 70 and fixed by means of adhesive, thereby core end surfaces of the optical switch 61 and optical axes of the optical fiber 69 are engaged with each other. By the way, the clearances s between the optical switch 61 and the fiber supporting plates 68 are to prevent adhesive for fixing the optical fiber 69 from attaching to the optical switch 61.

Additionally, the optical switch explained above may be connected to an optical fiber array in freely attachable and detachable manners by using a coupler.

Applied Embodiment 3

Figure 37:
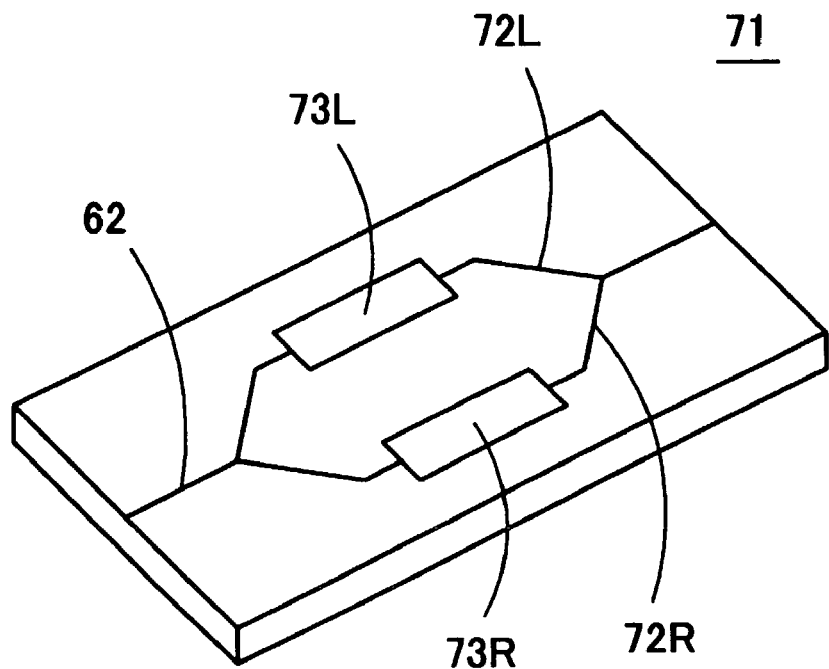
FIG. 37 shows a perspective view of a structure of an optical attenuator according to the present invention.

FIG. 37 shows a perspective view of a structure of an optical attenuator 71 according to the present invention. In this optical attenuator 71, the halfway portion of a core 62 is branched, and heaters 73R and 73L are arranged onto respective core branch portions 72R and 72L. In this optical attenuator 71, by impressing the heaters 73R and 73L and generating heat, it is possible to control the phase of light passing the core branch portions 72R and 72L. As a result, by controlling the heaters 73R and 73L, it is possible to attenuate light passing the optical attenuator 71 according to the principle of Mach-Zehnder interferometer.

Applied Embodiment 4

Figure 38:
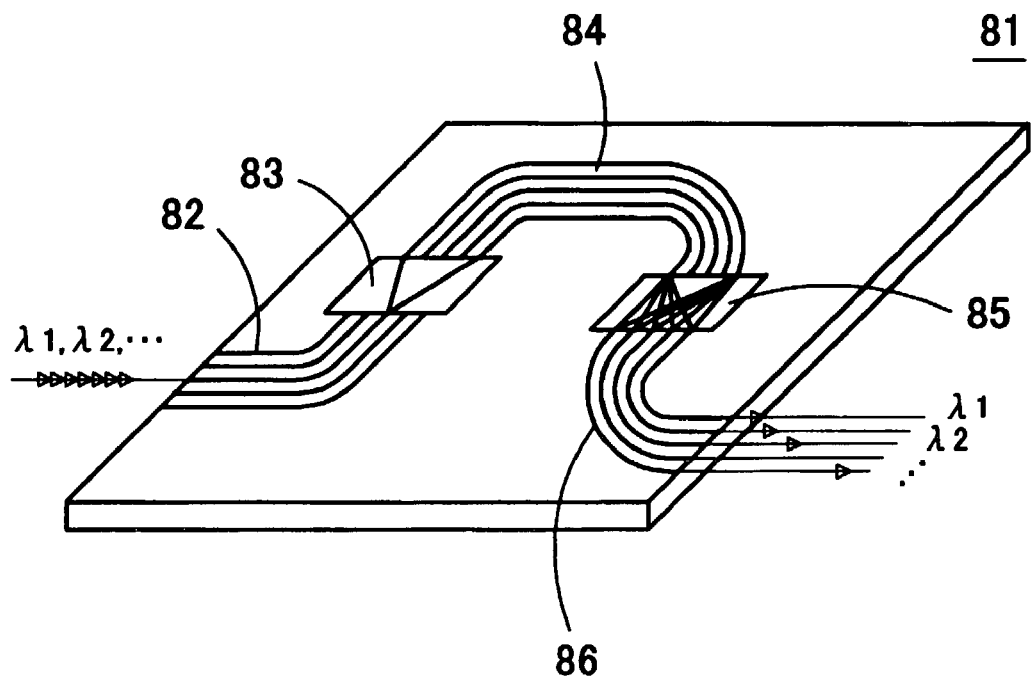
FIG. 38 shows a structure of an AWG optical wave guide circuit.

FIG. 38 shows a structure of an AWG optical wave guide circuit 81. Specifically, an array optical wave guide 84 comprising a plurality of cores is connected to an incident optical wave guide 82 comprising a plurality of cores via an incident side slab optical wave guide 83. Further, an outgoing optical wave guide 86 comprising a plurality of cores is connected to the other end of the array optical wave guide 84 via an outgoing side slab optical wave guide 85.

In this optical wave guide circuit 81, when light beams of wavelengths $\lambda 1, \lambda 2, \lambda 3, \ldots$ go into the incident optical wave guide 82, light beams of the respective wavelengths $\lambda 1, \lambda 2, \lambda 3, \ldots$ are separated per light of wavelengths $\lambda 1, \lambda 2, \lambda 3, \ldots$ by effects of the incident side slab optical wave guide 83 and the outgoing side slab optical wave guide 85, and the separated light beams of respective wavelengths $\lambda 1, \lambda 2, \lambda 3, \ldots$ are output through respective cores that configure the outgoing optical wave guide 86.

Applied Embodiment 5

Figure 39:
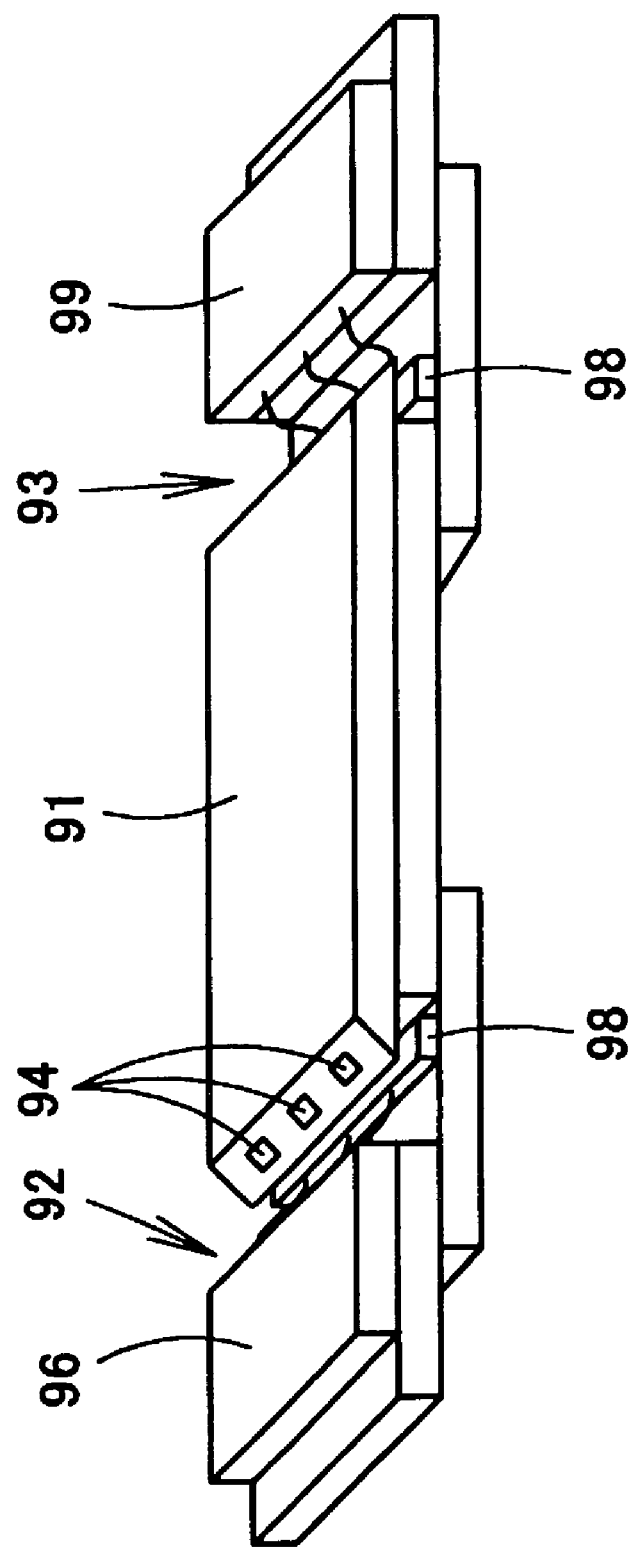
FIG. 39 shows a perspective view of a communication system according to the present invention.
Figure 40A:
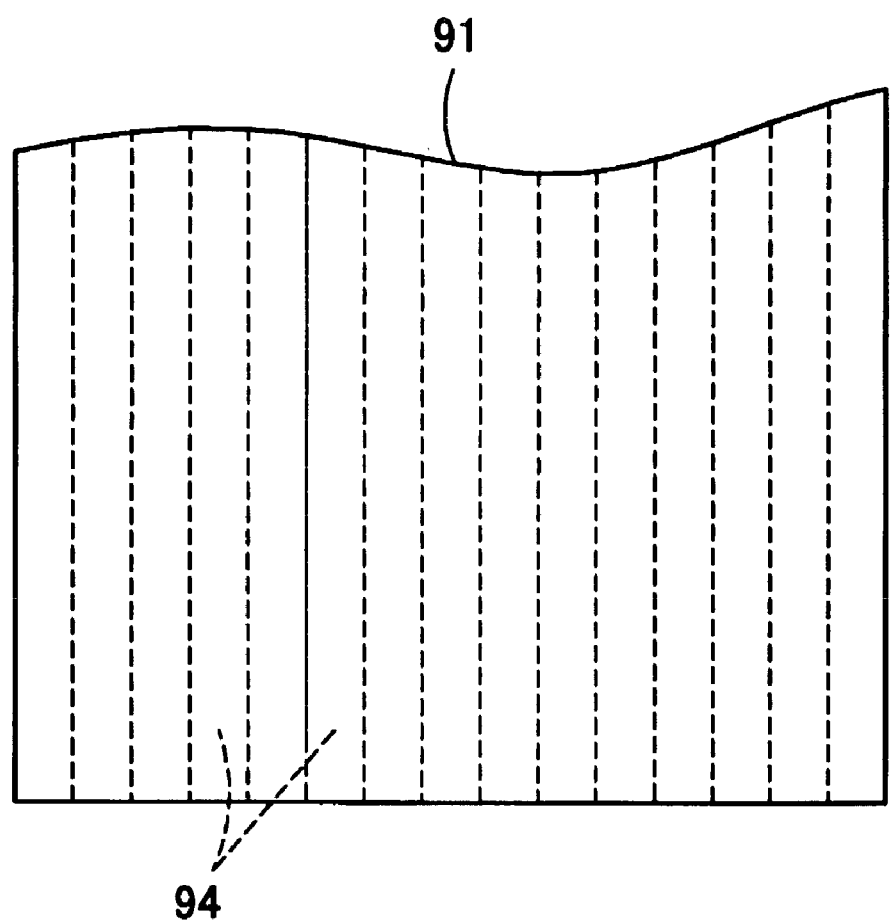
FIGS. 40A and 40B show a top view and a cross sectional view of optical wave guides employed in the above communication system.
Figure 40B:
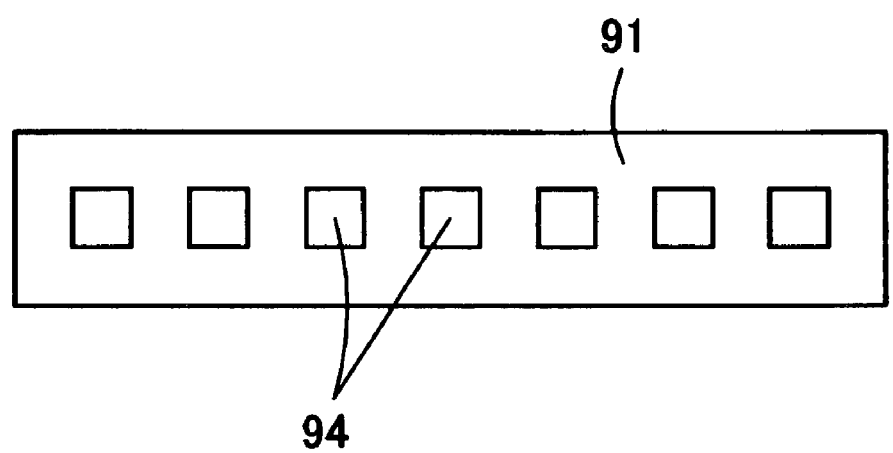
Figure 41:
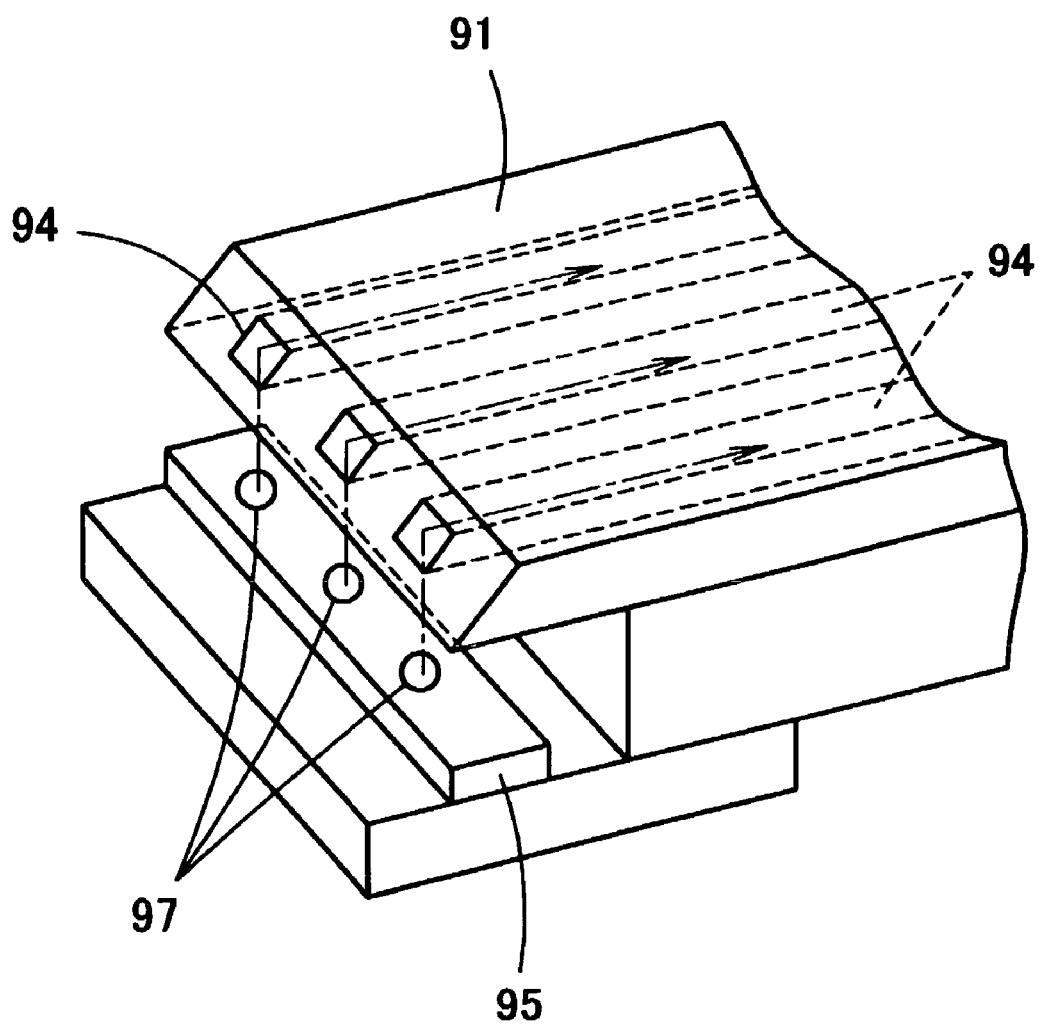
FIG. 41 shows an enlarged perspective view of part of the communication system in FIG. 39.

FIG. 39 shows a system for sending signals sent by one optical communication device through optical wave guides and receiving the signals by the other optical communication device. Namely, in this communication system, at both ends of an optical wave guide 91, arranged are optical communication devices 92 and 93. In the optical wave guide 91, as shown in FIG. 40, a plurality of cores are embedded, and both end surfaces are cut at angle 45 degrees upward. The optical communication device 92 is equipped with a control circuit 96 comprising a light emitting portion 95 and an LSI. Also, on the light emitting portion 95, as shown in FIG. 41, light emitting elements 97 such as light emitting diodes, semiconductor lasers, or the like are arranged at the position just under the end surfaces of respective cores 94. Similarly, the optical communication device 93 is equipped with a control circuit 99 comprising a light receiving portion 98 and an LSI, and on the light receiving portion 98, light receiving elements (not illustrated) such as photo diodes or the like are arranged at the position just under the end surfaces of respective cores 94.

In such a structure as mentioned above, when the respective light emitting elements 97 are emitted by the control circuit 96, and light signals are output just upward from the respective light emitting elements 97, these light signals, as shown in FIG. 41, go through the under surface of the optical wave guide 91 into the optical wave guide 91. Then, the light signals are totally reflected by the inclined end surfaces of the respective cores 94, and transmitted along the optical axial direction of the cores 94. When the light signals reach at the other ends of the cores 94, the light signals are totally reflected by the inclined end surfaces of the cores 94. Then, the light signals are directed downward, and are ejected through the under surface of the optical wave guide 91 toward the respective light receiving elements. The light signals that are ejected downward are received by the respective light receiving elements of the light receiving portion 98, and processed by the control circuit 99 according to specific signal processing.

Figure 42:
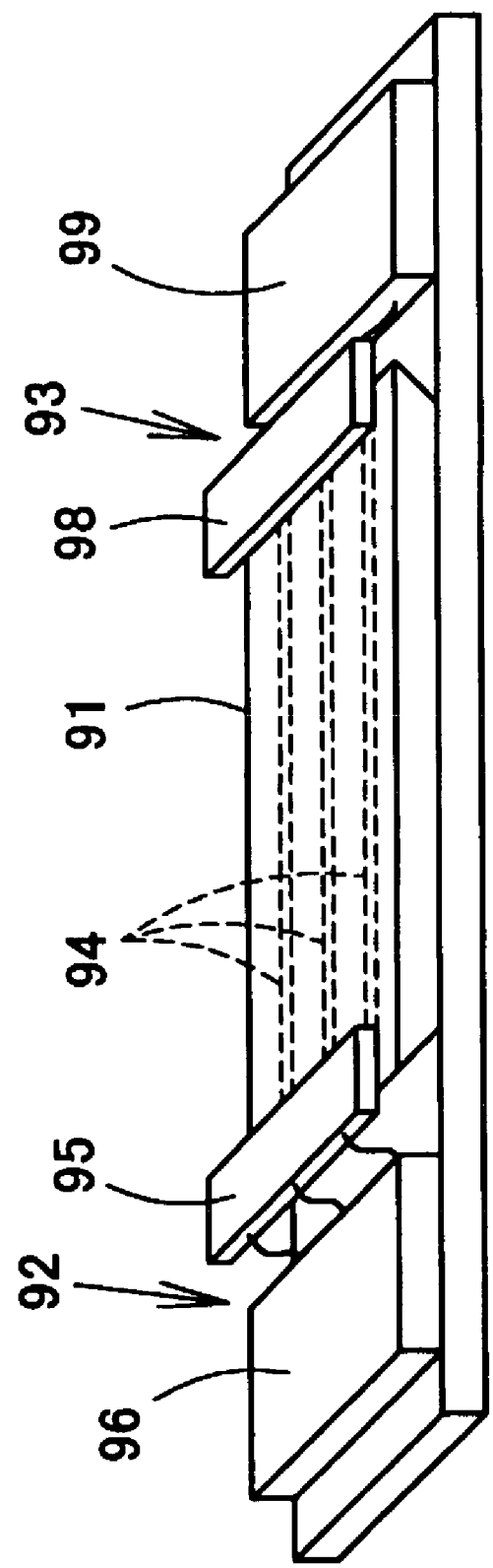
FIG. 42 shows a perspective view of another structure of a communication system according to the present invention.
Figure 43:
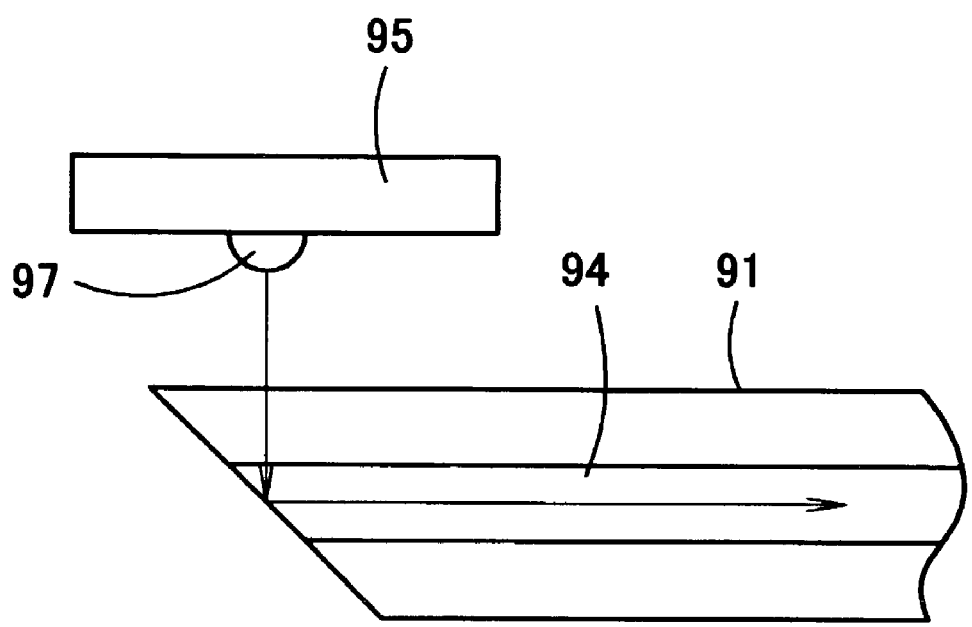
FIG. 43 shows a cross sectional view for explaining the functions of the above communication system.

FIG. 42 shows another structure of a communication system. In an optical wave guide 91 to be employed in this system, both end surfaces thereof are cut at angle 45 degrees downward. On the light emitting portion 95 of an optical communication device 92, as shown in FIG. 43, light emitting elements 97 such as light emitting diodes, semiconductor lasers, or the like are arranged at the position just above the end surfaces of respective cores 94. Similarly, on the optical communication device, light receiving elements (not illustrated) such as photo diodes or the like are arranged at the position just above the end surfaces of respective cores 94.

In such a structure as mentioned above, when the respective light emitting elements 97 are emitted by the control circuit 96, and light signals are output just downward from the respective light emitting elements 97, these light signals, as shown in FIG. 43, go through the under surface of the optical wave guide 91 into the optical wave guide 91. Then, the light signals are totally reflected by the inclined end surfaces of the respective cores 94, and transmitted along the optical axial direction of the cores 94. When the light signals reach at the other ends of the cores 94, the light signals are totally reflected by the inclined end surfaces of the cores 94 and directed upward, and are ejected through the upper surface of the optical wave guide 91 toward the respective light receiving elements. The light signals that are ejected upward are received by the respective light receiving elements of the light receiving portion 98, and processed by the control circuit 99 according to specific signal processing.

Figure 44A:
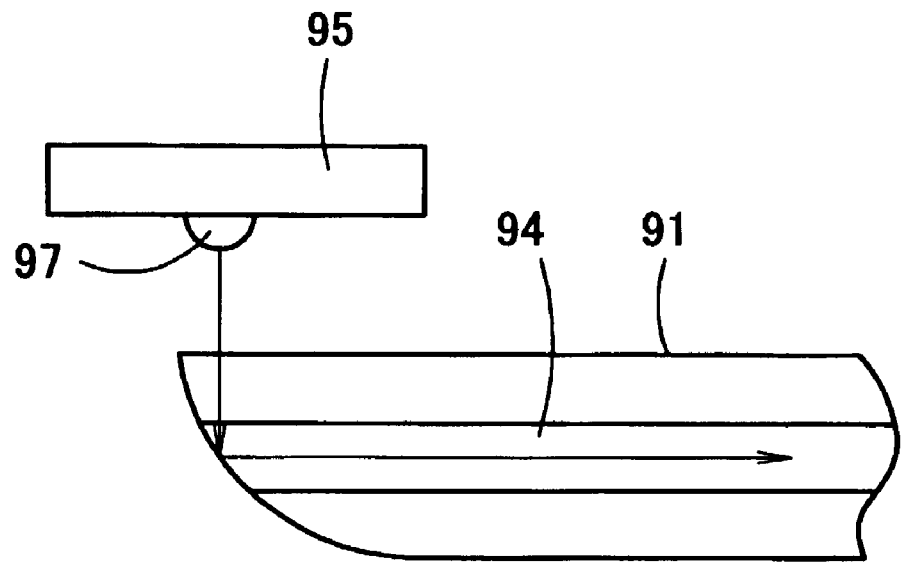
FIGS. 44A and 44B show schematic diagrams for explaining other embodiments of a method for optical combination of a light emitting portion and an optical wave guide.
Figure 44B:
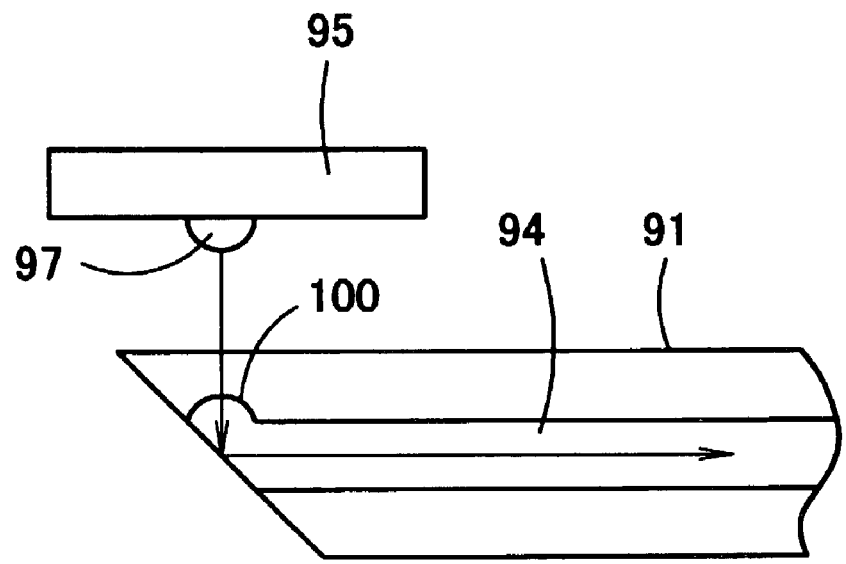

In addition, in the case where the end surface of the optical wave guide 91 is curved in an arc shape or a parabola shape as shown in FIG. 44A, or a lens portion 100 is arranged at the end of core 94 as shown in FIG. 44B, it is possible to have light converging effect. Thus, light coming from an light emitting element into a core, and light going out from the core to a light receiving element may be converged.

As mentioned above, according to an optical wave guide under the present invention, it is possible to produce an optical wave guide that by reproduction method using a stamper and the like in easy and simple manners. Further, since it is possible to make a core material extremely thin at both end areas of core, even if core material comes out, it is possible to prevent light signals in core from leaking out, and to keep the optical transmission quality of optical wave guide in preferable manners.

What is claimed is:

1. An optical wave guide, comprising:
    a first cladding portion having a groove formed on a flat portion thereof;
    a second cladding portion having a flat portion thereof facing the flat portion of the first cladding portion, and
    a core formed within the groove by filling the groove with material;
    wherein a recess is formed by the first cladding portion and the second cladding portion outside of the flat portion of the first cladding portion,
    wherein the groove has a same depth as the recess, and
    wherein the material overflows from the groove into the recess across the flat portion of the first cladding portion.

2. The optical wave guide according to claim 1, wherein the thickness of the material existing between the flat portion of the first cladding portion and the flat portion of the second the cladding portion is 3 μm or below.

3. The optical wave guide according to claim 1, wherein the width of the flat portion of the first cladding portion along the groove is 5 μm or more.

4. The optical wave guide according to claim 1, wherein the volume of the recess is larger than that of the groove.

5. The optical wave guide according to claim 1, wherein the flat area of an inner surface forming the recess is larger than that of the groove.

6. The optical wave guide according to claim 1, wherein the recess is formed along the core.

7. The optical wave guide according to claim 1, wherein the recess opens to atmospheric air.

8. The optical wave guide according to claim 1, wherein a side wall surface forming the recess is inclined.

9. The optical communication component comprising an optical wave guide according to claim 1, and a connector for operatively connecting another optical wave guide.

10. The optical wave guide according to claim 1, wherein an upper face of the core is in a same plane as the flat portion of the first cladding portion.

11. A method for producing an optical wave guide comprising:
    forming a groove on a surface of a cladding portion;
    supplying material to the groove of the cladding portion; and
    pressing a molding surface of a stamper on the cladding portion, thereby forming a core within the groove, wherein a recess is formed between the cladding portion and the stamper when the molding surface of the stamper is pressed on the cladding portion, and some of the material overflows the groove and flows into the recess.

12. The method for producing an optical wave guide according to claim 11, wherein the cladding portion is formed on a supporting substrate.

13. The method for producing an optical wave guide according to claim 11, wherein a plurality of optical wave guides are formed on a substrate, and a plurality of recesses are formed on the substrate.

14. The method for producing an optical wave guide according to claim 11, wherein the volume of the recess is larger than that of the groove.

15. The method for producing an optical wave guide according to claim 11, wherein the flat area of an inner surface forming the recess is larger than that of the groove.

16. The method for producing an optical wave guide according to claim 11, wherein the thickness of a portion of the cladding portion forming the recess is 7 μm or below.

17. The method for producing an optical wave guide according to claim 11, wherein the depth of the recess is deeper than that of the groove.

18. The method for producing an optical wave guide according to claim 11, wherein a side wall surface forming the recess is inclined.

19. The method for producing an optical wave guide according to claim 11, wherein a plurality of optical wave guides are formed on a substrate, and wherein the plurality of optical wave guides abut on at least one recess.

20. The method for producing an optical wave guide according to claim 19, wherein at least the one recess extends to an edge of the substrate.

21. The method for producing an optical wave according to claim 19, wherein the plurality of optical wave guides are enclosed by at least the one recess.

22. A method for producing an optical wave guide comprising:
forming a groove on a molding surface of a stamper;
supplying material to the groove of the stamper;
pressing the molding surface of the stamper on a cladding portion thereby forming a core within the groove, wherein a recess is formed between the cladding portion and the stamper when the molding surface is pressed on the cladding portion, and some of the material overflows the groove and flows into the recess.

23. The method for producing an optical wave guide according to claim 22, wherein the cladding portion is formed on a supporting substrate.

24. The method for producing an optical wave guide according to claim 22, wherein a plurality of optical wave guides are integrally formed on a substrate, and a plurality of recesses are formed on the substrate.

25. The method for producing an optical wave guide according to claim 22, wherein the volume of the recess is larger than that of the groove.

26. The method for producing an optical wave guide according to claim 22, wherein the flat area of an inner surface forming the recess is larger than that of the groove.

27. The method for producing an optical wave guide according to claim 22, wherein the thickness of a portion of the cladding portion forming the recess is 7 μm or below.

28. The method for producing an optical wave guide according to claim 22, wherein the depth of the recess is deeper than that of the groove.

29. The method for producing an optical wave guide according to claim 22, wherein a side wall surface forming the recess is inclined.

30. An optical wave guide comprising:
a first cladding portion having a groove formed on a flat portion thereof;
a second cladding portion having a flat portion thereof facing the flat portion of the first cladding portion, and
a core formed within the groove by filling the groove with material;
wherein a recess is formed by the first cladding portion and the second cladding portion outside of the flat portion of the first cladding portion, and
wherein material overflows from the groove into the recess across the flat portion of the first cladding portion,
wherein the thickness of a portion of the first cladding portion forming the recess is 7 μm or below.

31. An optical wave guide comprising:
a first cladding portion having a groove formed on a flat portion thereof;
a second cladding portion having a flat portion thereof facing the flat portion of the first cladding portion, and
a core formed within the groove by filling the groove with material;
wherein a recess is formed by the first cladding portion and the second cladding portion outside of the flat portion of the first cladding portion, and
wherein material overflows from the groove into the recess across the flat portion of the first cladding portion, and
wherein the depth of the recess is deeper than that of the groove.

* * * * *